United States Patent
Maebayashi et al.

(10) Patent No.: US 7,908,123 B2
(45) Date of Patent: Mar. 15, 2011

(54) VEHICLE PLANNING SUPPORT SYSTEM

(75) Inventors: Jiro Maebayashi, Hiroshima (JP); Yoshinori Takashi, Hiroshima (JP); Kouji Noma, Hiroshima (JP); Teruhisa Yamamoto, Hiroshima (JP)

(73) Assignee: Mazda Motor Corporation (JP)

( * ) Notice: Subject to any disclaimer, the term of this patent is extended or adjusted under 35 U.S.C. 154(b) by 908 days.

(21) Appl. No.: 11/522,538

(22) Filed: Sep. 18, 2006

(65) Prior Publication Data

US 2007/0073526 A1    Mar. 29, 2007

(30) Foreign Application Priority Data

| Sep. 26, 2005 | (JP) | 2005-278003 |
|---|---|---|
| Sep. 26, 2005 | (JP) | 2005-278004 |
| Sep. 26, 2005 | (JP) | 2005-278005 |
| Sep. 26, 2005 | (JP) | 2005-278006 |
| Sep. 26, 2005 | (JP) | 2005-278007 |
| Sep. 26, 2005 | (JP) | 2005-278008 |
| Sep. 26, 2005 | (JP) | 2005-278009 |
| Sep. 26, 2005 | (JP) | 2005-278010 |

(51) Int. Cl.
*G06F 17/50* (2006.01)

(52) U.S. Cl. ............................. 703/1; 700/97

(58) Field of Classification Search .......... 703/1; 700/97
See application file for complete search history.

(56) References Cited

U.S. PATENT DOCUMENTS

| 5,729,463 A * | 3/1998 | Koenig et al. ............ 700/98 |
|---|---|---|
| 6,925,865 B2 * | 8/2005 | Oku ......................... 73/146 |
| 6,944,515 B2 | 9/2005 | Nakajima et al. | |
| 2003/0055674 A1 * | 3/2003 | Nishiyama ................ 705/1 |
| 2004/0010398 A1 | 1/2004 | Noma et al. | |
| 2004/0172374 A1 * | 9/2004 | Forman ..................... 706/12 |
| 2005/0021222 A1 * | 1/2005 | Minami et al. ............ 701/123 |

FOREIGN PATENT DOCUMENTS

JP    4-77861 A    3/1992

(Continued)

OTHER PUBLICATIONS

Japanese Office Action "Notice of Reasons for Rejection" dated Aug. 26, 2010; Japanese Patent Application No. 2005-278003.
Japanese Office Action "Notice of Reasons Rejection" dated Aug. 26, 2010; Japanese Patent Application No. 2005-278004.

(Continued)

*Primary Examiner* — Dwin M Craig
(74) *Attorney, Agent, or Firm* — Studebaker & Brackett PC; Donald R. Studebaker

(57) ABSTRACT

The present invention is a vehicle planning support system for supporting the planning of new vehicles by building vehicle models, comprising a database (1) for storing vehicle data for building vehicle models, and a computing device (2) utilizing the vehicle data stored in the database to build planned vehicle models for the vehicle being planned, wherein performance evaluation values for quantifying performance valuations of the vehicle with respect to each of a predetermined evaluation items are included in vehicle data stored in the database for a plurality of existing vehicles, and the computing device has a target value setting section for setting target values with respect to each evaluation item based on a distribution of performance evaluation values for at least a section of comparison subject existing vehicles among the existing vehicles, a performance calculation section for computing performance evaluation values for each evaluation item with respect to the planned vehicle models, and a degree-of-completion calculation section for obtaining a target degree-of-completion by comparing target values and performance evaluation values with respect to each evaluation item.

32 Claims, 44 Drawing Sheets

FOREIGN PATENT DOCUMENTS

| | | | |
|---|---|---|---|
| JP | 6-290225 | A | 10/1994 |
| JP | 7-200658 | A | 8/1995 |
| JP | 2002-183220 | A | 6/2002 |
| JP | 2003-99472 | A | 4/2003 |
| JP | 2003-196323 | A | 7/2003 |
| JP | 2003-281197 | A | 10/2003 |
| JP | 2004-042747 | | 2/2004 |

OTHER PUBLICATIONS

Japanese Office Action "Notice of Reasons for Rejection" dated Aug. 26, 2010; Japanese Patent Application No. 2005-278005.

Japanese Office Action "Notice of Reasons for Rejection" dated Sep. 2, 2010; Japanese Patent Application No. 2005-278007.

Japanese Office Action "Notice of Reasons for Rejection" dated Sep. 2, 2010; Japanese Patent Application No. 2005-278008.

\* cited by examiner

FIG.4

COMPANY VEHICLE (PERFORMANCE)

| | | Detailed Item | Evaluation Points |
|---|---|---|---|
| HANDLING AND STABILITY PERFORMANCE | | POWER PERFORMANCE | 7.2 |
| | | BRAKING PERFORMANCE | 6.0 |
| | | HANDLING PERFORMANCE | 6.5 |
| | | COMFORT PERFORMANCE | 5.0 |
| NVH PERFORMANCE | | ROAD NOISE PERFORMANCE | ... |
| | | ENGINE NVH PERFORMANCE | ... |
| COMFORT PERFORMANCE | | HVAC PERFORMANCE | ... |
| | | OPERATIONAL PERFORMANCE | ... |
| ENVIRONMENTAL PERFORMANCE | | FUEL CONSUMPTION PERFORMANCE | ... |
| | | EMISSIONS PERFORMANCE | ... |
| SAFETY PERFORMANCE | | SAFETY PERFORMANCE | ... |
| INTERIOR COMFORT PERFORMANCE | | PACKAGING PERFORMANCE | ... |
| | | LOAD CARRYING PERFORMANCE | ... |

FIG.14

PERFORMANCE VALIDATION MODEL CONTENT

| MODEL LOCATION | HIERARCHICAL LEVEL 1 | HIERARCHICAL LEVEL 2 | HIERARCHICAL LEVEL 3 | HIERARCHICAL LEVEL 4 |
|---|---|---|---|---|
| FRONT AND ENGINE COMPARTMENT | ALL | ... | ... | ... |
| FRONT SEAT LOWER PORTION | ALL | ... | ... | ... |
| REAR SEAT LOWER PORTION | ALL | ... | ... | ... |
| REAR VICINITY & LUGGAGE COMPARTMENT | ALL | ... | ... | ... |
| FRONT SEAT UPPER PORTION | ALL | DOOR | DOOR OPENING AMOUNT | ... |
| | | | DOOR INNER | ... |
| | | | DOOR IMPACT BAR | ... |
| | | | DOOR INTERNAL MECHANISM | ... |
| | | OTHER | FLOOR PANEL | ... |
| | | | A PILLAR | ... |
| | | | B PILLAR | ... |
| | | | TUNNEL | ... |
| | | | CROSS MEMBERS | No.2 |
| | | | | No.3 |
| REAR SEAT UPPER PORTION | ALL | ... | ... | ... |
| ENGINE COMPARTMENT | ALL | ... | ... | ... |
| SUSPENSION | ALL | ... | ... | ... |
| TANK | ALL | | | |

FIG.17A

VEHICLE EVALUATION ITEM AND COMPLETION RANGE

| | HANDLING AND STABILITY | | | | NVH PERFOR- MANCE | | COMFORT PERFOR- MAMCE | | ENVIRON- MENTAL PERFOR- MAMCE | | SAFETY PERFOR- MAMCE | INTERIOR COMFORT PERFOR- MAMCE | |
|---|---|---|---|---|---|---|---|---|---|---|---|---|---|
| DETAILED ITEM | RIDE COMFORT PERFORMANCE | HANDLING PERFORMANCE | BRAKING PERFORMANCE | POWER PERFORMANCE | ROAD NOISE PERFORMANCE | ENGINE NVH PERFORMANCE | AIR CONDITIONING PERFORMANCE | OPERATIONAL PERFORMANCE | FUEL CONSUMPTION PERFORMANCE | EMISSION PERFORMANCE | SAFETY PERFORMANCE | PACKAGING PERFORMANCE | LOAD CARRYING PERFORMANCE |
| TARGET COMPLETION RANGE | 2 | 1 | 1 | 2 | 2 | 3 | 2 | 2 | 1 | 2 | 1 | 1 | 2 |

FIG.17B

DISTRIBUTION OF BENCHMARK VEHICLE
EVALUATION POINTS AND COMPLETION RANGE
(HANDLING PERFORMANCE)

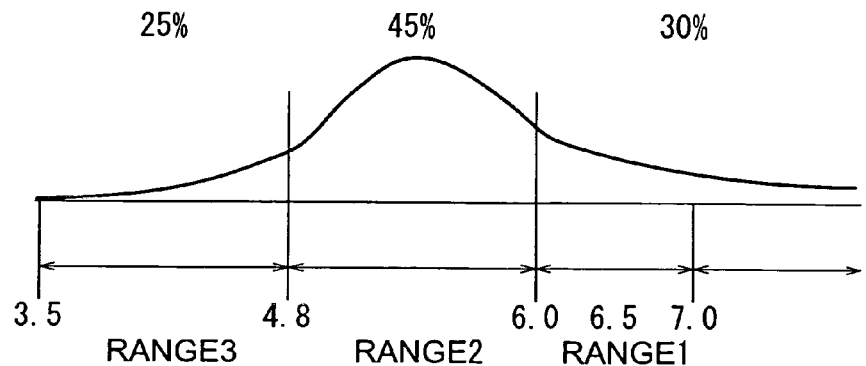

DISTRIBUTION OF EVALUATION POINTS AND
TARGET RANGE FOR BENCHMARK VEHICLE
AND RANGE SETTING VEHICLE
(HANDLING PERFORMANCE)

FIG.20A

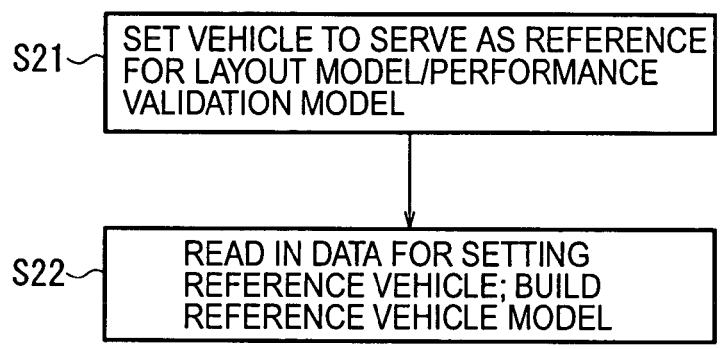

S21 — SET VEHICLE TO SERVE AS REFERENCE FOR LAYOUT MODEL/PERFORMANCE VALIDATION MODEL

S22 — READ IN DATA FOR SETTING REFERENCE VEHICLE; BUILD REFERENCE VEHICLE MODEL

FIG.20B

REFERENCE VEHICLE SETTING
● EXTERIOR APPEARANCE DATA
(REFLECTING LAYOUT MODEL)
CO. M, VEH. D, 3.0 AT US SPEC.
● DETAILED SETTINGS          BASE
  FRONT PERFORMANCE VALIDATION MODEL: VEHICLE A
  FRONT SEAT LOWER PORTION VALIDATION MODEL: VEH. B
  REAR SEAT LOWER PORTION VALIDATION MODEL: VEH. C
  REAR PERFORMANCE VALIDATION MODEL
            ⋮

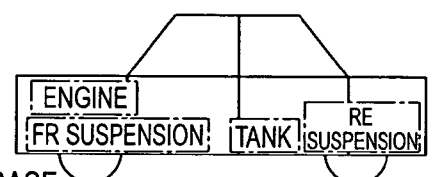

FIG.21

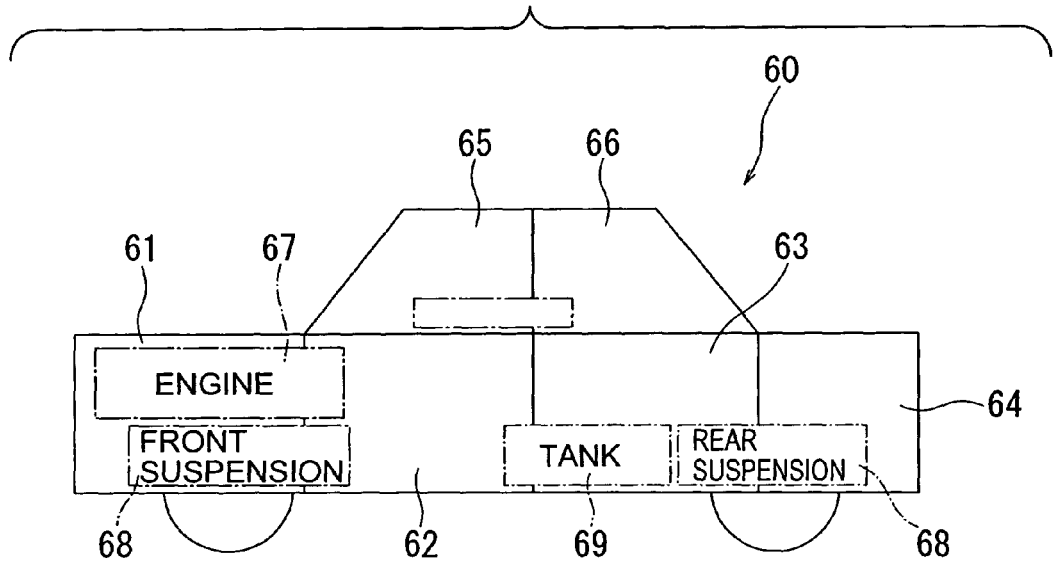

| | REFERENCE VEHICLE |
|---|---|
| 61:FRONT PERFORMANCE VALIDATION MODEL | VEHICLE A |
| 62:FRONT SEAT LOWER PORTION PERFORMANCE VALIDATION MODEL | VEHICLE B |
| 63:REAR SEAT LOWER PORTION PERFORMANCE VALIDATION MODEL | VEHICLE B |
| 64:REAR PERFORMANCE VALIDATION MODEL | VEHICLE C |
| 65:FRONT SEAT UPPER PORTION PERFORMANCE VALIDATION MODEL | VEHICLE A |
| 66:REAR SEAT UPPER PORTION PERFORMANCE VALIDATION MODEL | VEHICLE A |
| 67:ENGINE PERFORMANCE VALIDATION MODEL | VEHICLE D |
| 68:SUSPENSION PERFORMANCE VALIDATION MODEL | VEHICLE B |
| 69:TANK PERFORMANCE VALIDATION MODEL | VEHICLE B |

FIG.22

| DETAILED ITEM | HANDLING AND STABILITY | | | | NVH PERFORMANCE | | COMFORT PERFORMANCE | | ENVIRONMENTAL PERFORMANCE | | SAFETY PERFORMANCE | INTERIOR COMFORT PERFORMANCE | |
|---|---|---|---|---|---|---|---|---|---|---|---|---|---|
| | RIDE COMFORT PERFORMANCE | HANDLING PERFORMANCE | BRAKING PERFORMANCE | POWER PERFORMANCE | ROAD NOISE PERFORMANCE | ENGINE NVH PERFORMANCE | AIR CONDITIONING PERFORMANCE | OPERATIONAL PERFORMANCE | FUEL CONSUMPTION PERFORMANCE | EMISSION PERFORMANCE | SAFETY PERFORMANCE | PACKAGING PERFORMANCE | LOAD CARRYING PERFORMANCE |
| FRONT AREA | 5 | 10 | 5 | 5 | | 5 | | | 5 | | 10 | | |
| FRONT SEAT LOWER PORTION AREA | 5 | 10 | 5 | 5 | 40 | 5 | 20 | 80 | 5 | | 20 | 20 | |
| REAR SEAT LOWER PORTION AREA | | 10 | 5 | 5 | 40 | | 20 | 5 | 5 | | 20 | 20 | 15 |
| REAR AREA | 5 | | 5 | 5 | 10 | | 30 | 10 | 5 | | 10 | 30 | 80 |
| FRONT SEAT UPPER PORTION AREA | 5 | | 5 | 5 | 10 | | 30 | 5 | 5 | | 15 | 30 | 5 |
| REAR SEAT UPPER PORTION AREA | | | | | | | | | | | 15 | | |
| ENGINE AREA | 30 | | 50 | 70 | | 90 | | | 70 | 90 | | | |
| SUSPENSION AREA | 50 | 70 | 20 | | | | | | | | | | |
| TANK AREA | | | | | | | | | | 10 | 10 | | |

FIG.23

| | BODY RIGIDITY | WEIGHT DISTRIBUTION | BENDING RIGIDITY | TORSIONAL RIGIDITY |
|---|---|---|---|---|
| FRONT PERFORMANCE VALIDATION MODEL | ○ | ○ | ○ | ○ |
| FRONT SEAT LOWER PORTION PERFORMANCE VALIDATION MODEL | ◎ | ○ | ◎ | ◎ |
| REAR SEAT LOWER PORTION PERFORMANCE VALIDATION MODEL | ◎ | ○ | ◎ | ◎ |
| REAR PERFORMANCE VALIDATION MODEL | ○ | ○ | ○ | ○ |
| FRONT SEAT UPPER PORTION PERFORMANCE VALIDATION MODEL | △ | ○ | ○ | △ |
| REAR SEAT UPPER PORTION PERFORMANCE VALIDATION MODEL | △ | ○ | ○ | △ |
| ENGINE PERFORMANCE VALIDATION MODEL | | ○ | | |
| FRONT WHEEL SUSPENSION PERFORMANCE VALIDATION MODEL | | ○ | | |
| REAR WHEEL SUSPENSION PERFORMANCE VALIDATION MODEL | | ○ | | |
| FUEL TANK PERFORMANCE VALIDATION MODEL | | ○ | | |

(PERCENTAGE CONTRIBUTION : ◎20~30%、 ○10~20%、 △5~10%)

BENDING RIGIDITY VALUE (VEHICLE A)

(VEHICLE X)

● EXISTING VEHICLE

IN-CABIN LONGITUDINAL LENGTH

S31 — CORRECT BASIC TARGET VALUE FOR EACH ITEM; SET FINAL TARGET VALUE $$\begin{pmatrix} \text{TARGET VALUE BY PULSE (FINAL)} \\ \bullet \text{RIDE COMFORT: } 6.2 - 6.5 - 6.7 \\ \bullet \text{HANDLING:} \quad 6.0 - 6.5 - 7.0 \\ \vdots \\ \bullet \text{FUEL} \\ \text{CONSUMPTION} \quad 5.0 - 5.3 - 5.6 \\ \vdots \end{pmatrix}$$

FIG.29A

S41 — CALCULATE GAP BETWEEN REFERENCE VEHICLE AND TARGET VALUE FOR EACH VEHICLE EVALUATION ITEM

FIG.29B

GAP VALUE BY VEHICLE EVALUATION ITEM:

● HANDLING X
 TARGET VALUE    6.0 - 6.5 - 7.0
 REFERENCE VALUE    5.4
 GAP VALUE    0.6 - 1.1 - 1.6

⋮

● FUEL CONSUMPTION X
 TARGET VALUE    5.0 - 5.3 - 5.6
 REFERENCE VALUE    4.3
 GAP VALUE    0.7 - 1.0 - 1.6

INFLUENCE INDEX FOR EACH VEHICLE EVALUATION ITEM

| | INFLUENCE INDEX |
|---|---|
| RIDE COMFORT PERFORMANCE | PERFORMANCE : BODY RIGIDITY, SUSPENSION, TIRES<br>SPECIFICATION : WEIGHT AND WEIGHT DISTRIBUTION |
| HANDLING PERFORMANCE | PERFORMANCE : BODY RIGIDITY, SUSPENSION, TIRES, ENGINE<br>SPECIFICATION : WEIGHT AND WEIGHT DISTRIBUTION, CENTER OF GRAVITY, TRANSMISSION, WHEELBASE(45), TREAD, VEHICLE HEIGHT... |
| BRAKING PERFORMANCE | |
| POWER PERFORMANCE | |
| ROAD NOISE PERFORMANCE | |
| ENGINE NVH PERFORMANCE | |
| AIR CONDITIONING PERFORMANCE | |
| OPERATIONAL PERFORMANCE | |
| FUEL CONSUMPTION PERFORMANCE | PERFORMANCE : ENGINE, RUNNING RESISTANCE, TIRES<br>SPECIFICATION : WEIGHT, TRANSMISSION |
| EMISSION PERFORMANCE | |
| SAFETY PERFORMANCE | |
| PACKAGING PERFORMANCE | |
| LOAD CARRYING PERFORMANCE | |

FIG.34

SPECIFICATION-VEHICLE EVALUATION ITEM CORRESPONDENCE TABLE (VEHICLE)

| DETAILED ITEM | HANDLING AND STABILITY | | | | NVH PERFORMANCE | | COMFORT PERFORMANCE | | ENVIRONMENTAL PERFORMANCE | | SAFETY PERFORMANCE | INTERIOR COMFORT PERFORMANCE | |
|---|---|---|---|---|---|---|---|---|---|---|---|---|---|
| | RIDE COMFORT PERFORMANCE | HANDLING PERFORMANCE | BRAKING PERFORMANCE | POWER PERFORMANCE | ROAD NOISE PERFORMANCE | ENGINE NVH PERFORMANCE | AIR CONDITIONING PERFORMANCE | OPERATIONAL PERFORMANCE | FUEL CONSUMPTION PERFORMANCE | EMISSION PERFORMANCE | SAFETY PERFORMANCE | PACKAGING PERFORMANCE | LOAD CARRYING PERFORMANCE |
| 1 CENTER OF GRAVITY | O | O | O | | | | | | | | O | | |
| 2 WHEELBASE | O | O | | | | | | | | | | | |
| 3 VEHICLE WEIGHT | | O | O | O | | | | | O | | O | | |
| 4 VEHICLE HEIGHT | | | | | | | O | | O | | | O | O |
| 5 ··· | | | | | | | | | | | | | |
| 6 ··· | | | | | | | | | | | | | |
| 7 ··· | | | | | | | | | | | | | |
| 8 ··· | | | | | | | | | | | | | |
| 9 ··· | | | | | | | | | | | | | |
| 10 ··· | | | | | | | | | | | | | |

FIG.35A

PART/UNIT-VEHICLE EVALUATION ITEM CORRESPONDENCE TABLE
SUSPENSION

| | | Handling and Stability | | | | NVH Performance | | Comfort Performance | | Environmental Performance | | Safety Performance | Interior Comfort Performance | |
|---|---|---|---|---|---|---|---|---|---|---|---|---|---|---|
| DETAILED ITEM | | Ride Comfort Performance | Handling Performance | Braking Performance | Power Performance | Road Noise Performance | Engine NVH Performance | Air Conditioning Performance | Operational Performance | Fuel Consumption Performance | Emission Performance | Safety Performance | Packaging Performance | Load Carrying Performance |
| SPEC. | FORM | O | O | O | O | O | | | | | | | | |
| | WEIGHT | O | O | O | O | O | | | | O | | | O | O |
| | SIZE | | | | | | | | | | | | | |
| | ... | | | | | | | | | | | | | |
| PERF. | LONGITUDINAL RIGIDITY | O | O | O | O | O | | | | | | | | |
| | LATERAL RIGIDITY | O | O | O | | | | | | | | | | |
| | VERTICAL RIGIDITY | O | O | O | | O | | | | | | | | |
| | VERTICAL DEFLECTION PERFORMANCE | | O | | | | | | | | | | | |
| | LATERAL FORCE RESISTANCE | | O | | | | | | | | | | | |
| | ROLLING RESISTANCE | | | | O | | | | | O | | | | |
| | ... | | | | | | | | | | | | | |

FIG.35B

PART/UNIT-VEHICLE EVALUATION ITEM CORRESPONDENCE TABLE
ENGINE

| DETAILED ITEM | | HANDLING AND STABILITY | | | NVH PERFORMANCE | | COMFORT PERFORMANCE | | ENVIRONMENTAL PERFORMANCE | | SAFETY PERFORMANCE | INTERIOR COMFORT PERFORMANCE | |
|---|---|---|---|---|---|---|---|---|---|---|---|---|---|
| | | RIDE COMFORT PERFORMANCE | HANDLING PERFORMANCE | BRAKING PERFORMANCE | POWER PERFORMANCE | ROAD NOISE PERFORMANCE | ENGINE NVH PERFORMANCE | AIR CONDITIONING PERFORMANCE | OPERATIONAL PERFORMANCE | FUEL CONSUMPTION PERFORMANCE | EMISSION PERFORMANCE | SAFETY PERFORMANCE | PACKAGING PERFORMANCE | LOAD CARRYING PERFORMANCE |
| SPEC. | FORM | ⋮ | ⋮ | ⋮ | ⋮ | ⋮ | ⋮ | ⋮ | ⋮ | ⋮ | ⋮ | ⋮ | ⋮ | ⋮ |
| | WEIGHT | ○ | | | | | | | | | | | | |
| | SIZE | ⋮ | ⋮ | ⋮ | ⋮ | ⋮ | ⋮ | ⋮ | ⋮ | ⋮ | ⋮ | ⋮ | ⋮ | ⋮ |
| | ... | | | | | | | | | | | | | |
| PERF. | MAXIMUM OUTPUT | ⋮ | ⋮ | ⋮ | ⋮ | ⋮ | ⋮ | ⋮ | ⋮ | ⋮ | ⋮ | ⋮ | ⋮ | ⋮ |
| | MAXIMUM TORQUE | ⋮ | ⋮ | ⋮ | ⋮ | ⋮ | ⋮ | ⋮ | ⋮ | ⋮ | ⋮ | ⋮ | ⋮ | ⋮ |
| | TORQUE CHARACTERISTIC | ⋮ | ⋮ | ⋮ | ⋮ | ⋮ | ⋮ | ⋮ | ⋮ | ⋮ | ⋮ | ⋮ | ⋮ | ⋮ |
| | FUEL CONSUMPTION | ⋮ | ⋮ | ⋮ | ⋮ | ⋮ | ⋮ | ⋮ | ⋮ | ⋮ | ⋮ | ⋮ | ⋮ | ⋮ |
| | NHV | ⋮ | ⋮ | ⋮ | ⋮ | ⋮ | ⋮ | ⋮ | ⋮ | ⋮ | ⋮ | ⋮ | ⋮ | ⋮ |
| | ... | | | | | | | | | | | | | |

PERFORMANCE INFLUENCE FUNCTION (HANDLING)

PERFORMANCE INFLUENCE ERROR FUNCTION (HANDLING)

FIG.37A

S61 — CALCULATE OF GAP BETWEEN PLANNED VEHICLE ACTUAL CAPABILITY VALUE AND TARGET VALUE

FIG.37B

GAP VALUE BY VEHICLE EVALUATION ITEM:

● HANDLING △
 TARGET VALUE    6.0 - 6.5 - 7.0
 ACTUAL CAPABILITY VALUE    6.1
 GAP VALUE    (0.1) - 0.4 - 0.9

⋮

● FUEL CONSUMPTION X
 TARGET VALUE    5.0 - 5.3 - 5.6
 REFERENCE VALUE    4.6
 GAP VALUE    0.4 - 0.7 - 1.0

⋮

FIG.41
(FIRST LAYER)
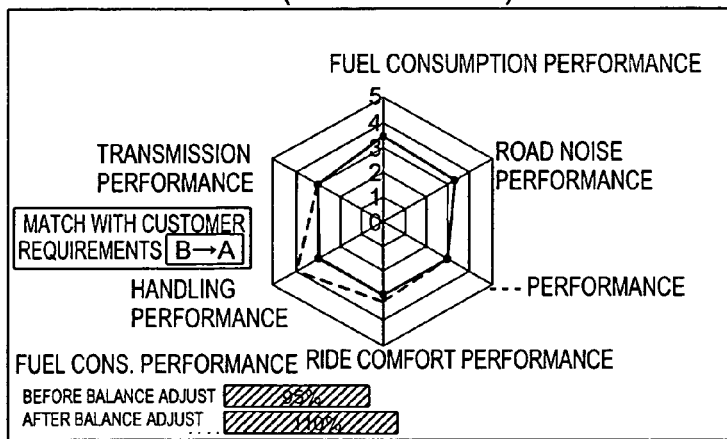
(SECOND LAYER)
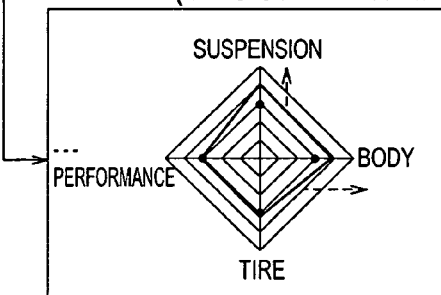
(THIRD LAYER)
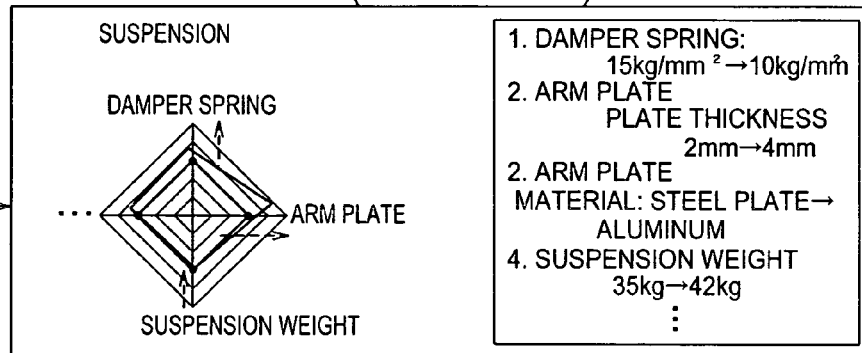
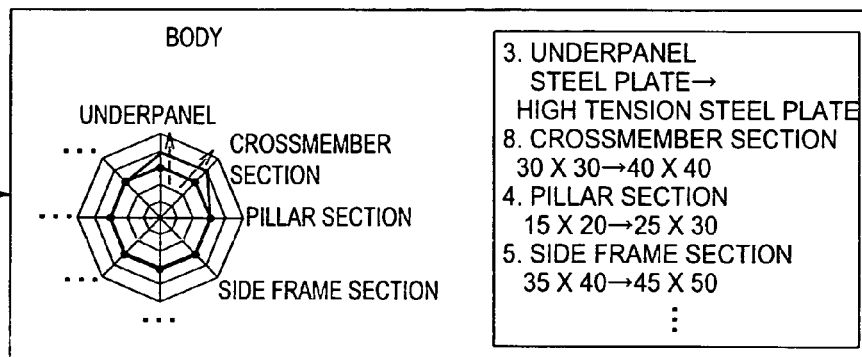

FIG.42

| | | PAST VEHICLE 1 | PAST VEHICLE 2 | BASIC VEHICLE 2 | PLANNED VEHICLE | TARGET VALUE | GAP VALUE |
|---|---|---|---|---|---|---|---|
| PLAN REQUIREMENT | CATEGORY | MINIVAN | ... | MINIVAN | ↓ | ↓ | ↓ |
| | CLASS | CLASS 3 | ... | CLASS 3 | ↓ | ↓ | ↓ |
| | COST | ... | ... | | ↓ | ↓ | ↓ |
| | PERIOD EQUIPMENT | ... | ... | | ↓ | ↓ | ↓ |
| | ... | ... | ... | | ... | ... | ... |
| VEHICLE EVALUATION ITEM EVALUATION POINTS | RIDE COMFORT | ... | ... | | ... | ... | ... |
| | HANDLING | 5.0→5.3→5.6→6.0 | ... | 5.4 | 5.6 | 6.0 | 0.4 |
| | ... | ... | ... | ... | ... | ... | ... |
| SYSTEMS/PARTS | ENGINE | MZT→MZS | ... | MZT | MZT | — | — |
| | EMISSIONS | ... | ... | ... | ... | ... | ... |
| SPECIFICATIONS | WHEELBASE | 2350→2450 | ... | 2350 | 2350 | — | — |
| | ... | ... | ... | ... | ... | ... | ... |

MATCH TO CUSTOMER REQUIREMENTS

|  | C | B | A |
|---|---|---|---|
| RIDE COMFORT PERFORMANCE | ~5.3 | 5.4~5.9 | 6.0~ |
| HANDLING | ~5.88 | 5.9~6.3 | 6.4~ |
| ⋮ | | | |

FIG.47

| SELECTION NO. | ENGINE | EMISSIONS | BODY | ... |
|---|---|---|---|---|
| 1 | MTS-010 | T-60 | A TYPE | |
| 2 | | | | |
| 3 | | | | |
| . | | | | |
| . | | | | |
| . | | | | |

VEHICLE PLANNING SUPPORT SYSTEM

BACKGROUND OF THE INVENTION

1. Field of the Invention

The present invention relates to a vehicle planning support system utilizing a computer, and more particularly to a vehicle planning support system in which target performance values are set for each planned vehicle evaluation item based on vehicle data for an existing vehicle.

2. Conventional Art

Conventionally, vehicle planning was generally implemented through written descriptions by product planning departments, with consideration for marketing and the like. At the vehicle planning stage, packaging was determined and distinctive vehicles were proposed based on ideas only. However, the lack of review of specific structures at the planning stage meant that development work was begun without the benefit of certainty with respect to many performance features of the planned vehicle.

Once received from the product planning department, the proposed planned vehicle was then separately reviewed by the styling department, the design department, the manufacturing department, and the like. This led to the need for backtracking during development to do redesign and the like after the planning stage. Since there were many opposing considerations between each of the departments, there was a further need to made adjustments and compromises between the various departments, modifying the planned vehicle accordingly. This resulted in a tendency toward ordinary, undistinguished planned vehicles. Large amounts of time were also consumed in making these types of adjustments.

In general, not determining a specific structure for the planned vehicle made it difficult to validate planned vehicle performance. For this reason, further review through CAE, testing, and the like were conducted by the design department, leading to further refinement of drawings, based upon which prototype vehicles were then fabricated and validated through testing.

In Japanese Patent 2004-042747, the present applicant proposed a program for testing the feasibility of a planned vehicle in the planning stage.

Further improvements are needed, however, in order to plan vehicles which match ever more diverse customer needs, and to shorten design stages, reduce the number of prototype vehicles and testing, and shorten new vehicle development time.

SUMMARY OF THE INVENTION

The present invention therefore has the object of providing a vehicle planning support system capable of further shortening development time for new vehicles.

In order to achieve the above object, the vehicle planning support system of the present invention is a vehicle planning support system which supports vehicle planning by building models, having a database for storing vehicle data for building vehicle models, and a computing device utilizing vehicle data stored in the database to build planned vehicle models for the vehicle being planned, wherein performance evaluation values for quantifying performance evaluations of the vehicle with respect to each of a predetermined evaluation items are included in vehicle data stored in the database for a plurality of existing vehicles, and the computing device has a target value setting section for setting target values with respect to each of the evaluation items based on a distribution of performance evaluation values for at least a portion of subject compared existing vehicles among the existing vehicles, a performance computing section for computing performance evaluation values for each of the evaluation items with respect to the planned vehicle models, and a degree-of-completion computing section for obtaining a target degree-of-completion by comparing target values and performance evaluation values with respect to each of the evaluation items.

With this vehicle planning support system of the present invention, not only the form, but also the presumed performance of the planned vehicle can be validated in the planning stage. By establishing target values based on a distribution of performance evaluation values for existing vehicles, objective target values can be easily set. As a result, the direction of development for the planned vehicle can be clarified, backtracking in development subsequent to the planning stage prevented, and development time for new vehicles even further shortened.

Furthermore, it is preferable in the present invention that ranking information indicating rankings determining the relative position in performance to be achieved by the planned vehicle with respect to a competitive group of vehicles be stored in the database for each of the evaluation items, and that the target setting section of the computing device segment performance evaluation values into a plurality of ranges based on the distribution of performance evaluation values for the subject compared existing vehicles with respect to each of the evaluation items, adopting performance evaluation values within ranges corresponding to the set ranking as respective target values for each of the evaluation items.

Ranking the planned vehicle performance to be achieved for each of the evaluation items in this way enables concentrated investment in performance for necessary evaluation items. Moreover, it also becomes possible to impart more personality and edge to the vehicle. In other words, establishing a target degree of superiority with respect to a benchmark vehicle for each vehicle evaluation item such as handling and stability or fuel economy enables the manufacturer to impart personality and edge to the vehicle. This results in more product value and competitiveness for the planned vehicle.

It is further preferable in the present invention for the target value setting section to set target values for each of the evaluation items, based on a distribution of performance evaluation values for the subject vehicles of the comparison, set separately from those of the competitor vehicles. This permits setting more appropriate target values.

In order to achieve the above objects, the vehicle planning support system of the present invention is a vehicle planning support system for supporting vehicle planning by building vehicle models, comprising a database for storing vehicle data for building vehicle models and a computing device utilizing vehicle data stored in the database to build planned vehicle models for the vehicle being planned, wherein performance evaluation values for quantifying performance evaluations of the vehicle with respect to each of a predetermined evaluation items are included in vehicle data stored in the database for a plurality of existing vehicles, and the computing device has a basic target value setting section for setting basic performance target values with respect to each of the evaluation items, based on a distribution of performance evaluation values for at least a portion of subject compared existing vehicles among the existing vehicles, a corrected target setting section for obtaining corrected performance target values by correcting the basic performance target values, a performance computing section for computing performance evaluation values for each of the evaluation items with respect to the planned vehicle models, and a degree-of-completion computing section for obtaining a target degreeof-completion by comparing corrected target values and the planned vehicle performance evaluation values with respect to each of the evaluation items.

The vehicle planning support system of the present invention thus constituted enables validation in the planning stage of not only the shape of the planned vehicle, but also the presumed performance thereof. Moreover, targets are set based on a distribution of existing vehicle performance evaluation values, so that objective target values can be easily set. In addition, correction of target values with consideration for the vehicle selling period, vehicle features, or the like makes it possible to set more appropriate target values. As a result, the direction of development for the planned vehicle can be clarified, backtracking in development subsequent to the planning stage prevented, and development time for new vehicles even further shortened.

It is further preferable in the present invention that data used for time period-related corrections, indicating trends in time period-related changes in performance evaluation values based on performance evaluation values for past and present existing vehicles for each of the evaluation items be stored in the database, and for the corrected target value setting section to correct the basic performance target values to match the planned vehicle selling period, based on the time period-related correction data.

Appropriate target vales can thus be set to match the planned vehicle selling period. In other words, the planned vehicle will become an actual vehicle and go on sale one or two years later, so the vehicles it will compete with in the market are not so much currently existing benchmark vehicles, but versions of those benchmark vehicles with even greater product value. Therefore the planned vehicle which is actually realized can manifest superior qualities corresponding to the set target completion range, for example, with respect to those further evolved benchmark vehicles.

It is further preferable in the present invention that ranking information indicating rankings determining the relative position in performance to be achieved by the planned vehicle with respect of a competitive group of vehicles be stored in the database with respect to each of the evaluation items, and that the basic target setting section of the computing device segment performance evaluation values into a plurality of ranges based on a distribution of performance evaluation values for the subject compared existing vehicles for each of the evaluation items, adopting performance evaluation values within ranges corresponding to the set ranking as the respective target values for each of the evaluation items, and that the corrected target setting section of the computing device treat the corrected performance target values as values within the same range as the basic performance evaluation values.

This permits system settings which allow for correction within a certain range. By thus setting the performance within a predetermined range, a realistic vehicle can be planned without setting excessive target values.

It is further preferable in the present invention that customer evaluation index values quantifying customer request levels with respect to each of the evaluation items, and correspondence data indicating the correspondence between customer evaluation index values and performance evaluation points are stored in the database; and that the corrected target value setting section corrects basic target values by obtaining performance evaluation values corresponding to customer evaluation index values, based on the correspondence data, so as to satisfy these corresponding performance evaluation values.

Target values can thus be corrected so as to meet market demands and satisfy customer requirements. Target values which over-satisfy customer requirements will normally not be set if those target values are corrected based on existing vehicle data, so that ultimately a balance can be reached, and vehicles can be planned without excessive cost expenditure.

In order to achieve the above object, the vehicle planning support system of the present invention is a vehicle planning support system which supports vehicle planning by building vehicle planning models for the vehicle being planned, comprising a database storing vehicle data for building planned vehicle models, and a computing device for building planned vehicle models using the vehicle data stored in the database, whereby data stored in the database includes performance evaluation values quantifying vehicle performance evaluations for each of a predetermined evaluation items with respect to a plurality of existing vehicles, and change influence data correlating changes in vehicle constituent elements with fluctuations in performance evaluation values due to those changes in constituent elements, and the computing device comprises a target value setting section for setting target values for each of the evaluation items based on the distribution of performance evaluation values of at least a portion of the subject compared existing vehicles, a vehicle model building section for building reference vehicle models based on vehicle data for a vehicle selected from among existing vehicles, which builds planned vehicle models in which constituent elements of the reference vehicle model are changed, a performance computing section for computing performance evaluation values for each of the evaluation items with respect to the reference vehicle models, correcting performance evaluation values for planned vehicle models in which constituent elements of the reference model have been changed based on the change influence data; and a degree-of-completeness computing section for obtaining a target degree-of-completeness by comparing target values of each of the evaluation items to performance evaluation values for the planned vehicle.

With such a vehicle planning support system of the present invention, the presumed performance of the planned vehicle can be validated using vehicle data from existing vehicles. Moreover, for planned vehicle models in which specifications or constituent elements of the units or parts, etc. have been changed from the reference vehicle, planned vehicle performance can be simply and accurately validated, since corrections are made, for example, by adding and subtracting differences or obtaining totals. As a result, backtracking after the planning stage can be minimized, and the development period for new vehicles can be shortened.

For vehicle data stored in the database, it is preferable in the present invention that constituent element data is hierarchically structured, and that when high level constituent elements of the hierarchical structure are changed, low level constituent elements of that hierarchical structure are also changed in tandem, thus enabling efficient building of planned vehicle models.

Furthermore, it is preferable in the present invention, when a change-restricted constituent element in the reference vehicle model is specified, that the vehicle model computing section not accept changes in the change-restricted constituent element.

This enables the prevention of erroneous morphing, numerical value setting, or changes in constituent elements of layout validation models or performance evaluation models for sections utilizing carryover parts.

It is further preferable in the present invention that the vehicle model computing device display constituent elements for which changes are restricted in the reference vehicle model distinctly from constituent elements for which changes are unrestricted.

This allows, for example, improvements in operability with respect to change-restricted parts when building planned vehicle models by displaying parts for which change is not restricted in a different color.

In order to achieve the above object, the vehicle planning support system of the present invention is a vehicle planning support system which supports vehicle planning by building models, having a database for storing vehicle data for building vehicle models, and a computing device utilizing vehicle data stored in the database to build planned vehicle models for the vehicle being planned, wherein performance evaluation values for quantifying performance evaluations of the vehicle with respect to each of a predetermined evaluation items are included in vehicle data stored in the database for a plurality of existing vehicles, and the computing device has a target value setting section for setting target values with respect to each of the evaluation items, a layout validation model building section for building layout validation models for evaluating a planned vehicle by displaying the shape of a vehicle model on a screen based on vehicle data for a first reference vehicle selected from existing vehicles, a performance validation model building section for building performance validation models for evaluating the performance of planned vehicle evaluation items without displaying the vehicle model shape, independent of the layout validation model, based on vehicle data for a second reference vehicle selected from among existing vehicles, a performance computing section for computing performance evaluation values for each of the evaluation items with respect to the performance validation model, and a degree-of-completeness computing section for obtaining a target degree-of-completeness by comparing target values of each of the evaluation items to performance evaluation values for the planned vehicle.

In a vehicle planning support system of the present invention thus constituted, not only the planned vehicle form, but also the presumed performance of the planned vehicle, can be validated at the planning stage. Moreover, because target values are set based on a distribution of performance evaluation values for existing vehicles, objective target values can be easily set. As a result, the planned vehicle development direction can be clarified at the planning stage, development backtracking subsequent to the vehicle planning stage can be prevented, and time required for new vehicle development can be shortened.

It is further preferable in the present invention that the vehicle model building section for performance evaluation build performance validation models based on vehicle data for a second reference vehicle, different from the first reference vehicle. This allows for selection of optimal reference vehicles from the respective standpoints of form for layout validation models, and performance for performance validation models.

It is further preferable in the present invention that the vehicle model building section for performance evaluation build respective vehicle constituent part models to form a second reference vehicle from vehicle data for each vehicle constituent part for a plurality of vehicles selected from among existing vehicles and, further, that these vehicle constituent part models be combined to build performance evaluation vehicle models.

Thus constituting reference models for use as performance evaluation models from a plurality of reference vehicle parts allows for the use of favorable parts of existing vehicles. In other words, a reference vehicle can be independently set for each location (area) of the vehicle, with specifications and performance closest to those desired being set for each area of the planned vehicle, thus enabling more accurate estimates of vehicle performance, and lower performance prediction error.

This makes it easier for the operator to impose, for example, an original image he/she may have in mind for the vehicle shape. How this original shape will affect the performance can be easily gauged. Fitting vehicles which match one's image onto each part rather than modifying the entire vehicle reduces the amount of changes with respect to the reference vehicle, and because performance is calculated in any case using reference vehicle data, allows accurate performance evaluation values to be obtained.

It is further preferable in the present invention that for each of the performance evaluation values, vehicle data stored in the database include a percentage contribution for that vehicle constituent part with respect to the entire vehicle, and that the performance computing section calculate evaluation points for each of the evaluation items of the performance evaluation vehicle model using the percentage contribution vehicle data for each of the vehicle constituent parts.

By so doing, performance evaluation values of the reference vehicle model can be computed from the evaluation points for each of the vehicle evaluation items of each of the combined reference vehicles.

It is further preferable in the present invention for the performance evaluation vehicle model computing section to obtain the weight and center of gravity of each of the vehicle constituent part models, and to obtain the weight and center of gravity of the performance evaluation vehicle model from the weight and center of gravity of each vehicle constituent part model.

This permits the weight and center of gravity of the performance evaluation vehicle model to be obtained even in cases in which a plurality of reference vehicles are combined.

In order to achieve the above object, the vehicle planning support system of the present invention is a vehicle planning support system which supports vehicle planning by building models, having a database for storing vehicle data for building vehicle models, and a computing device utilizing vehicle data stored in the database to build planned vehicle models for the vehicle being planned, wherein performance evaluation values for quantifying performance evaluations of the vehicle with respect to each of a predetermined evaluation items are included in vehicle data stored in the database for a plurality of existing vehicles, and the computing device has a target value setting section for setting target values with respect to each of the evaluation items, a layout validation model building section for building layout validation models for evaluating a planned vehicle by displaying the shape of a vehicle model on a screen based on vehicle data for a first reference vehicle selected from among existing vehicles, a performance validation model building section for building performance validation models for evaluating the performance of planned vehicle evaluation items without displaying the vehicle model shape, independent of the layout validation model, based on vehicle data for a second reference vehicle selected from among existing vehicles, a performance computing section for computing performance evaluation values for each of the evaluation items with respect to the performance validation model, and a degree-of-completeness computing section for obtaining a target degree-of-completeness by comparing target values of each of the evaluation items to performance evaluation values for the planned vehicle, and the performance validation model building section changes the relevant parts of the performance validation model in accordance with changes in layout validation model specifications in the layout validation model building section.

With such a vehicle planning support system of the present invention, the presumed performance of the planned vehicle, rather than the planned vehicle's form, can be validated in the planning stage. Performance validation models for evaluating the performance of planned vehicle evaluation items is therefore built without displaying the shape of the vehicle model, so no visual display of the vehicle is required of the performance validation model. Performance can therefore be validated by making primarily only changes in quantitative specification values and systems using performance models. Moreover, layout validation models and performance validation models are mutually correlated and built in parallel, thus enabling improved work efficiency and reduced development time for new vehicles.

In order to achieve the above object, the vehicle planning support system of the present invention is a vehicle planning support system which supports vehicle planning by building models, having a database for storing vehicle data for building vehicle models, and a computing device utilizing vehicle data stored in the database to build planned vehicle models for the vehicle being planned, wherein performance evaluation values for quantifying performance evaluations of the vehicle with respect to each of a predetermined evaluation items are included in vehicle data stored in the database for a plurality of existing vehicles, and the computing device has a target value setting section for setting target values with respect to each of the evaluation items, a performance validation model building section which builds vehicle constituent part models from the vehicle data for each of the respective vehicle constituent parts of a plurality of vehicles selected from among existing vehicles and, by combining these vehicle constituent part models, builds performance validation models for the purpose of evaluating the performance of planned vehicle evaluation items without displaying the shape of the vehicle models, a layout validation model building section for building layout validation models for the purpose of evaluating planned vehicles by displaying vehicle model shapes based on the performance validation models built by the performance validation model building section, a performance computing section for computing performance evaluation values for each of the evaluation items with respect to the performance validation models, and a degree-of-completeness computing section for computing a degree of target completion by comparing, for each of the evaluation items, the target values with the performance evaluation values for the performance evaluation vehicle models.

The vehicle planning support system of the present invention thus constituted enables validation in the planning stage of not only the shape of the planned vehicle, but also the presumed performance thereof. Performance validation models for evaluating the performance of planned vehicle evaluation items is therefore built without displaying the shape of the vehicle model, so no visual display of the vehicle is required of the performance validation model. Performance can therefore be validated by making primarily changes in only quantitative specification values or changes in systems using performance models. Moreover, layout validation models are built from performance validation models, so that work efficiency can be improved and new vehicle development time can be reduced.

It is further preferable in the vehicle planning support system of the present invention that priority data indicating the order of priority between vehicle constituent part models be stored in the database, and that the layout validation model building section, when matching the border portions of each vehicle constituent part model, deform the vehicle constituent parts at the border portions in accordance with the order of priority indicated by the order of priority data.

An order of priority to be fixed for each area is thus determined for the adjusting specifications used to obtain shape compatibility, and adjustment is made starting from the low order of priority thereof. Shape compatibility can thus be obtained while as much as possible maintaining performance.

It is further preferable that in the vehicle planning support system of the present invention, percentage contribution data indicating the percentage contribution of vehicle constituent part models for each performance evaluation item be stored in the database, and that the layout validation model building section, when matching the border portions of each vehicle constituent part model, deform each of the vehicle constituent parts at the border portions based on the percentage contribution data. By thus giving priority to high percentage contribution parts based on percentage contribution data when making adjustments, shape compatibility can obtained while as much as possible maintaining performance.

It is further preferable in the vehicle planning support system of the present invention that the layout validation model building section permit positional contacts between vehicle constituent part models within a predetermined tolerance range at the border portions of vehicle constituent part models. Vehicle model building can be more efficiently implemented by thus allowing some degree of interference or the like between positions.

In order to achieve the above object, the vehicle planning support system of the present invention is a vehicle planning support system which supports vehicle planning by building vehicle planning models for the vehicle being planned, comprising a database storing vehicle data for building planned vehicle models, and a computing device for building planned vehicle models using the vehicle data stored in the database, whereby data stored in the database includes performance evaluation values quantifying vehicle performance evaluations for each of a predetermined evaluation items with respect to a plurality of existing vehicles, and change influence data correlating changes in vehicle constituent elements with fluctuations in performance evaluation values due to those changes in constituent elements, and the computing device comprises a target value setting section for setting target values for each of the evaluation items based on the distribution of performance evaluation values of at least a portion of the subject compared existing vehicles, a vehicle model building section for building reference vehicle models based on vehicle data for the vehicle selected from among the existing vehicles, which builds planned vehicle models in which constituent elements of the reference vehicle model are changed, a performance computing section for computing performance evaluation values for each of the evaluation items with respect to the reference vehicle models, correcting performance evaluation values for planned vehicle models in which constituent elements of the reference model have been changed based on the change influence data, a degree-of-completeness computing section for obtaining a target degree-of-completeness by comparing target values of each of the evaluation items to performance evaluation values for the planned vehicle, and a technology presenting section which, when the target value for the evaluation items with respect to any of the planned vehicle models is not achieved, selects constituent element candidates to serve as alternatives for achieving target values from vehicle data stored in the database.

With this vehicle planning support system of the present invention, not only the form, but also the presumed performance of the planned vehicle can be validated in the planning stage. Moreover, planned vehicle models can be efficiently built by indicating constituent element candidates to serve as alternatives for achieving performance target values. The ease or difficulty of technology for eliminating the gap with respect to target values can be objectively judged, and a planned vehicle target value balance can be struck at a common sense level in light of technical levels, preventing backtracking after development in the planning stage, reducing new vehicle development time.

It is further preferable in the present invention that the technology presenting section select and present as constituent element candidates existing vehicle constituent elements having performance evaluation values which achieve target values for the evaluation items.

By so doing, cost, weight, and performance levels, for example, of alternative constituent elements can be clearly determined ahead of time by proposing technologies for existing vehicles whose performance is already known, thereby increasing work efficiency.

It is further preferable in the present invention that the technology presenting section present a performance evaluation value relational map for evaluation items when target values are not achieved for a plurality of evaluation items, and that it plot performance evaluation values on that relational map in cases where constituent element candidates are selected.

By so doing, an operator can, for example, select appropriate constituent elements while looking at trade off relationships for a plurality of evaluation items, hereby improving work efficiency.

It is further preferable in the present invention that the technology presenting section, in cases when performance evaluation values are used, exclude as candidate constituent elements those constituent elements exceeding target values by a predetermined value.

By so doing, the performance of the planned vehicle can made consistent with common understanding of technological levels.

It is further preferable in the present invention that ranking information indicating rankings determining the relative position in performance to be achieved by the planned vehicle with respect to a competitive group of vehicles be stored in the database for each of the evaluation items, that the target setting section of the computing device segment performance evaluation values into a plurality of ranges based on the distribution of the performance evaluation values for the subject compared existing vehicles with respect to each of the evaluation items, and that the technology presenting section select and present constituent element candidates which will have performance evaluation values within a range corresponding to the set ranks.

By so doing, it can be seen at a glance what degree of system is required to eliminate the gap between target values and performance evaluation values, thereby correlating the planned vehicle performance balance to the ranks set for each evaluation item.

It is further preferable in the present invention that when there are no existing vehicle constituent elements having performance evaluation values which achieve the target values included in the vehicle data, the technology presenting section output that message.

By so doing, an operator can be made aware of the need for new technical development, and the direction of development can be clarified.

In order to achieve the above object, the vehicle planning support system of the present invention is a vehicle planning support system which supports vehicle planning by building vehicle planning models for the vehicle being planned, comprising a database storing vehicle data for building planned vehicle models, and a computing device for building planned vehicle models using the vehicle data stored in the database, whereby data stored in the database includes performance evaluation values quantifying vehicle performance evaluations for each of a predetermined evaluation items with respect to a plurality of existing vehicles, and the computing device comprises a target value setting section for setting target values for each of the evaluation items based on the distribution of performance evaluation values of at least a portion of the subject compared existing vehicles, a vehicle model building section for building reference vehicle models based on vehicle data for the vehicle selected from among the existing vehicles, which builds planned vehicle models in which constituent elements of the reference vehicle model are changed, a performance computing section for computing performance evaluation values for each of the evaluation items with respect to the reference vehicle models, correcting performance evaluation values for planned vehicle models in which constituent elements of the reference model have been changed based on the change influence data, a degree-of-completeness computing section for obtaining a target degree-of-completeness by comparing target values and the planned vehicle performance evaluation values for each of the evaluation items, and a performance display section which causes performance evaluation values for each of the evaluation items to be displayed on a high level radar chart, and converts a plurality of related technology items for each of the evaluation items into points, causing them to be displayed on a low level radar chart, whereby the high level radar chart performance evaluation values and low level radar chart point count vary in tandem, and past data correlating changes in the low level radar chart technical item point count for past vehicle plans with changes caused thereby in high level radar chart evaluation item performance evaluation values is stored in the database, while the performance display section selects and presents from the past data which matches the differential between performance evaluation values and target values for that evaluation item.

With this vehicle planning support system of the present invention, not only the form, but also the presumed performance of the planned vehicle can be validated in the planning stage. Moreover, by displaying performance evaluation values on a radar chart for each evaluation item, performance balance can be shown, and selections can be made and displayed from past data in order to eliminate the gap between performance evaluation values and target values. The ease or difficulty of technology for eliminating gaps with respect to target values can be objectively judged, and a reasonable planned vehicle target value balance can be achieved in light of technology levels, preventing backtracking after development in the planning stage, thus enabling a reduction in new vehicle development time.

It is further preferable in the present invention that the performance display section further select the selected past data according to separate selection criteria. By so doing, order can also be assigned and a sequence established from within combinations of changes in technology items, filtering in such a way that the effects on cost, weight, or specific evaluation items, for example, are minimized.

It is further preferable in the present invention that the performance display section make selections based on cost and/or vehicle weight as separate selection criteria. This enables efficient selection of technology items for eliminating gaps between performance evaluation values and target values.

In order to achieve the above object, the vehicle planning support system of the present invention is a vehicle planning support system which supports vehicle planning by building models, having a database for storing vehicle data for building vehicle models, and a computing device utilizing vehicle data stored in the database to build planned vehicle models for the vehicle being planned, wherein performance evaluation values for quantifying performance evaluations of the vehicle with respect to each of a predetermined evaluation items are included in vehicle data stored in the database for a plurality of existing vehicles, and the computing device comprises a target value setting section for setting target values for each of the evaluation items based on the distribution of performance evaluation values of at least a portion of the subject compared existing vehicles, a vehicle model building section for building reference vehicle models based on vehicle data for the vehicle selected from among the existing vehicles, which builds planned vehicle models in which constituent elements of the reference vehicle model are changed, a performance computing section for computing performance evaluation values for each of the evaluation items with respect to the reference vehicle models, correcting performance evaluation values for planned vehicle models in which constituent elements of the reference model have been changed based on the change influence data, and a degree-of-completeness computing section for obtaining a target degree-of-completeness by comparing target values of each of the evaluation items to performance evaluation values for the planned vehicle.

With this vehicle planning support system of the present invention, not only the form, but also the presumed performance of the planned vehicle can be validated in the planning stage. Moreover, performance balance is depicted by displaying performance evaluation values on a radar chart for each evaluation item. The ease or difficulty of technology for eliminating gaps with respect to target values can be objectively judged, and a reasonable planned vehicle target value balance can be achieved in light of technology levels, preventing backtracking after development in the planning stage, thus enabling a reduction in new vehicle development time.

It is further preferable in the present invention for change effect data correlating changes in performance evaluation values for high level radar chart evaluation items with changes in low level radar chart technology item point count caused thereby to be stored in the database, and for the performance display section to change the balance in the high level radar chart performance evaluation values in tandem with changes in the high level radar chart point count balance when that is changed.

By so doing, performance evaluation points for each vehicle evaluation item in the high level radar chart will be added to or subtracted from when a low level radar chart technology item is adjusted, so that the planned vehicle performance balance will be displayed, thus enabling greater work efficiency.

It is further preferable in the present invention when the high level radar chart performance evaluation value balance is changed for the performance display section to change the balance in the low level radar chart technology item point count, in tandem with that change.

When the radar chart performance evaluation point balance is changed, there may be several different ways to change the low level radar chart technology item point count, but order can also be assigned and a sequence established from within combinations of changes in technology items using, for example, reference points such as which combinations have the small effect on cost, weight, or specific evaluation items as filter criteria.

It is further preferable in the present invention for correlation data correlating customer satisfaction with performance evaluation values for each of the evaluation items to be stored in the database, and for the performance display section to display customer satisfaction for each evaluation item along with the high level radar chart, based on the correlation data.

By so doing, performance balance can be adjusted with customer satisfaction in mind.

BRIEF DESCRIPTION OF THE DRAWINGS

FIG. 4 is a diagram depicting an example of performance evaluation values for each vehicle data evaluation item.

FIG. 14 is a diagram depicting the hierarchical structure of a performance validation model of the present embodiment.

FIG. 17A is a chart depicting target completion range (rank) for each vehicle evaluation item.

FIG. 17B is a chart depicting evaluation point distribution and range for a benchmark vehicle.

FIG. 20A is a flowchart depicting detailed processing in S2 (Step 2) of the FIG. 15 flowchart.

FIG. 20B is a diagram depicting a display example of a setting of reference vehicle.

FIG. 21 is a diagram depicting a performance validation model reference vehicle model.

FIG. 22 is a chart showing the percentage contribution of each area of a performance validation model to each vehicle evaluation item.

The chart shows the percentage contribution of the vehicle model part for each valuation item.

FIG. 23 is a chart showing the percentage contribution of each area relating to the performance of the performance validation model.

Figures 24, 25A, 25B:
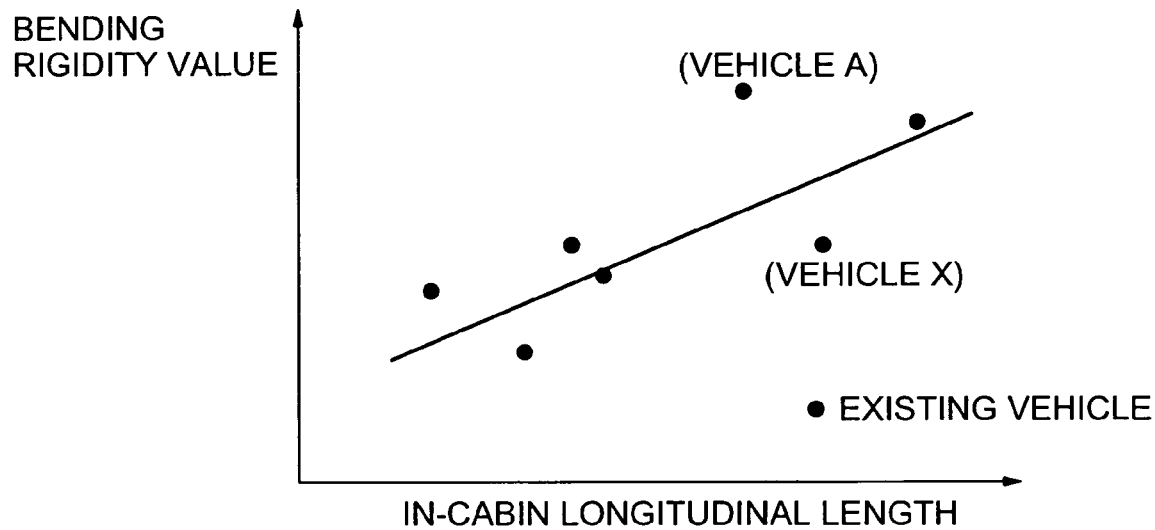

FIG. 24 is a graph depicting the relationship between in-cabin longitudinal length and bending rigidity.

Figure 15:
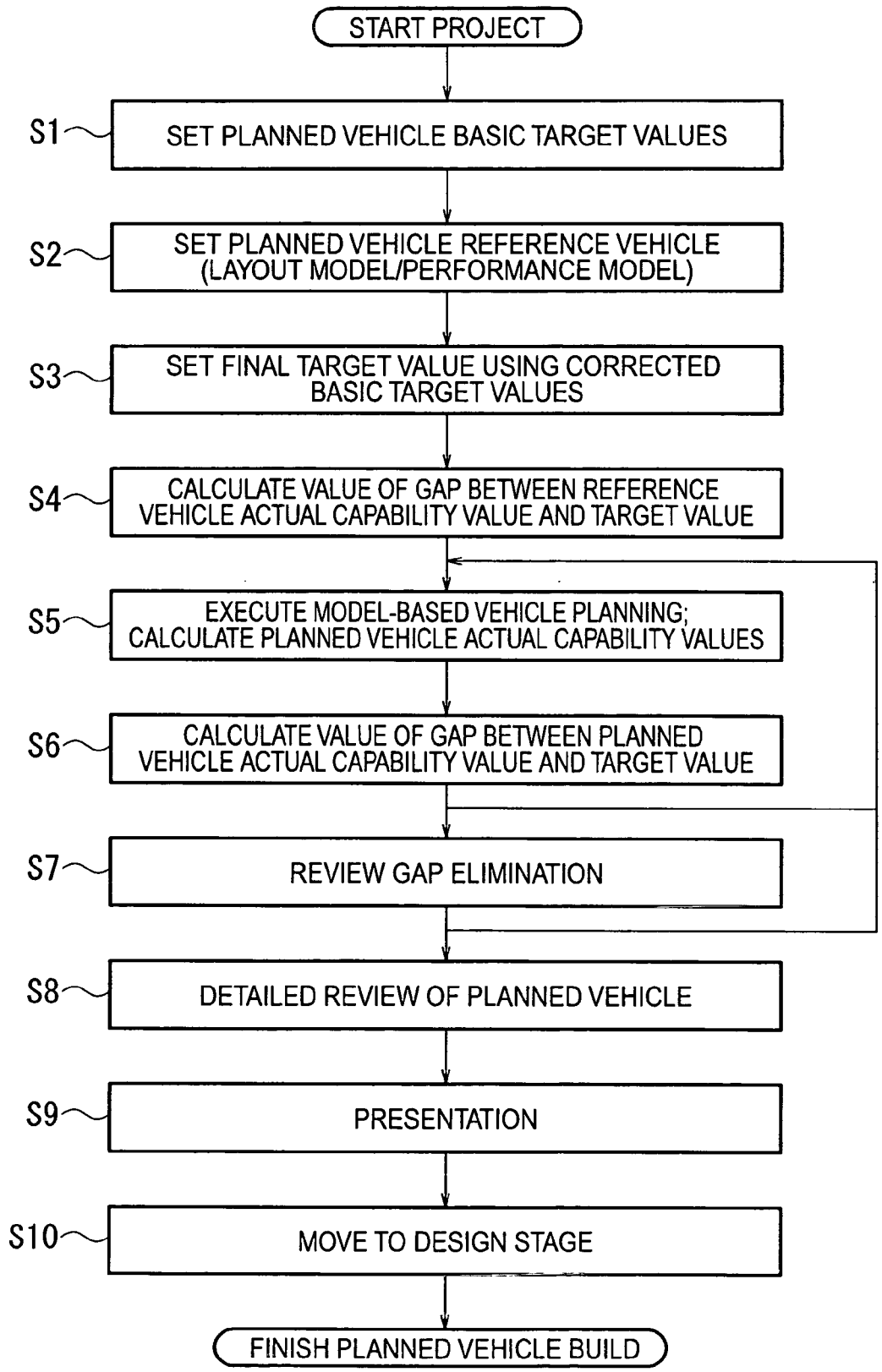
FIG. 15 is an abbreviated vehicle planning flow chart.

FIG. 25A is a block diagram showing detailed processing in S3 (Step 3) of the FIG. 15 flowchart.

FIG. 25B is a diagram depicting a target value display example after correction.

Figure 26:
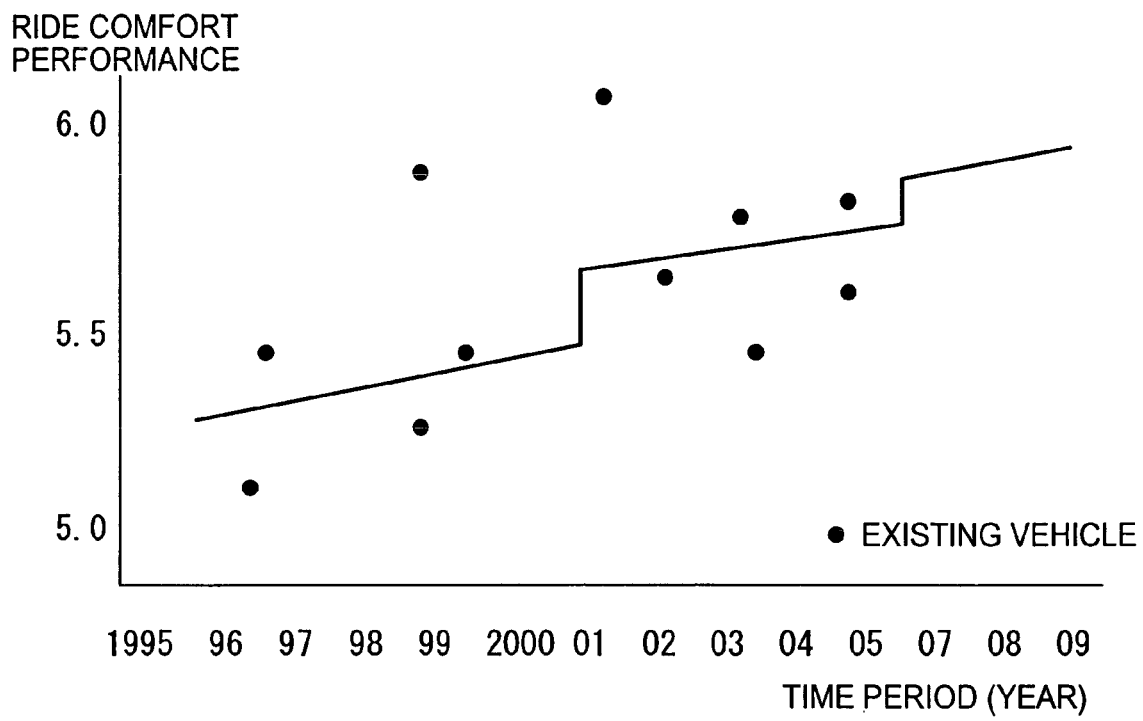

FIG. 26 is a graph depicting the correlation between ride comfort performance and time period for vehicle evaluation items.

Figure 27:
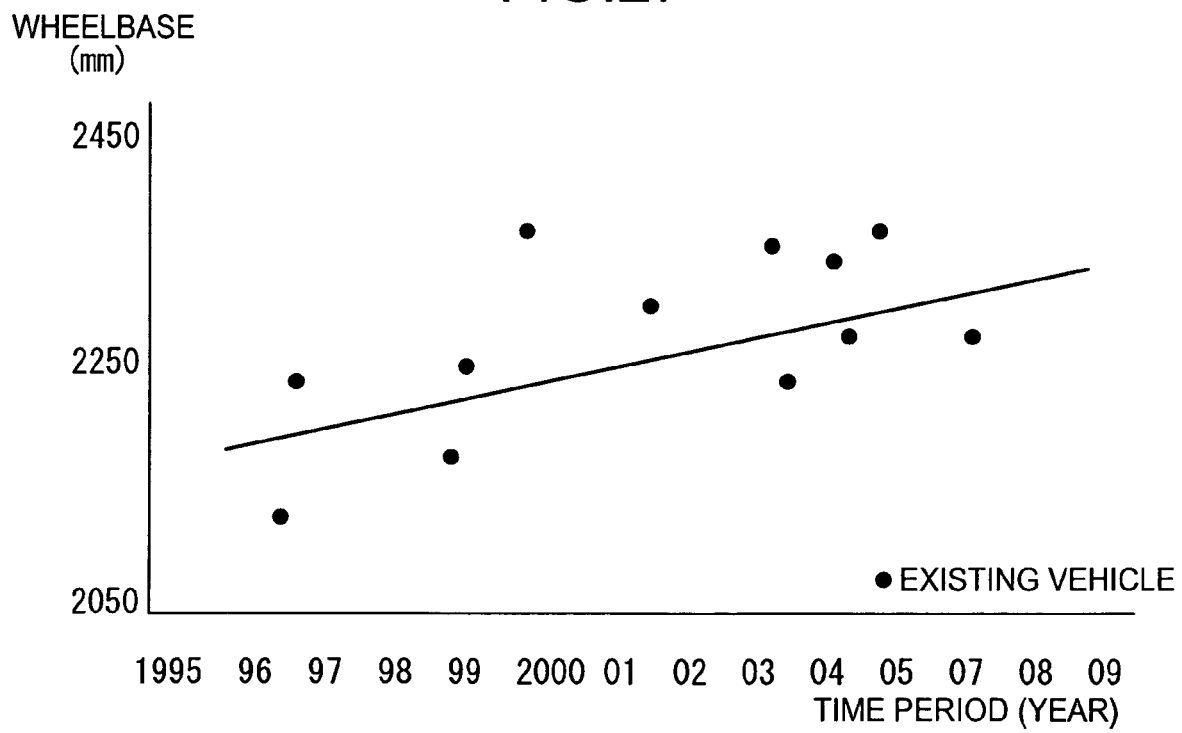

FIG. 27 is a graph depicting the correlation between wheelbase specification and time period (year).

Figure 28A:
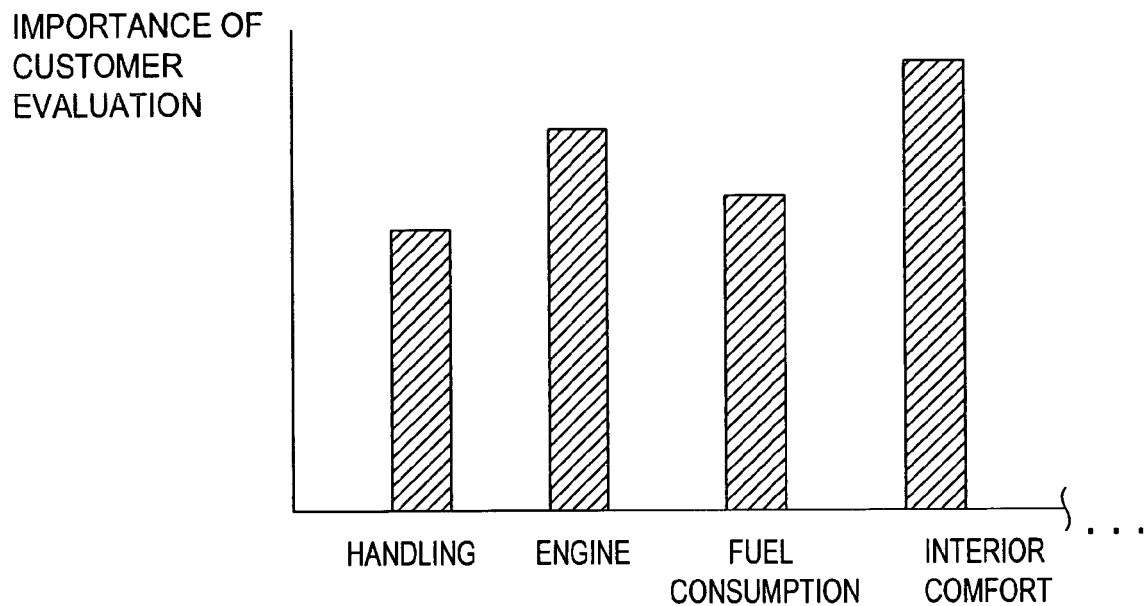

FIG. 28A is a graph relating to customer evaluation index points.

Figure 28B:
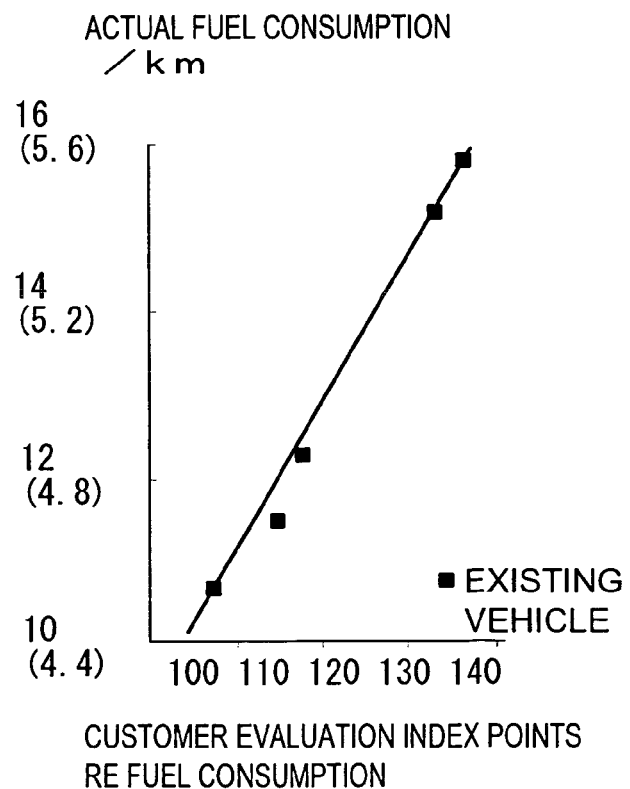

FIG. 28B is a graph depicting the relationship between customer evaluation index points and fuel consumption performance with respect to fuel consumption.

FIG. 29A is a block diagram depicting detailed processing in S4 (Step 4) of the FIG. 15 flowchart.

FIG. 29B is a diagram depicting a display example of the gap value between performance evaluation values and basic target values by vehicle evaluation item for the planned vehicle model.

Figure 30:
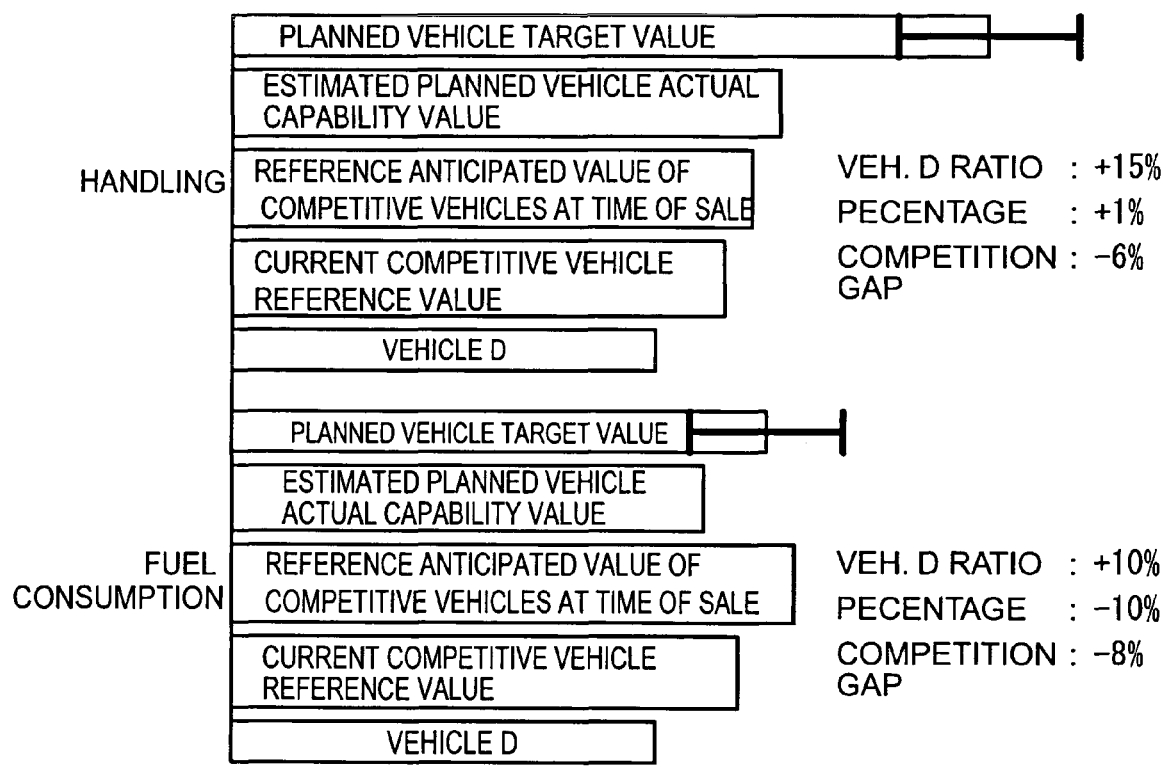

FIG. 30 is a bar graph depicting performance evaluation value examples of planned vehicle target values, planned vehicle estimated actual values, reference estimated values for competitive vehicles at the time of sale, current competitive company reference values, and reference vehicles (Vehicle D), respectively, with respect to fuel consumption.

Figure 31:
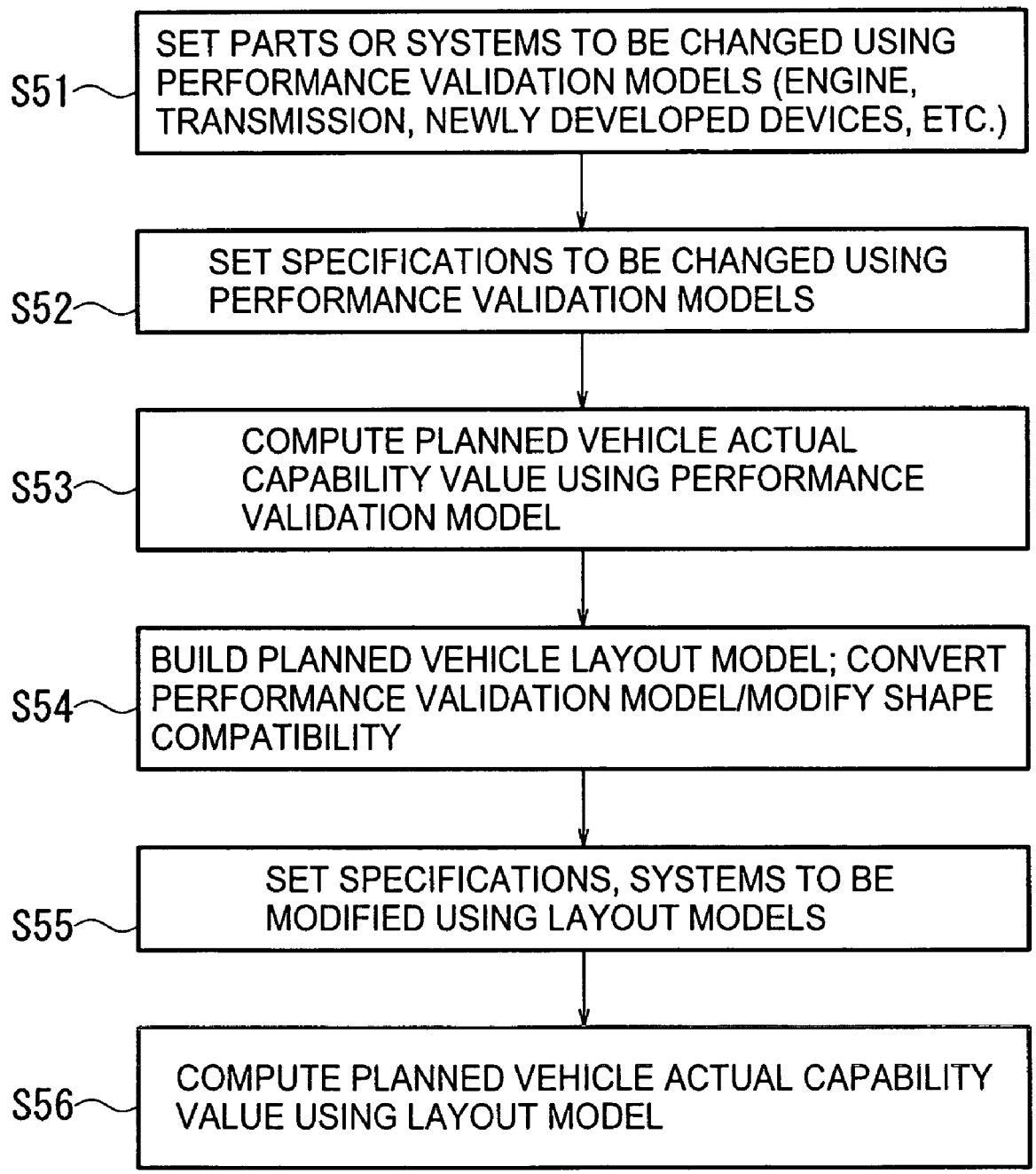

FIG. 31 is a flowchart depicting detailed processing in S5 (Step 5) of the FIG. 15 flowchart.

Figure 32A:
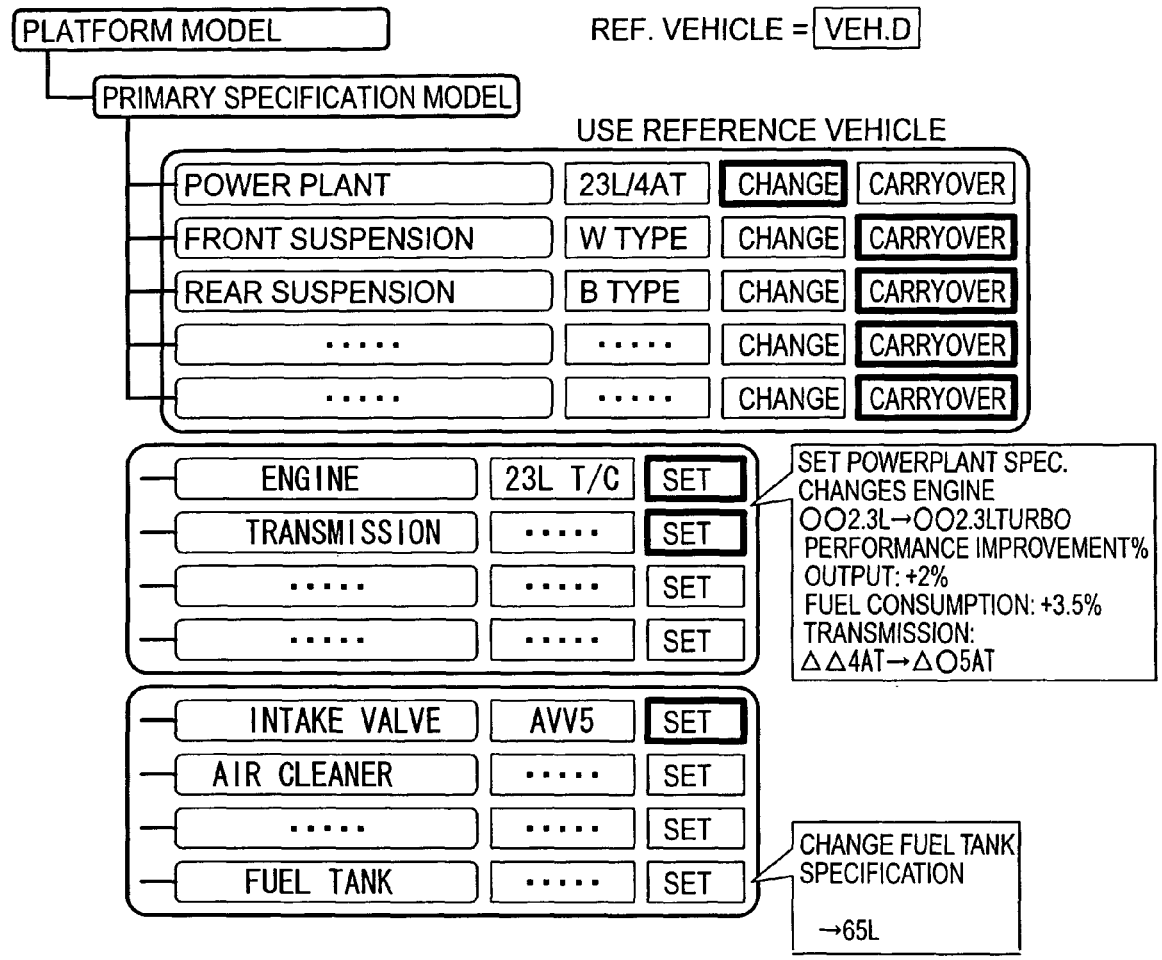

FIG. 32A is a diagram depicting an example of parts/units and performance setting/changing screens in a performance validation model.

Figure 32B:
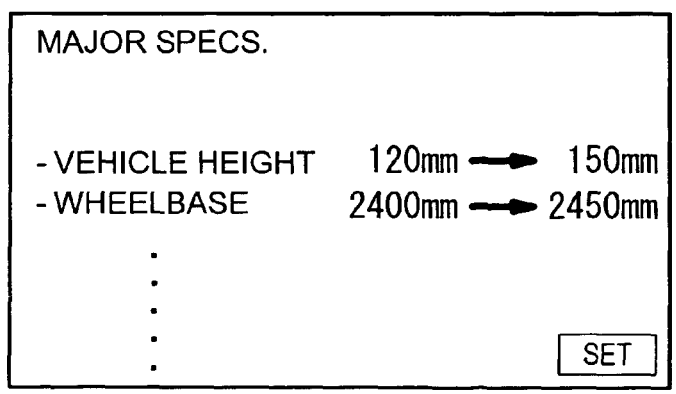

FIG. 32B is a diagram depicting an example of a screen for changing specifications in a performance validation model.

FIG. 33 is a chart showing an influence index for each vehicle evaluation item.

FIG. 34 is a chart showing the correspondence between specifications and vehicle evaluation items.

FIG. 35A is a chart showing the correlation of suspension specifications and performance to vehicle evaluation items.

FIG. 35B is a chart showing the correlation of engine specifications and performance to vehicle evaluation items.

Figure 36A:
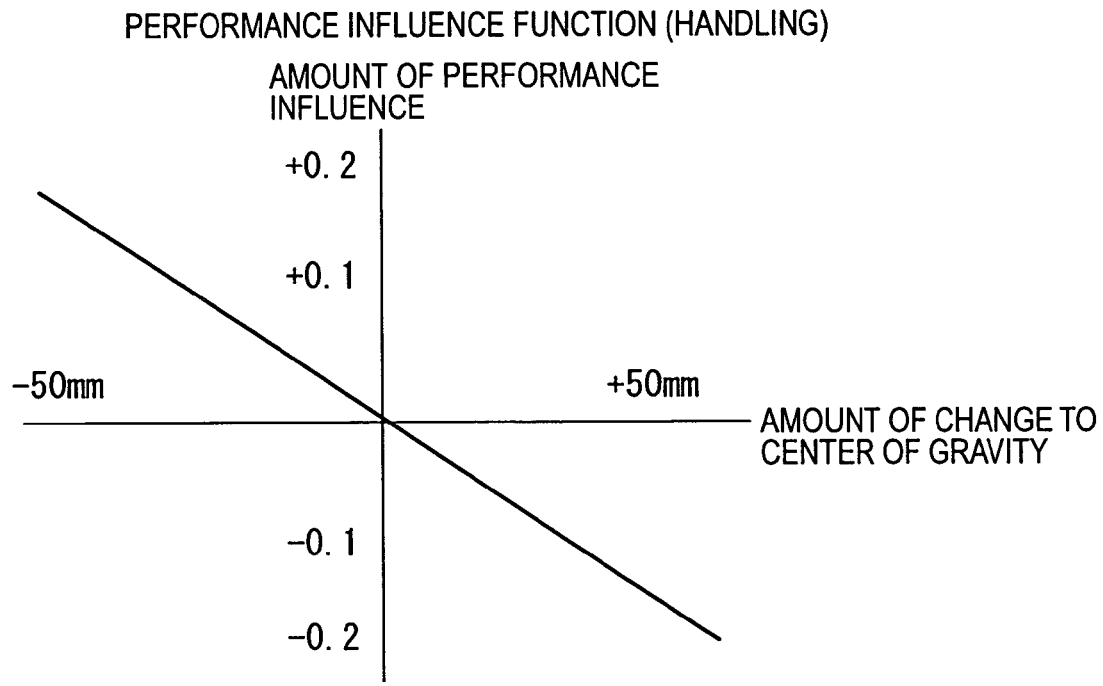

FIG. 36A is a graph showing an example of a performance effect function.

Figure 36B:
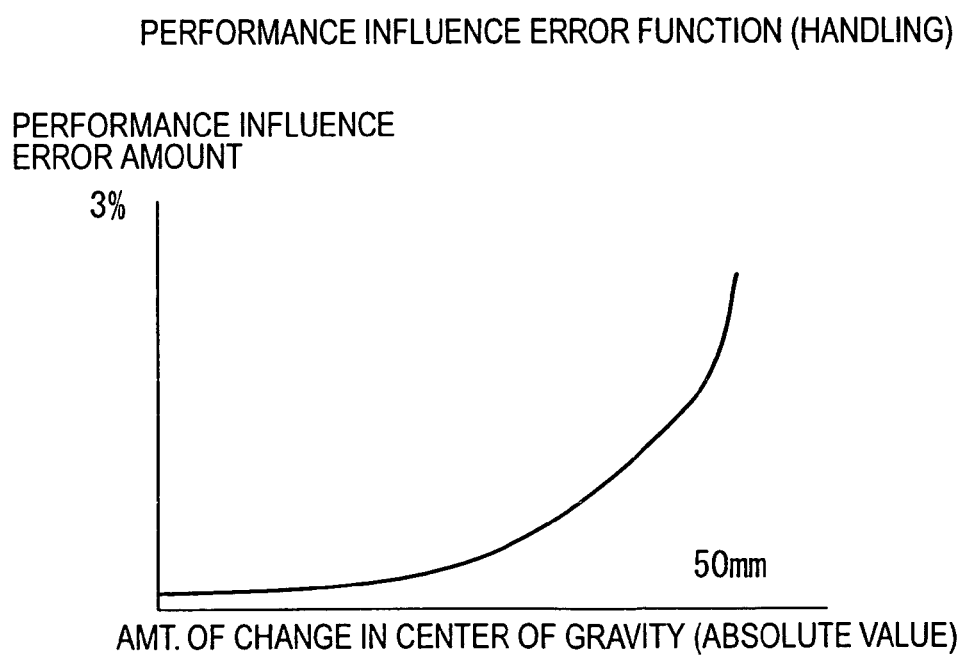

FIG. 36B is a graph showing an example of a performance effect error function.

FIG. 37A is a block diagram depicting detailed processing in S7 (Step 7) of the FIG. 15 flowchart.

FIG. 37B is a diagram depicting a display example of the gap value between performance evaluation values and post-correction target values by planned vehicle model vehicle evaluation item.

Figure 38:
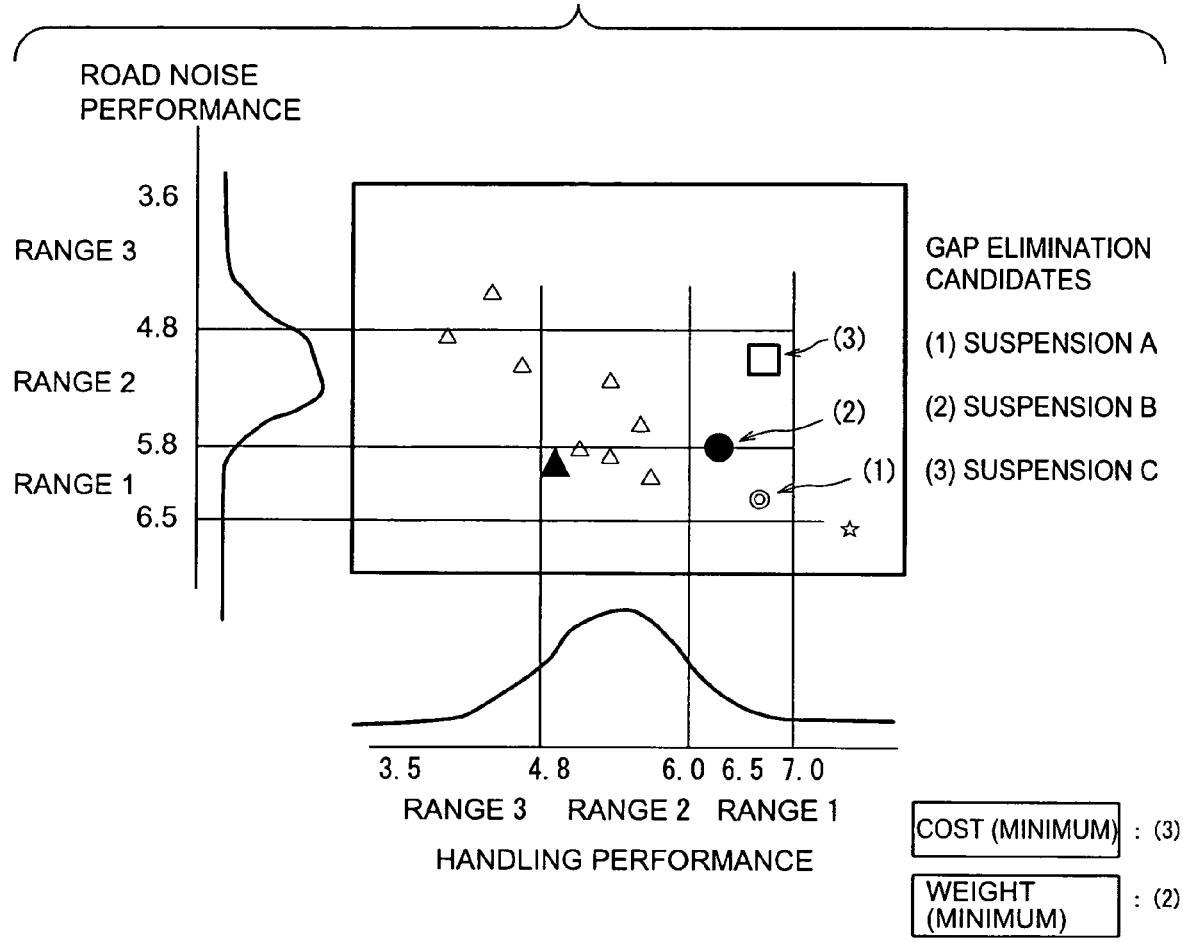

FIG. 38 is a diagram depicting an example of an inversely related map.

Figure 39:
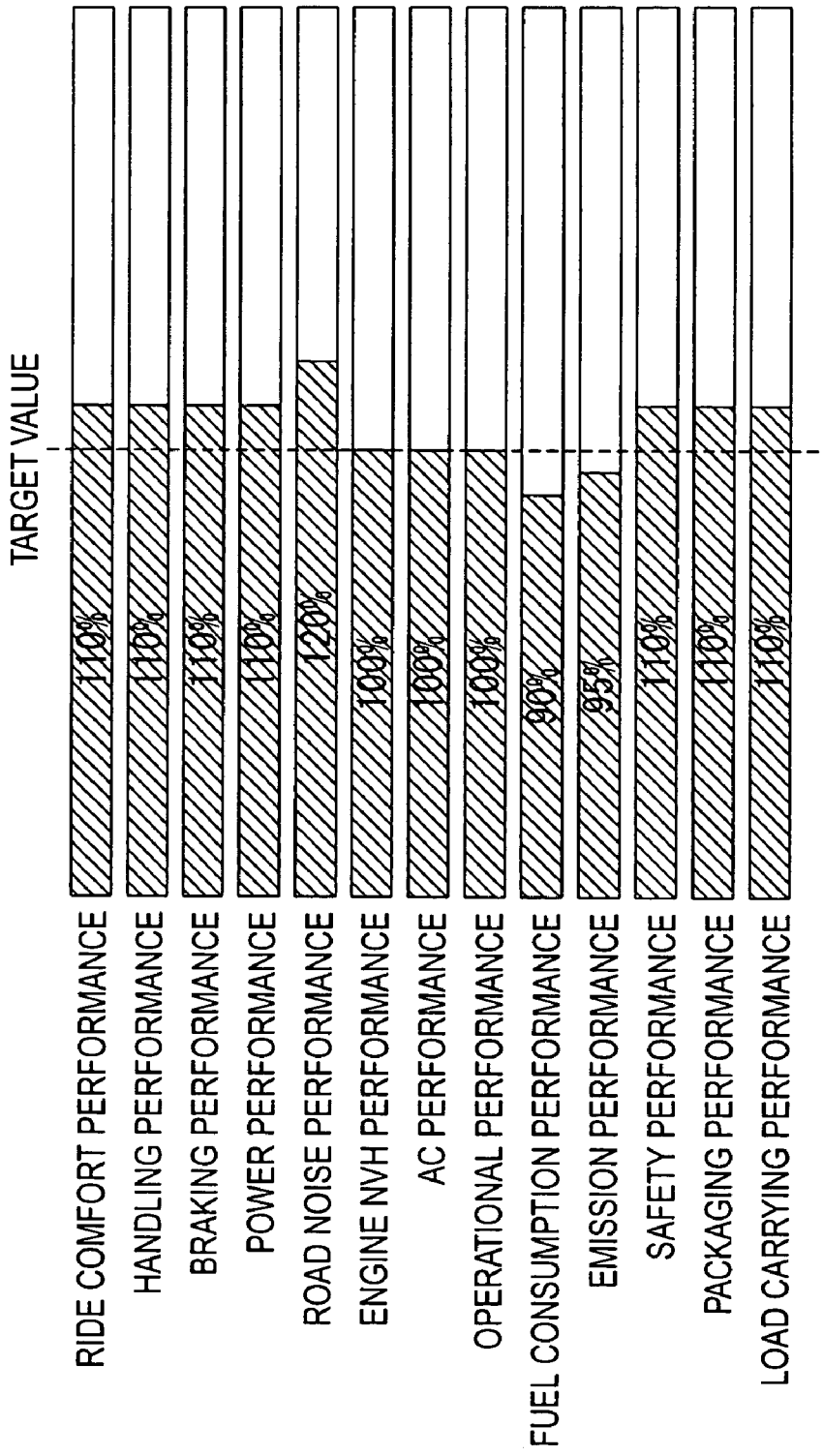

FIG. 39 is a bar graph showing the actual capability value for each vehicle evaluation item with respect to the final target values (S4, S7) set according to target value completion range.

Figure 40:
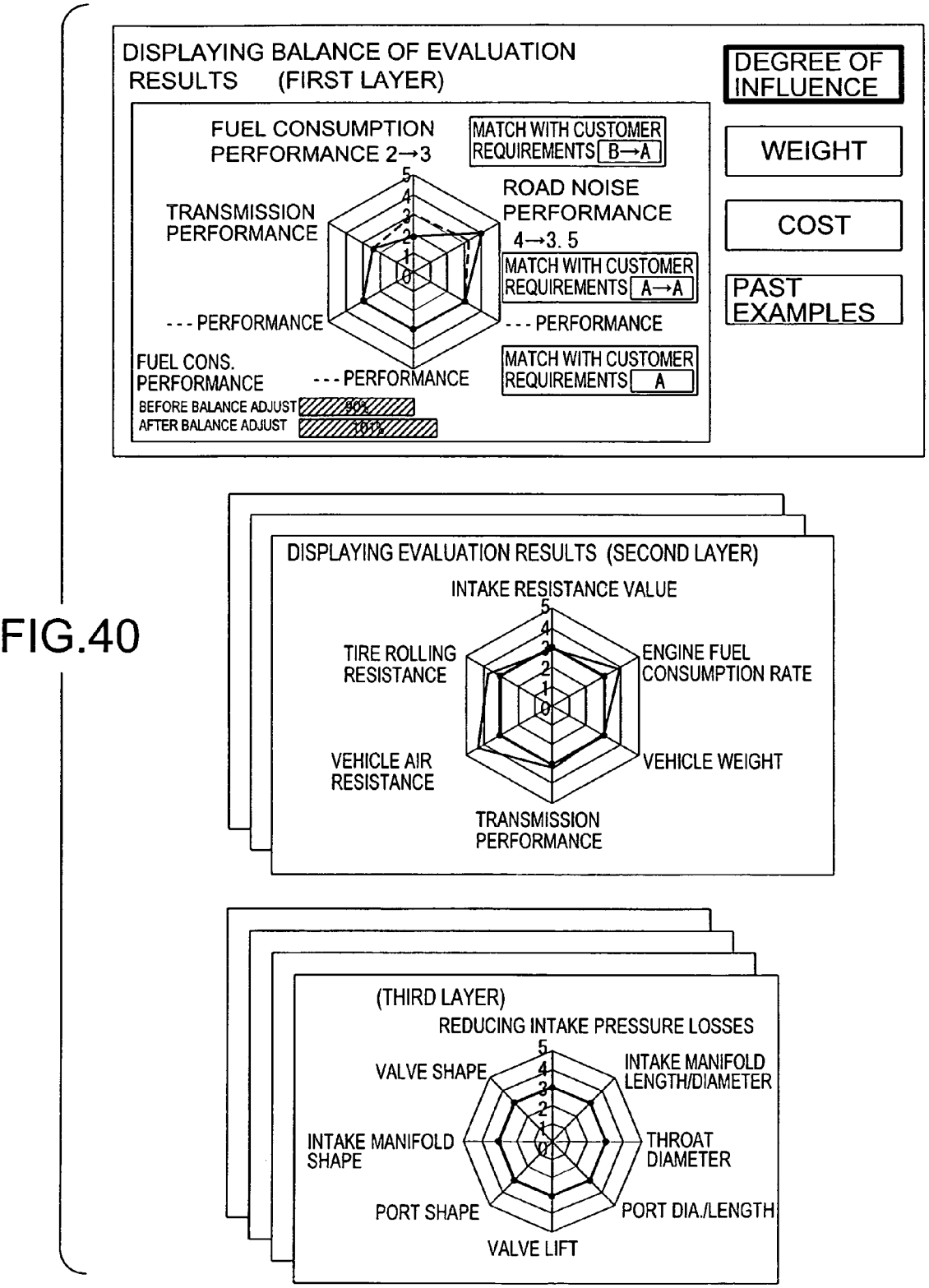

FIG. 40 is an example of a radar chart.

FIG. 41 is an example of a radar chart.

FIG. 42 is a chart depicting an example of past data relating to a vehicle planned in the past using this system.

Figure 43:
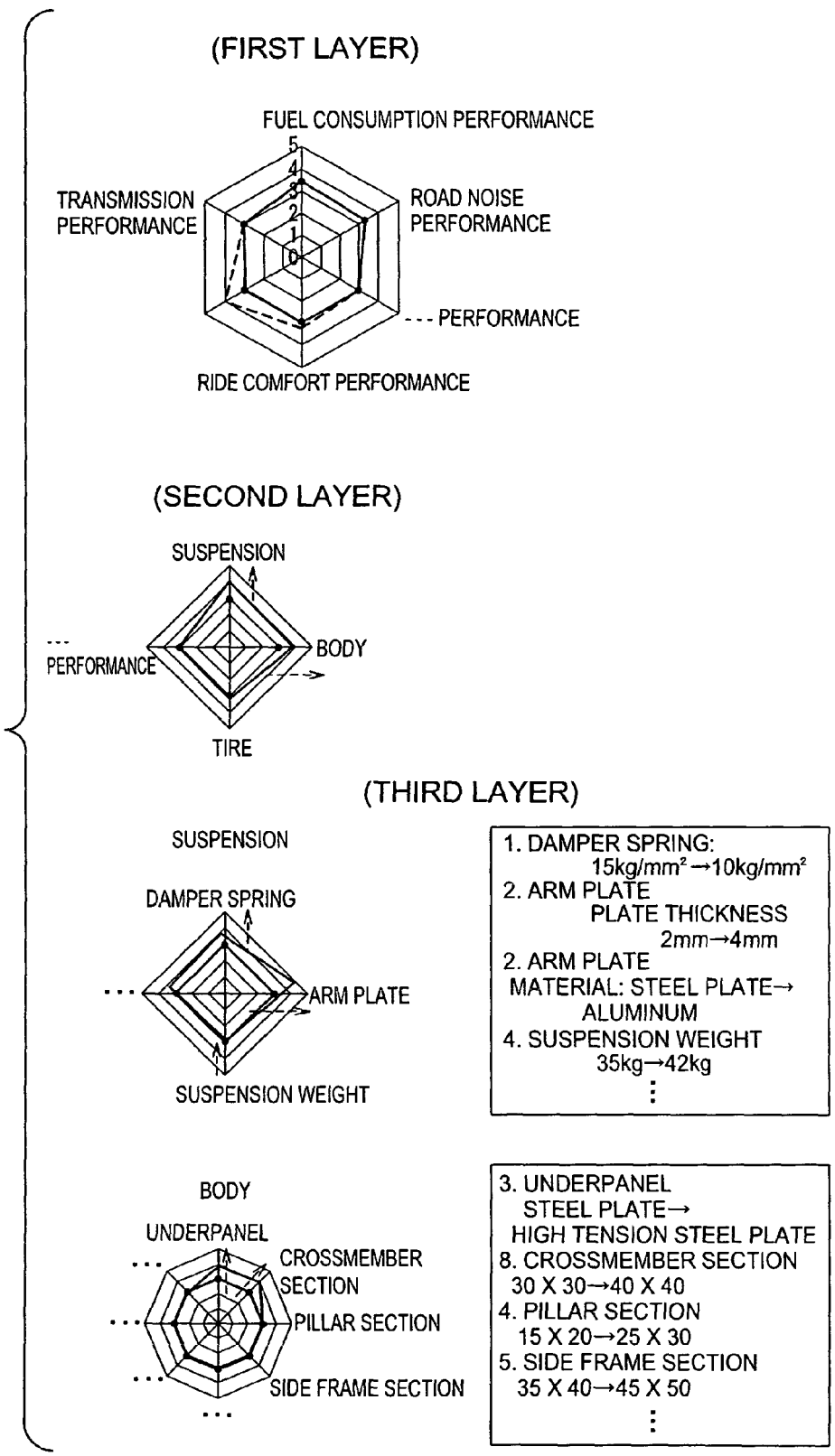

FIG. 43 is an example of a radar chart.

Figures 44, 45:
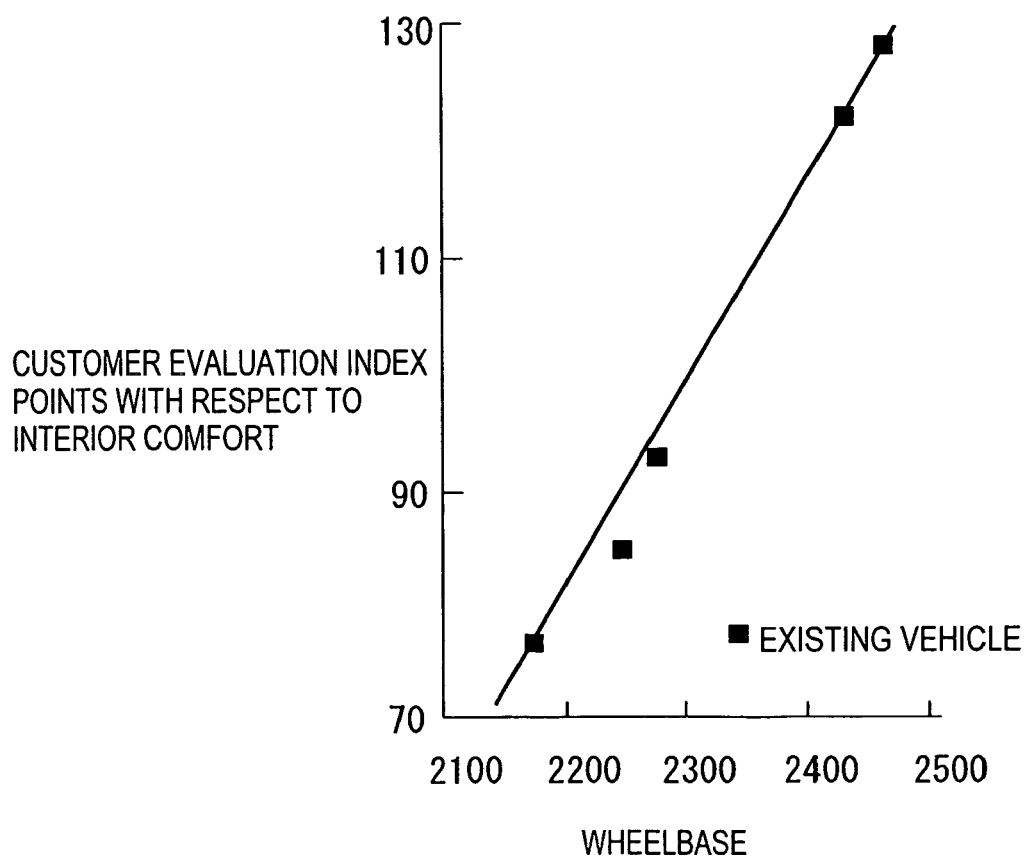

FIG. 44 is a chart depicting an example of conformance to customer requirements.

FIG. 45 is a graph depicting the relationship between a customer evaluation index and vehicle evaluation items.

Figure 46:
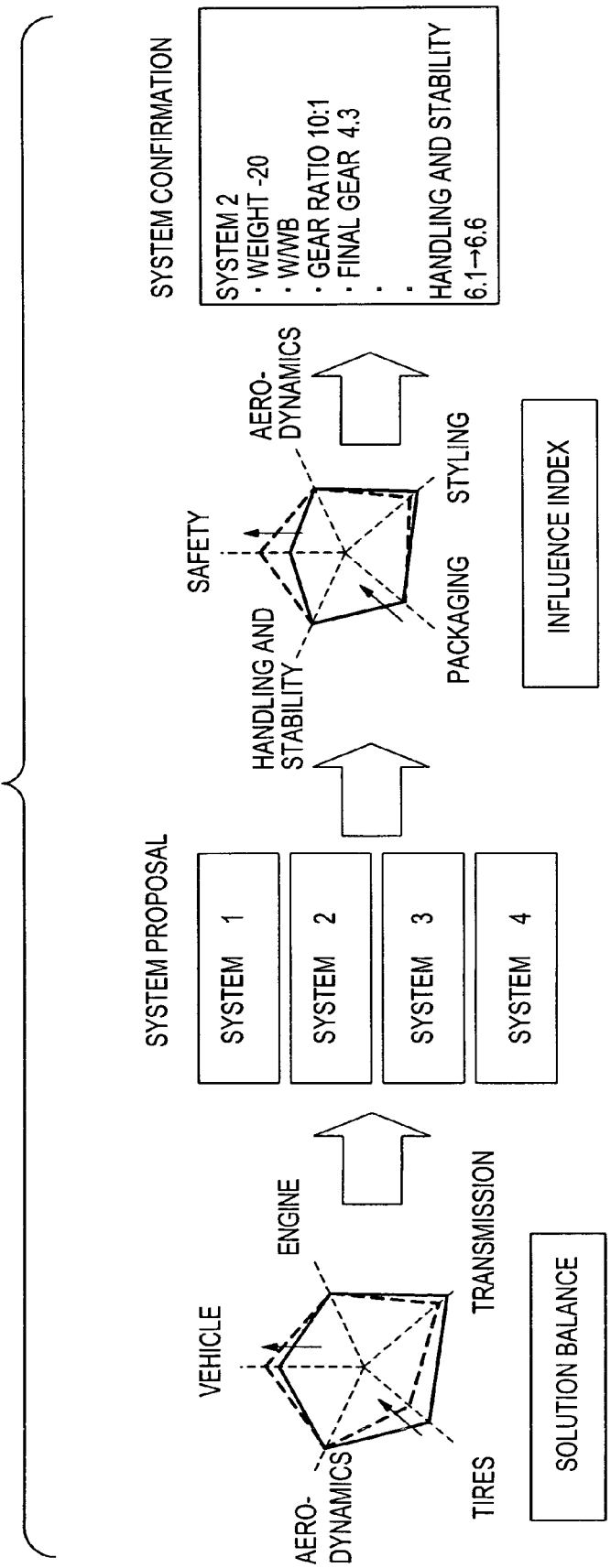

FIG. 46 is an example of a radar chart.

FIG. 47 is a chart depicting an example of a combination of unit selections.

DESCRIPTION OF THE PREFERRED EMBODIMENTS

Below we explain embodiments of the present invention with reference to the attached figures.

Figure 1:
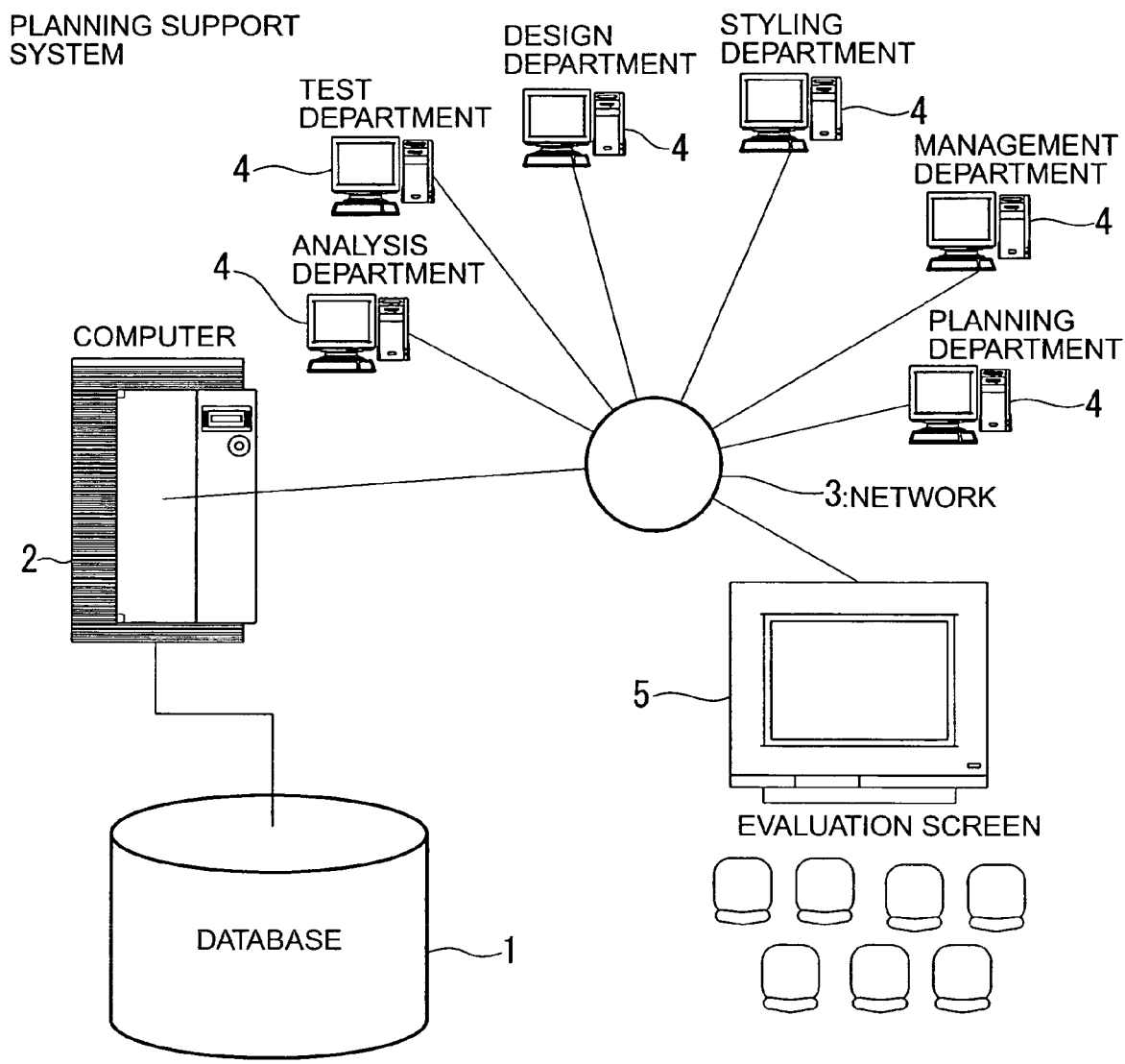
FIG. 1 is a block diagram depicting a configuration for effecting the vehicle planning support system of the present embodiment.

First, referring to FIG. 1, we explain a structure used to implement the vehicle planning support system of the present embodiment.

As depicted in FIG. 1, the vehicle planning support system of the present embodiment has a database 1 for storing vehicle data used to construct vehicle models, and a computer 2 which functions as a computing device for constructing planned vehicle models for the vehicle being planned.

The computer 2 is connected via a network 3 to terminals 4 in a planning department, a management department, a styling department, a design department, a test department, and an analysis department. The computer 2 is also connected via the network 3 to an evaluation screen 5. This permits many people, including an operator, to simultaneously evaluate the planned vehicle on the evaluation screen 5.

A target value setting section, a performance computing section, and a degree-of-completeness computing section in the planning support system of the present invention each corresponds to processing functions in the computer 2. These processing functions are implemented by the execution of programs in the computer 2.

Data stored in the database 1 is the data stored after the test department, the styling department, the design department, and the like have gathered such data according to uniform criteria. The planning support system presupposes the storage of such data according to uniform criteria.

Figure 2:
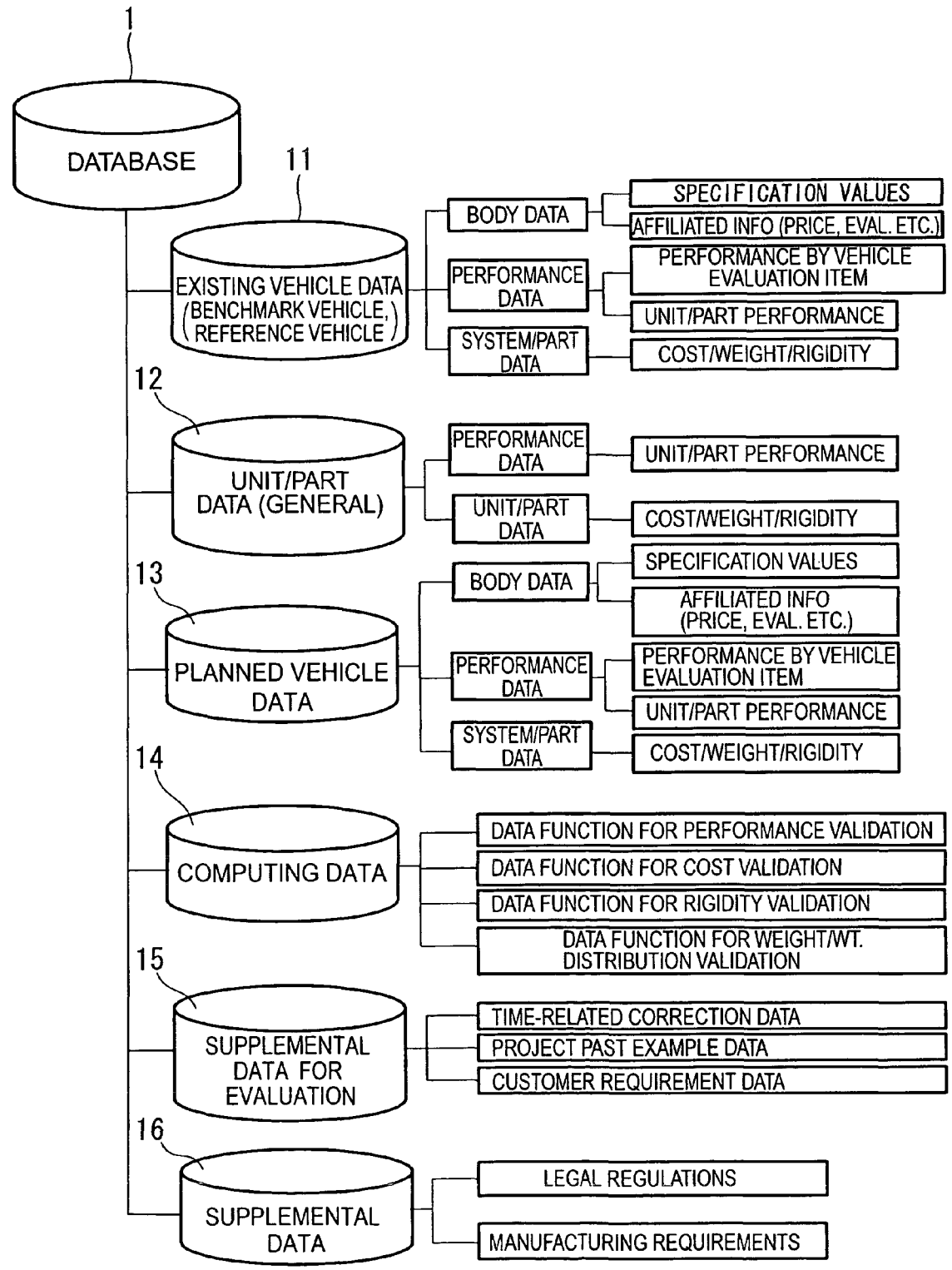
FIG. 2 is a diagram depicting a database configuration.

As depicted in FIG. 2, the database 1 includes existing vehicle data 11, unit/part data 12, planned vehicle data 13, computation data 14, supplemental evaluation data 15, and supplemental data 16.

First we explain existing vehicle data 11.

Data obtained based on uniform criteria (existing vehicle data) for virtually all past vehicles is stored in the database 1. Existing vehicle data includes body data, performance data, and unit/part data.

Figure 3:
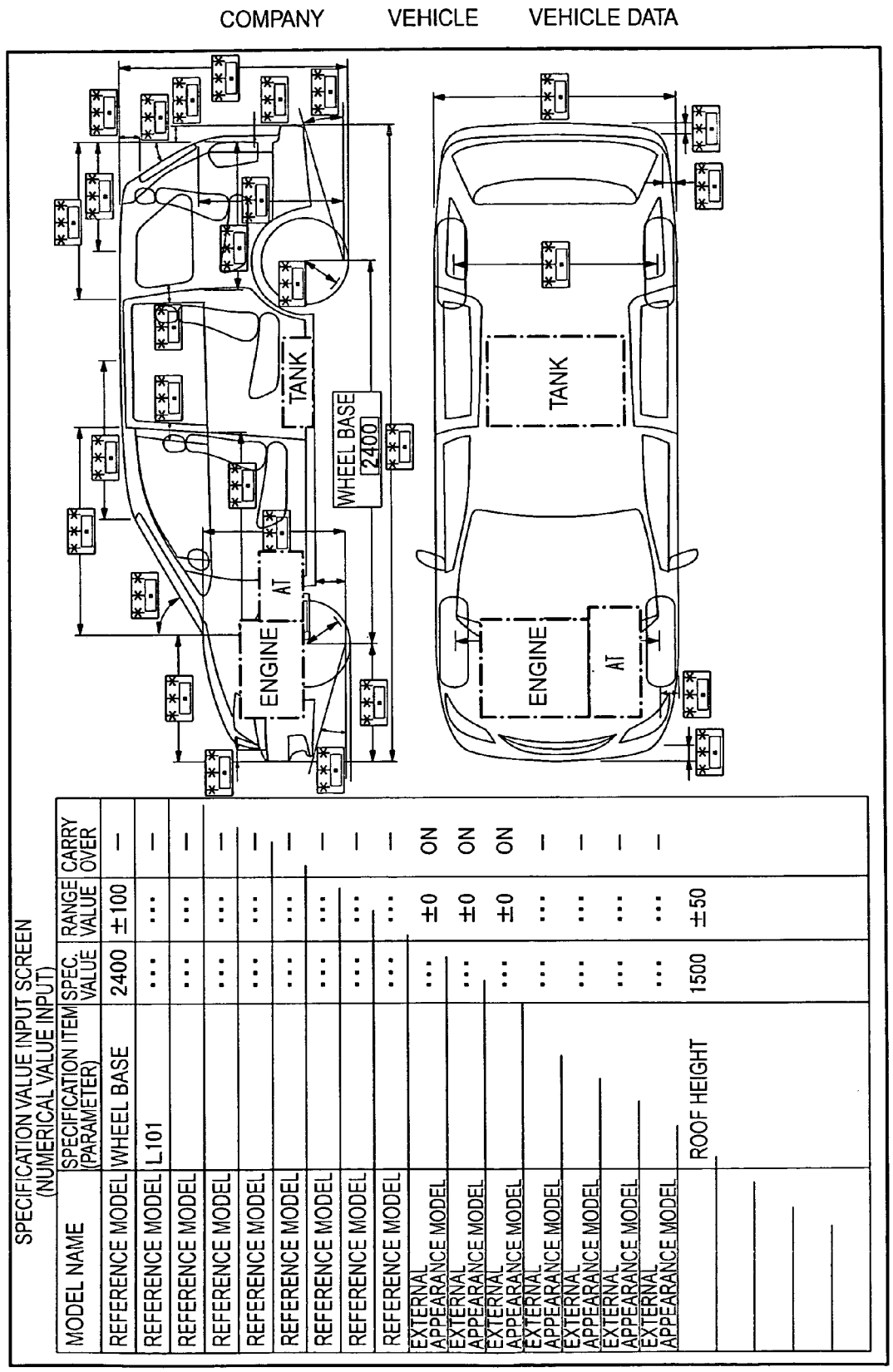
FIG. 3 is a diagram depicting an example of vehicle data specification values.

Body data includes specification values, associated information, and performance data. Specification values, as depicted in FIG. 3, express as numerical values such items as total length, wheelbase, horsepower, and the like for existing vehicles. Associated information refers to items such as price and customer evaluation index points. For example, this could be a conversion of satisfaction with engine performance into index points based on predetermined criteria.

Note that existing vehicle data also includes, for example, data for the model immediately prior to the vehicle being planned (old model). As described below, a baseline vehicle or benchmark vehicle (competitor vehicle) is selected from this existing vehicle data. An old model of the vehicle being planned can also be selected as a benchmark vehicle.

Performance data also includes vehicle performance by vehicle evaluation item as well as performance of units/parts used in the existing vehicle.

Performance by vehicle evaluation item includes performance evaluation values which quantify performance evaluations for each of a predetermined of evaluation items with respect to a plurality of existing vehicles. In other words, it includes evaluation points ratings for items defined with respect to vehicle performance (vehicle evaluation items).

Evaluation items here are predetermined for each vehicle performance item. In the FIG. 4 example, more than ten items such as handling performance and fuel economy are listed. Performance evaluation values for each of the evaluation items consist of objective data (evaluation points) obtained by common test methods and criteria for each of the existing vehicles. For example, data obtained from acceleration testing or slalom testing performed according to predetermined criteria are converted into fixed criteria evaluation points. These evaluation points are stored for each existing vehicle as existing vehicle data in the database. This permits relative comparisons between vehicles.

Unit/part performance includes data unit performance data and part performance data. Here, "unit" refers in a suspension, for example, to subassemblies such as an arm (part) or joint (part). Unit performance data includes items such as horsepower, gear ratio, or lever ratio for engines, transmissions, or suspensions mounted in each vehicle, or air conditioning performance and the like. Part performance data includes performance indicating data such as rolling resistance values or rigidity values for tires, suspension arms, joints thereof, and the like.

Figure 5:
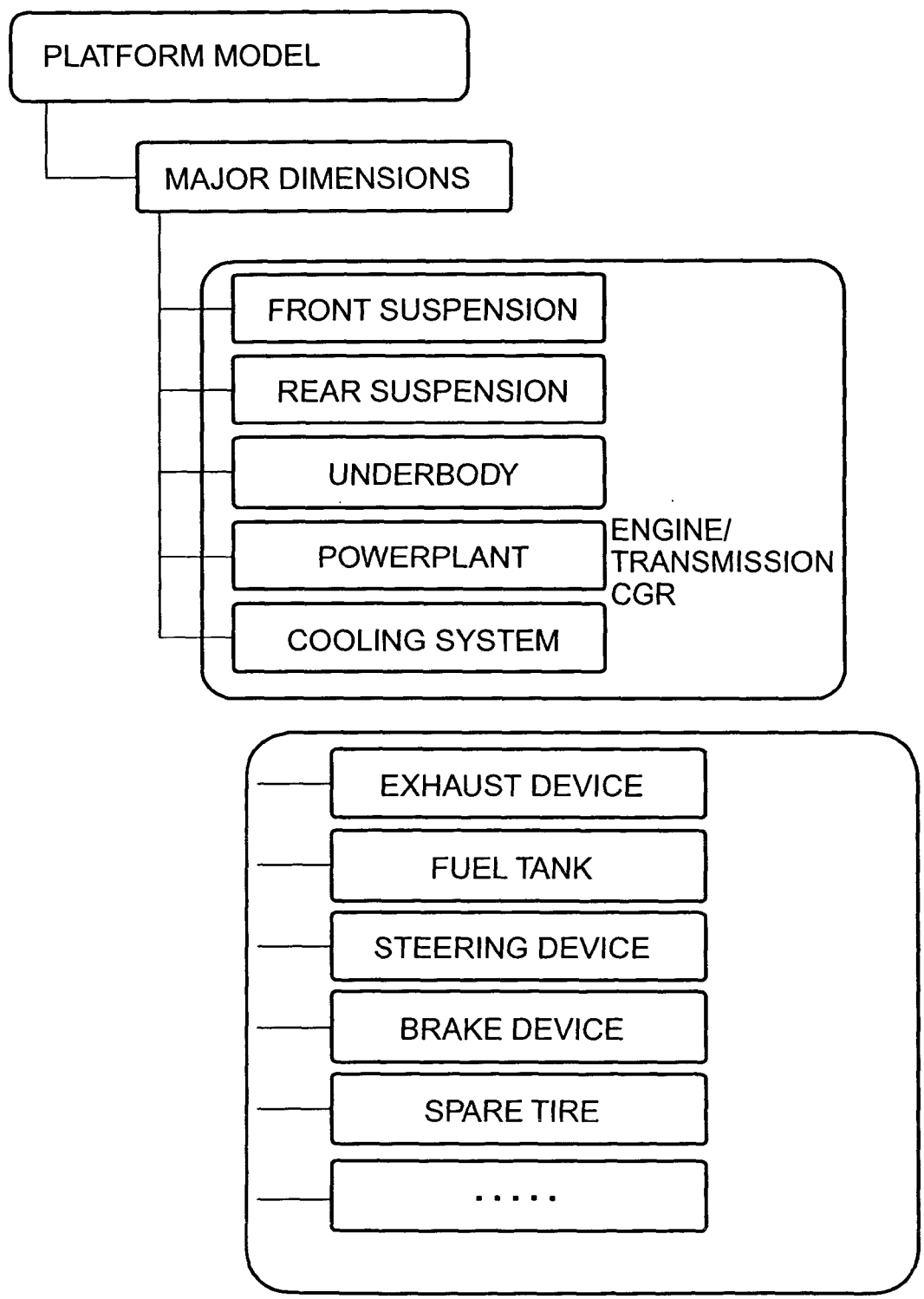
FIG. 5 is a diagram depicting an example of the hierarchical structure of unit and part data within vehicle data.

Unit/part data includes data for unit cost, weight, rigidity, and the like with respect to all systems and parts in the existing vehicle. As depicted in FIG. 5, for example, the unit/part data has a hierarchical structure.

Next we explain the database 1 unit/part data (general) 12.

Unit/part data (general) 12 includes data relating to new items which are not installed on existing vehicles, such as new technology products, four wheel drive systems, and automatic transmissions, including those of other manufacturers.

Next we explain the planned vehicle data 13 in the database 1.

The planned vehicle data 13 stores data relating to the planned vehicle currently in planning. When planning is completed, this data is stored within existing vehicle data.

Next we explain computation data 14 in the database 1.

The computation data 14 includes performance validation data functions, cost validation data functions, rigidity verification data functions, and weight and weight distribution validation data functions.

The performance validation data function stores influence functions and performance influence error functions, which define the degree of influence of vehicle evaluation item "evaluation points" with respect to the degree of adjustments made to system performance and the like. This function does not calculate an absolute performance evaluation value, but rather uses a function to define a degree of rise or fall with respect to the degree of adjustment. It creates this function based on data obtained in past development or testing, or based on given criteria. It is desirable that this data be updated daily to increase accuracy.

Cost validation data functions include, for example, a function for calculating the level of cost reduction when a vehicle is reduced in size, based on the amount of sheet steel used for the body, or a function for calculating the cost of mounting an engine to a body and the like when an engine is changed. An advantage is that fluctuations in the cost of system or part changes themselves can be easily calculated using existing vehicle data. The rigidity validation data function includes, for example, functions for calculating body rigidity at the time of assembly, or rigidity when the suspension is attached to cross members. The weight and weight distribution validation data functions primarily include, for example, functions to calculate vehicle weight distribution when systems or parts are assembled into the vehicle.

Next we explain the supplemental evaluation data 15 in the database 1.

The supplemental evaluation data includes time period evolution data, prior planning example data, and customer requirement data.

Time period evolution data stores data indicating the correlation between vehicle evaluation items and the time period (year), data indicating the correlation between specifications or system performance and the time period (year), etc. Such data is used to calculate target values which take the time of sale into account.

Prior planning example data stores such items as evaluation points with respect to each vehicle evaluation item for past planned vehicles (for example, actual performance values at the start, midpoint, and end of planning) and associated planning requirements (for example, category, class, development period, cost, equipment conditions, etc.). The planned vehicle data is then automatically stored within past example data at a predetermined stage during planning or at the completion of planning.

Customer request data stores degree of importance data for customer request indices relating to a given category or class (for example, that engine performance is viewed as important), data indicating the correlation between vehicle evaluation items and customer request indices, data indicating the correlation between specifications or system performance and customer requests, and the like. Such data is also used to verify whether customer requests are satisfied.

Next we explain the supplemental data 16 in database 1.

Supplemental data includes regulation data and production requirement data. Regulation data stores data on regulations related to crash performance, for example. Validatable data such as whether an item is suited to a particular factory line, or whether the number of manufacturing stages are applicable to a particular factory, is stored in the production requirement data.

The computer 2 builds the planned vehicle model for the vehicle being planned using vehicle data stored in the database 1. In the present embodiment, a layout validation model and a performance validation model are built as planning vehicle models, as depicted in FIG. 6.

We begin below with an explanation of the layout validation model.

Figure 6:
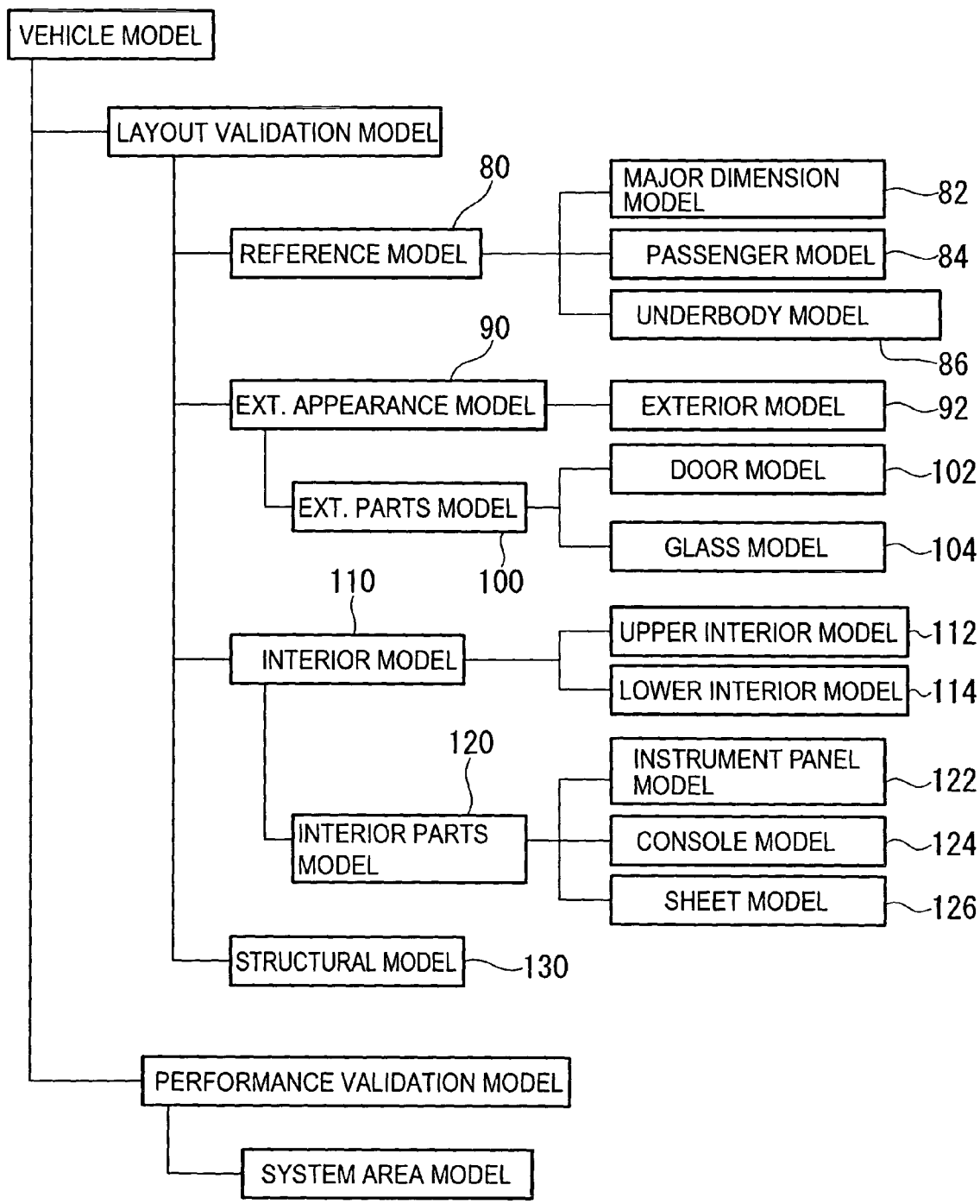
FIG. 6 is a block diagram depicting the configuration of a vehicle model.

This layout validation model is visually displayed using combinations of the various models as depicted in FIG. 6, and is capable of validating vehicle positional compatibilities such as mountability, gaps and clearances, and the like. In the embodiment, as described below, the layout validation model is built using vehicle data for a single vehicle ("Vehicle D" below), selected as a baseline vehicle from existing vehicles (note that the baseline vehicle may be formed as a combination of multiple vehicles).

The layout validation model, as depicted in FIG. 6, includes a reference model 80, an exterior appearance model 90, an interior model 100, and a structural model. These are explained by reference to FIGS. 7 though 10.

Figure 7A:
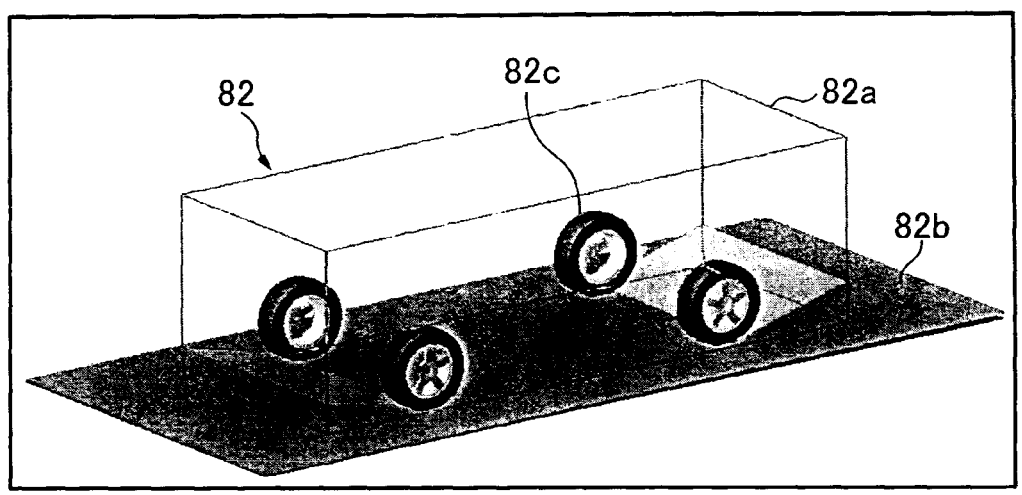
FIG. 7A is a diagram depicting an example of a reference model major dimensional model according to the present embodiment.
Figure 7B:
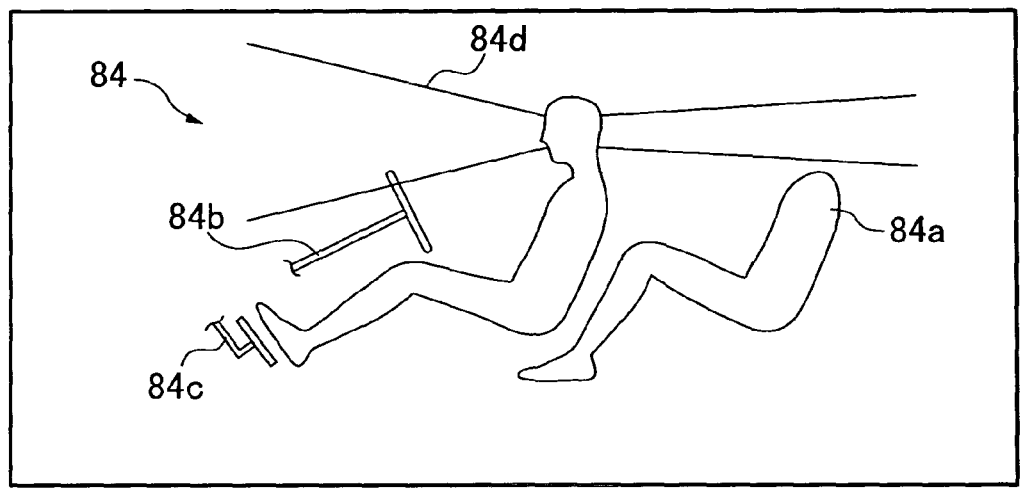
FIG. 7B is a diagram depicting an example of a passenger model.
Figure 7C:
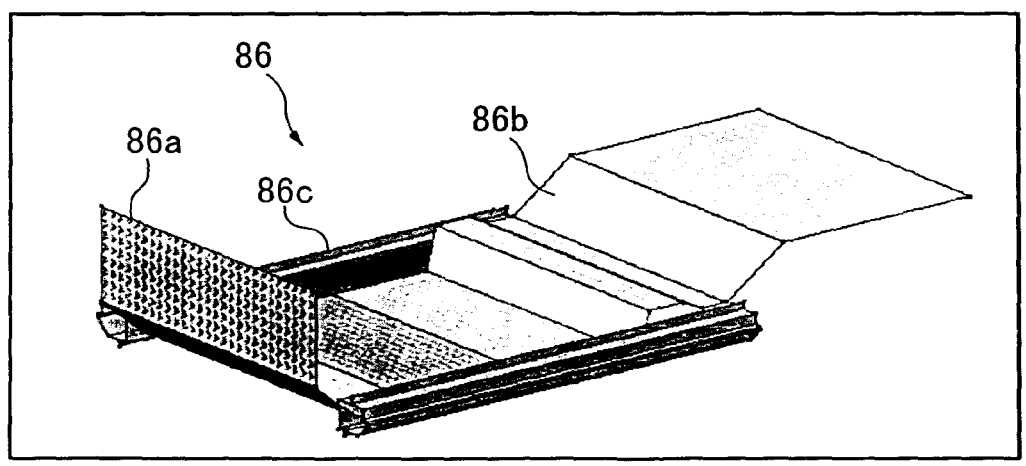
FIG. 7C is a diagram depicting an example of an underbody model.
Figure 8A:
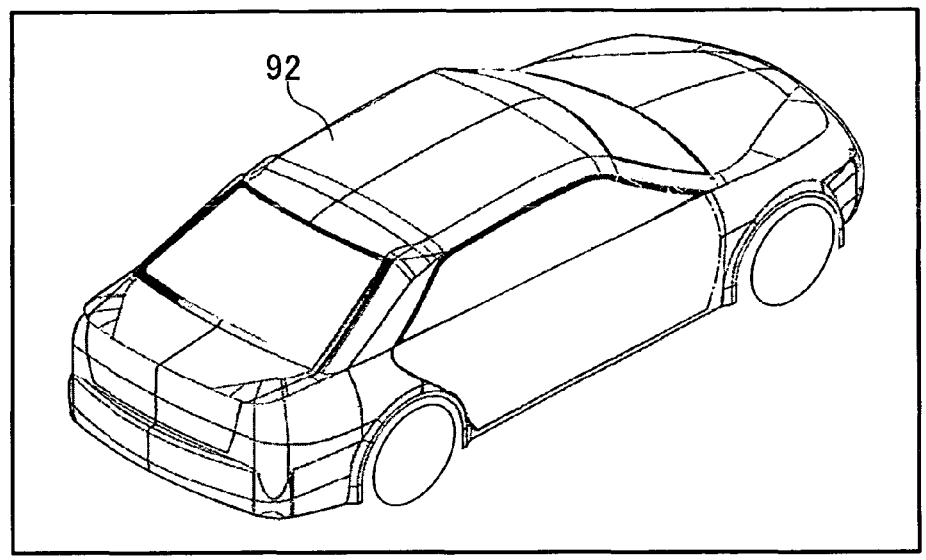
FIG. 8A is a diagram depicting an example of an external appearance model exterior model.

FIG. 7 depicts an example of a major dimensional model (FIG. 7A), a passenger model (FIG. 7B), and an underbody model (FIG. 7C) in the reference model of the present embodiment. FIG. 8A depicts an example of an exterior appearance model exterior model. FIGS. 8B-8E depict an example of exterior appearance part model door models (8B-8D) and glass model (8E). FIG. 9 depicts an example of an interior model upper interior model (FIG. 9A) and lower interior model (FIG. 9B); FIG. 9C depicts an example of an interior part model interior model, console model, and seat model. FIG. 10 is an example of a structural model.

We begin with an explanation of the reference model using FIG. 7.

As depicted in FIG. 7, this reference model 80 includes a major dimensional model 82, a passenger model 84, and an underbody model 86. As depicted in FIG. 7A, this model relates to a vehicle external frame 82a, a ground (corresponding to ground surface) 82b, wheels 82c, and the like, and is defined by specifications such as vehicle external frame dimensions, wheelbase length, and wheel dimensions.

As depicted in FIG. 7B, the passenger model 84 relates to such items as a passenger manikin 84a, a steering column 84b, a pedal 84c, and a field of view condition 84d. As described below, spatial area indications (see FIGS. 30-36) depicting such things as the range of passenger head movement and range of hand reach are included in this model.

The passenger manikin 84a is used to evaluate passenger layout and posture; its shape and dimensions are fixed according to domestic and international standards. This passenger manikin 84a is determined by various dimensional and angular specifications used to specify passenger layout and posture. These specifications include, for example, hip point position, head crown and heel positions with respect to hip point, and distance between the frontmost seating row and the second seating row. "Dimensions" also include "relative distance" between each section.

The steering column 84b and the pedal 84c are used to consider the layout of these items relative to passengers; their shapes and dimensions are fixed. The steering column 84b and pedal 84c are prescribed by specifications for the relative distances and angles thereof with respect to the hip point and the heel, for example. The field of view condition 84d is prescribed by specifications such as the vertical spreading angle from the eye point toward the front of the vehicle.

As depicted in FIG. 7C, the underbody model 86 relates to the understructure of the body; e.g. a dash panel 86a, a floor panel 86b, and a side sill 86c. The underbody model 86 is prescribed by specifications such as the respective dimensions and angles of the several panels which constitute the dash panel 86a and the floor panel 86b, the dimensions of the side sill 86c, and the like.

Packaging of passenger layout, etc. or other basic vehicle specifications can be considered using the reference model 80 which combines each of the models 82, 84, and 86, and each of the models comprising that reference model 80.

Next, referring to FIG. 8, we explain the external appearance model.

As depicted in FIG. 8, the vehicle model includes an external appearance model 90, and the external appearance model 90 includes an exterior model 92. As depicted in FIG. 6, the exterior model 92 relates to the exterior frame of the vehicle, including bumpers, hood, etc. The exterior model 92 is prescribed by various dimensional and angular specifications relating to the vehicle external shape. Specifications include, for example, the wheelbase, the front overhang, the rear overhang, the cowl point position, the rooftop height, the pillar section angle of inclination, and the like.

An external appearance model 90 of this type permits evaluation of the vehicle external appearance image and the like. Moreover, combining the external appearance model 90 with the reference model 80 permits a more detailed consideration of packaging aspects such as vehicle comfort and the like.

Next, referring to FIGS. 6 and 8, we explain the external appearance part model. As depicted in FIG. 6, the vehicle model includes an external appearance part model 100; this external appearance part model 100 includes a door model 102 and a glass model 104.

Figure 8B:
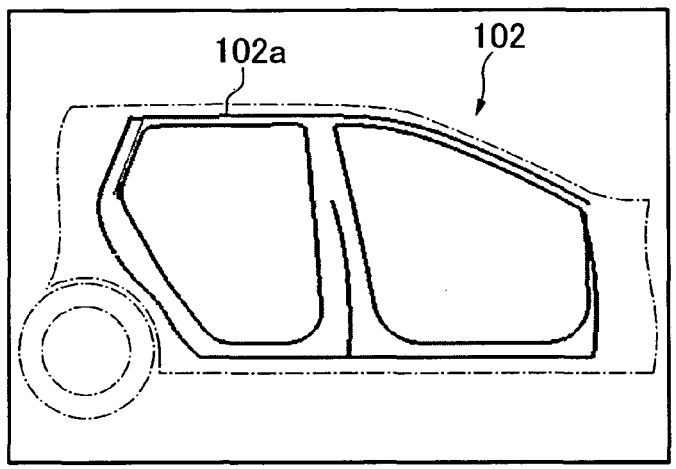
FIG. 8B is a diagram depicting an example of an external appearance part model door model.
Figure 8C:
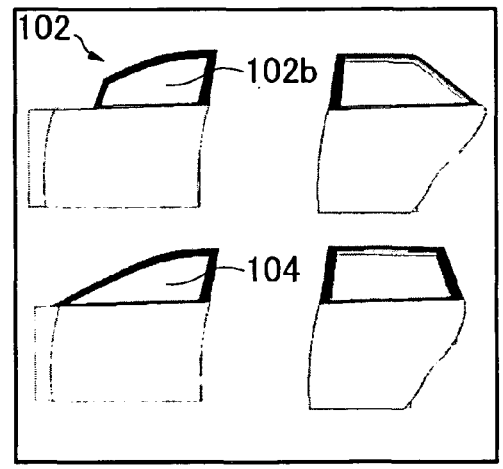
FIG. 8C is a diagram depicting an example of an external appearance part model door model.
Figure 8D:
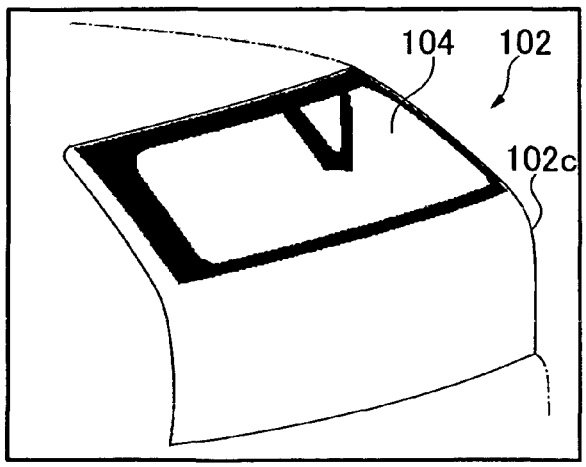
FIG. 8D is a diagram depicting an example of an external appearance part model door model.
Figure 8E:
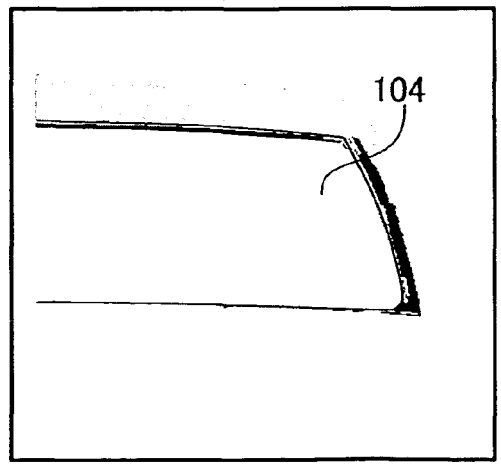
FIG. 8E is a diagram depicting an example of a glass model.
Figure 9A:
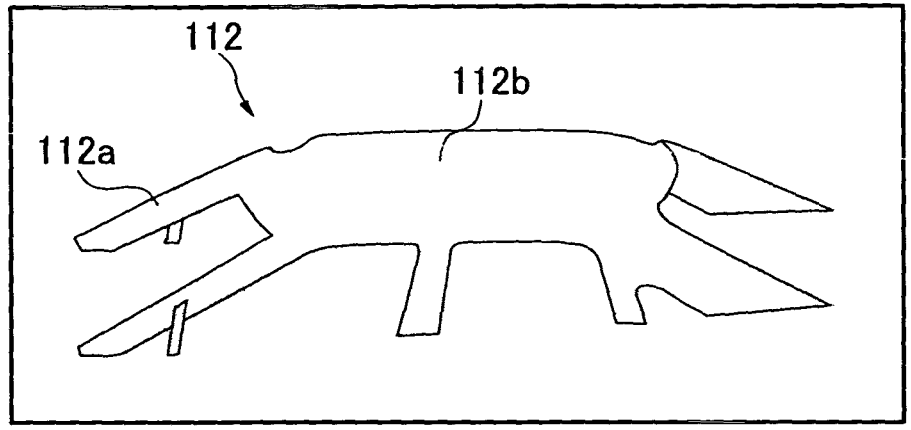
FIG. 9A is a diagram depicting an interior model upper interior model.
Figure 9B:
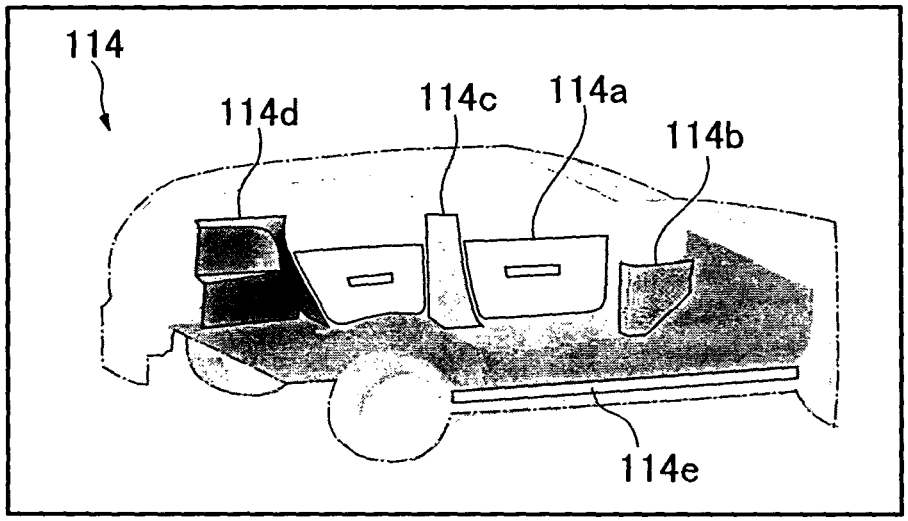
FIG. 9B is a diagram depicting an example of a lower interior model.
Figure 9C:
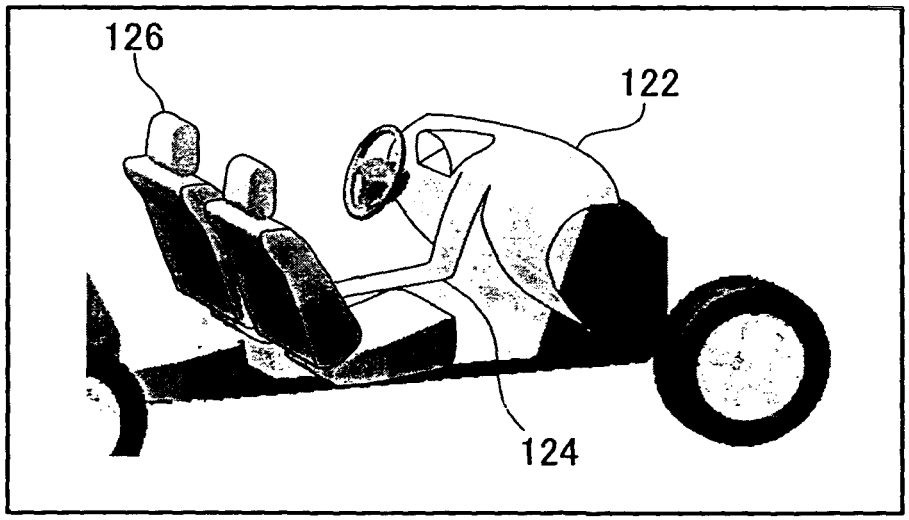
FIG. 9C is a diagram depicting an example of an interior part model instrument panel model, console model, and seat model.

As depicted in FIGS. 8B-8D, the door model 102 relates to front and rear door opening flanges 102a, front and rear side door exterior panels and sashes 102b, and lift gate exterior panel and sash 102c. As depicted in FIGS. 8C-8E, the glass model 104 relates to front windows, front quarter windows, side windows, rear quarter windows, and rear windows. These models are prescribed by various dimensional and angular specifications relating to their respective shapes and layouts.

The shapes and layouts of the doors and window glass, etc. which constitute portions of the external appearance can be separately considered using these models 102 and 104. Moreover, combining these models 102 and 104 with the external appearance model 90 permits a more detailed evaluation of the vehicle external appearance image and the like.

Next, referring to FIGS. 6 and 9, we explain the interior model.

As depicted in FIG. 6, the vehicle model includes an interior model 110; this interior model 110 includes an upper interior model 112 and a lower interior model 114.

As depicted in FIG. 9A, the upper interior model 112 relates to pillar trim 112a and top ceiling (roof header, roof rail, and roof trim) 112b. As depicted in FIG. 9B, the lower interior model 114 relates to front and rear door and lift gate trim 114a, cowl side trim 114b, B-pillar lower trim 114c, rear side trim 114d, and scuff plate 114e. These models are prescribed by various dimensional and angular specifications relating to the shape and layout of each trim section and the top ceiling, etc.

Combining the interior model 110 with the passenger model 84 or the external appearance model 90 and the like permits evaluation of the relative distance between a passenger and the interior, the passenger sense of constriction within the cabin, and visibility outside the cabin.

Next, referring to FIGS. 6 and 9C, we explain the interior part model.

As depicted in FIG. 6, the vehicle model includes an interior part model 120; the interior part model 120 includes an instrument panel model 122, a console model 124, and a seat model 126.

As depicted in FIG. 9C, the instrument panel model 122, the console model 124, and the seat model 126 relate to an instrument panel including a dashboard and the like, a console contiguous with this instrument panel, and a plurality of seats. These models are used to evaluate layout within the cabin, and have a fixed shape.

The instrument panel model 122 and the console model 124 are prescribed by dimensional and angular specifications relating to their layout. The seat model 126 is prescribed by dimensional (distance) and angular specifications such as seat layout, seat width, headrest vertical position, seatback angle, etc.

Note that the instrument panel 122 and console model 124 may be made to automatically deform in response to the layout so as to align with the interior model 110.

Using a model combining this interior part model 120 with the interior model 110 and a model combining the external appearance model 90 with the reference model 80 permits evaluation of the instrument panel, console, and seat layout, as well as the in-cabin sense of constriction.

Figure 10A:
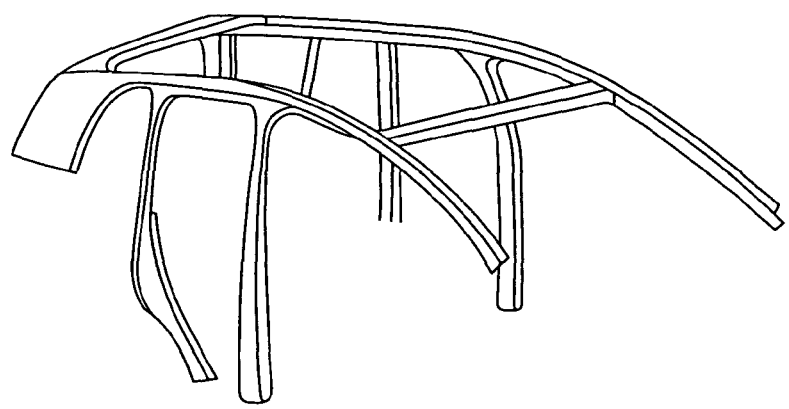
FIG. 10A is a diagram depicting an example of a structural model.
Figure 10B:
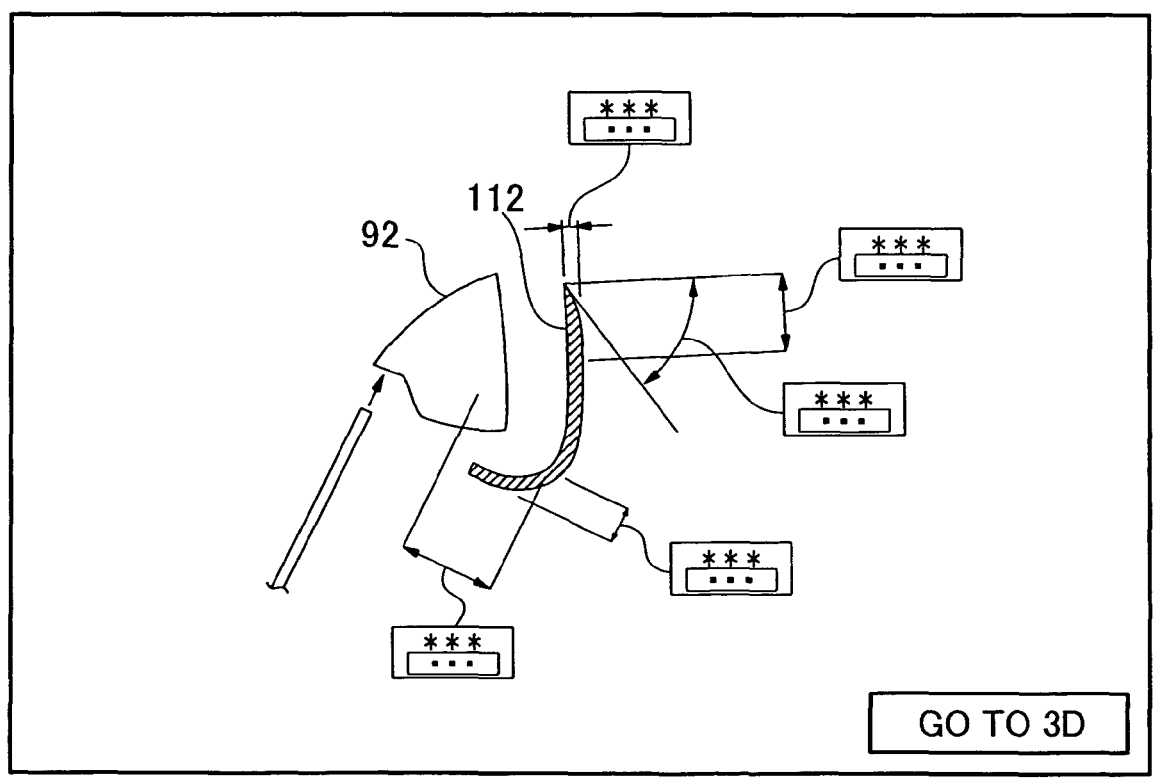
FIG. 10B is a diagram depicting an example of a structural model.

Structural models are models relating to performance such as body rigidity and weight, as in the frame model depicted in FIG. 10A, for example, or models with various dimensions such as a portion of the sectional shape and length of the pillar, as depicted in FIG. 10B. In particular, such structural models can be linked to changes in shape or structure, or changes in performance, thereby enabling more accurate performance evaluation.

Structural models have multiple framework structures such as a front pillar, rear pillar, side roof rail, front header, rear header, and the like. At least one of at least sectional area or strength (sectional shape) can be changed with respect to each framework section, so that if the vehicle type (vehicle category such as station wagon, sports type, etc.) differs, the required strength or sectional area will of course also differ. Making each of the structural model sectional areas, strengths, or the like individually variable permits optimal packaging validation and strength validation matched to the planned vehicle, resulting in extremely high planning accuracy.

The structural model has sectional area and strength-related information relative to framework structures such as the body frame, pillars, and the like, so that packaging feasibility can be quickly evaluated, while at the same time by providing sectional area information for pillars and the like, the sense of constriction imparted to passengers in the cabin space can also be quickly validated. Furthermore, strength information also permits quick verification of the planned vehicle strength, collision performance, vibration evaluation and the like, so that planning accuracy for the planned vehicle is extremely high starting from the initial planning stage. The structural model is also provided with information relating to sheet steel material, sheet thickness, and weight, thus enabling verification of the planned vehicle weight, weight distribution, center of gravity position, and the like.

The layout of each model explained above is prescribed by relative distance from a fixed reference position, and each model uses such relative distances as specifications. Such fixed reference positions include, for example, a longitudinal reference point (for example, a cowl point), a ground, and a vehicle mid-plane (a plane passing midway through the vehicle width in the vehicle longitudinal direction).

We will first explain a planned vehicle building example using a layout validation model.

In the layout validation model, various planned vehicle performance evaluation values are calculated on the morphing screen based on the amount of change in specification values for the vehicle model being planned, and on system changes.

Figure 11:
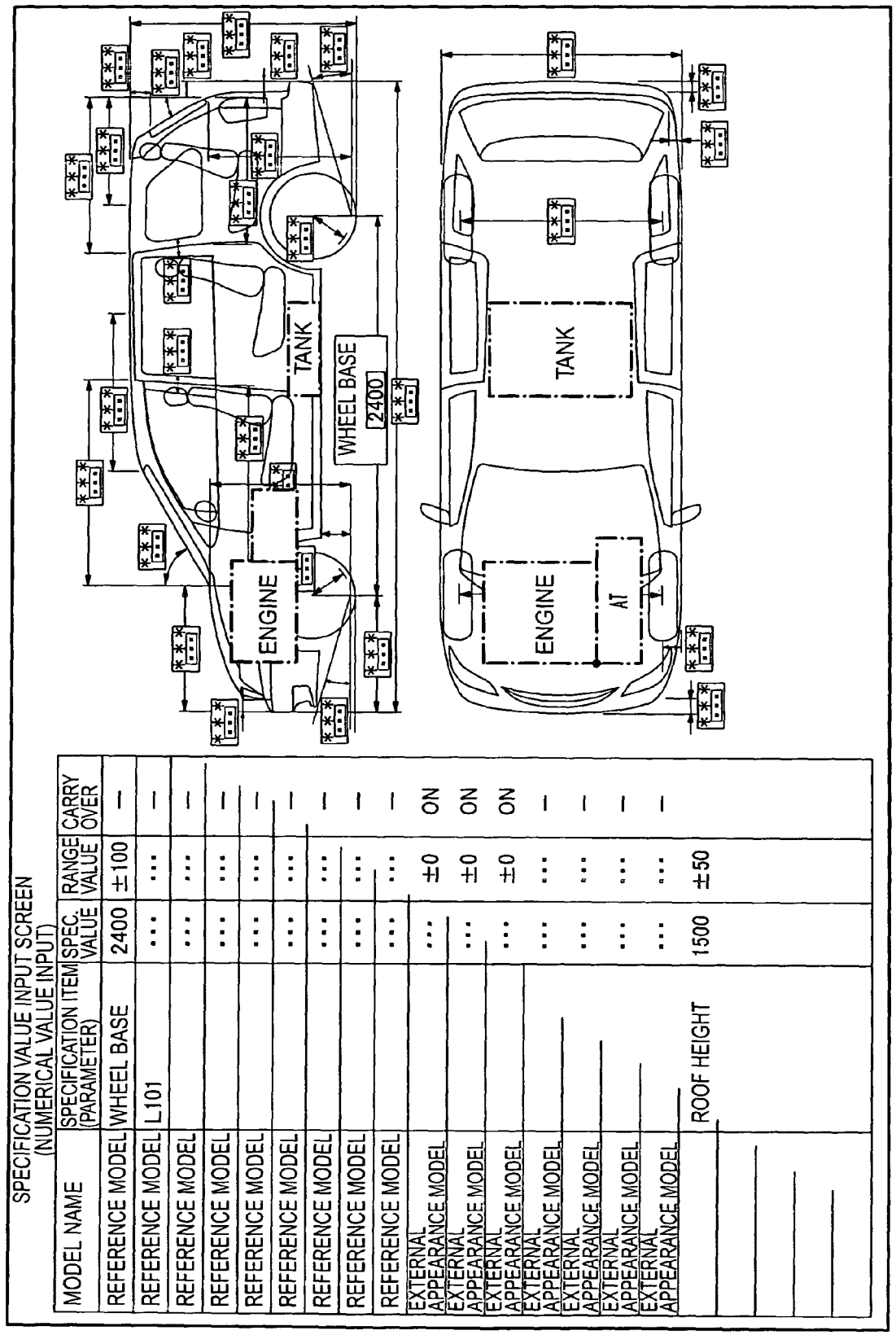
FIG. 11 is a diagram depicting an example of a specification input screen.

First, in the layout validation model, various specifications and system parameters for the reference vehicle stored in the existing vehicle data in the database are read in on the specification value input screen, as shown in FIG. 11. A specification value input table and side elevations and plan views showing the corresponding part locations for each specification item are displayed on this specification value input screen. The input table comprises a column showing the name of the vehicle model ("reference model," etc.), a specification value column showing specific numerical values ("2400," etc.) as specification values corresponding to each of those specification items, and a carryover designating column (displaying "ON" or the like).

Figure 12:
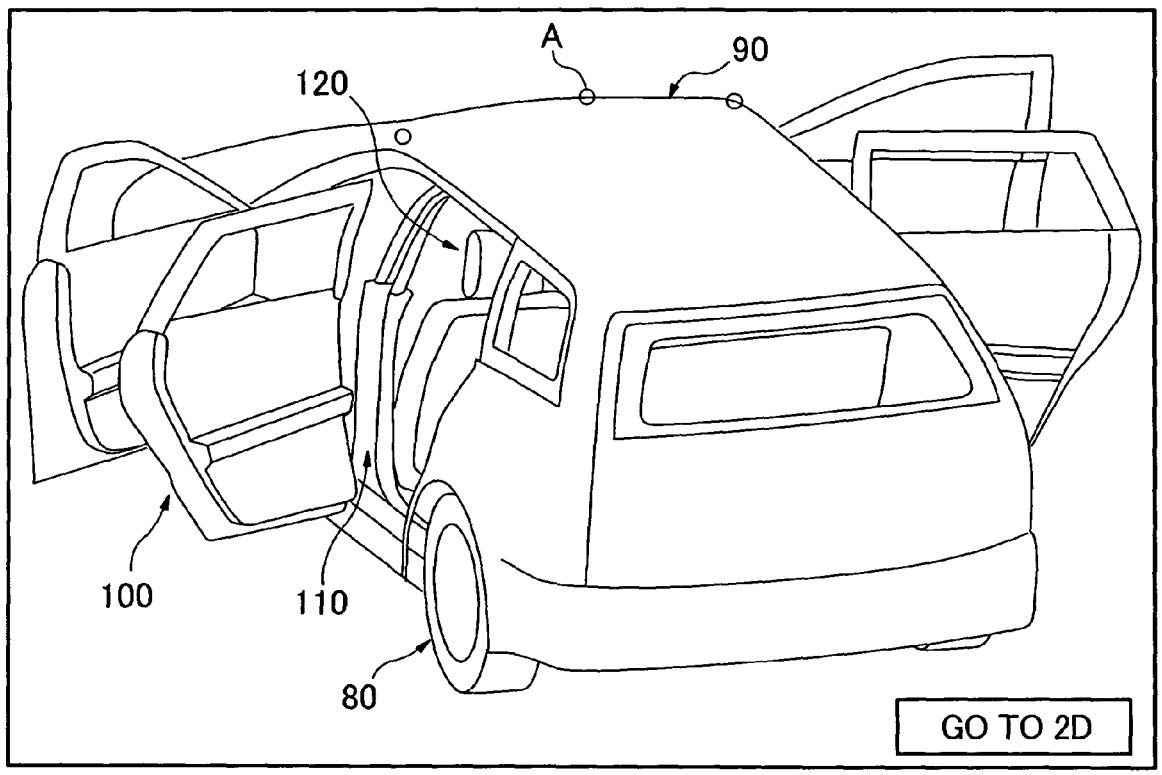
FIG. 12 is a diagram depicting an example of a layout validation model 3D morphing screen.
Figure 13A:
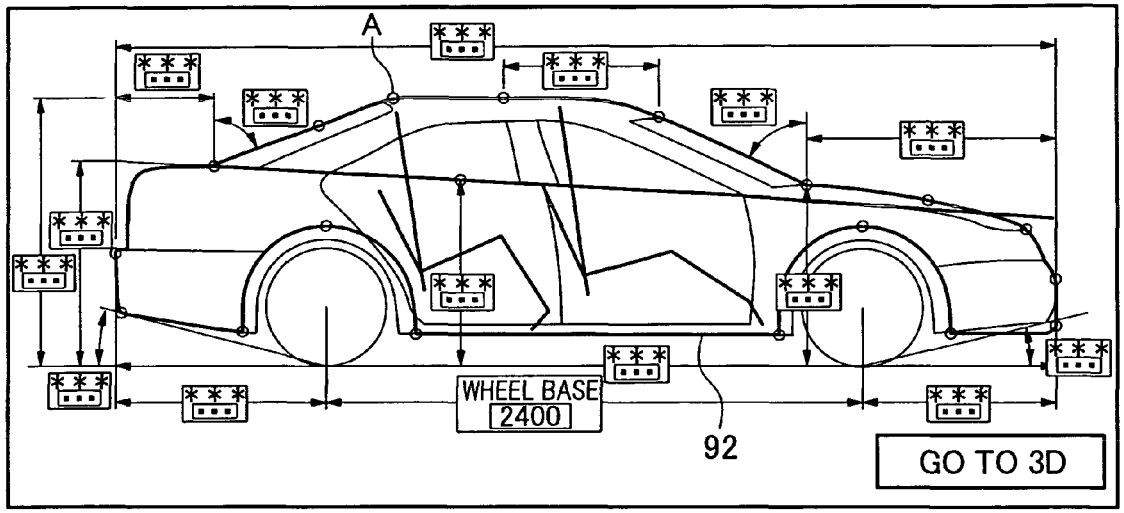
FIG. 13A is a diagram depicting an example of a three view layout validation model 2D morphing screen.
Figure 13B:
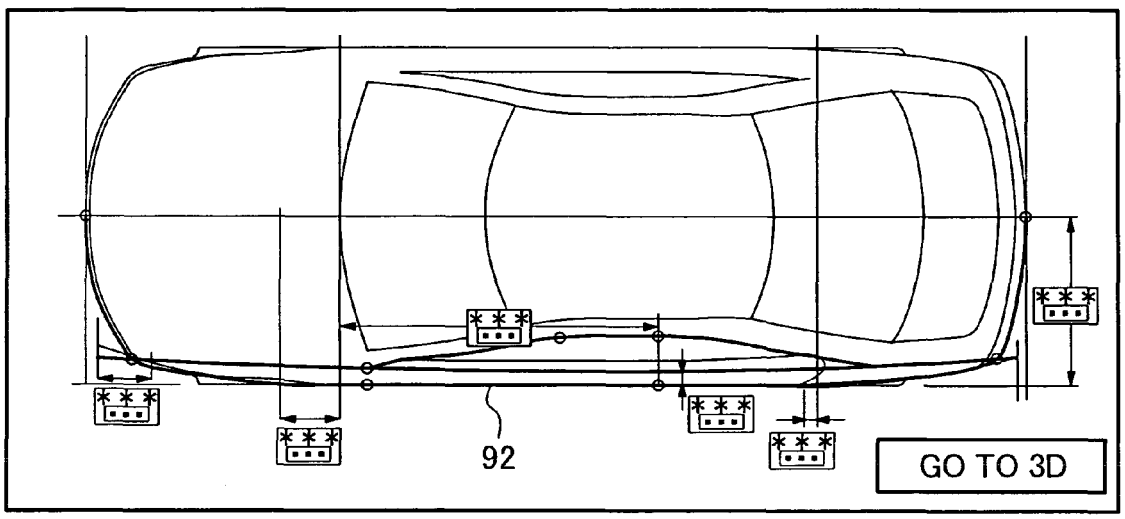
FIG. 13B is a diagram depicting an example of a three view layout validation model 2D morphing screen.
Figure 13C:
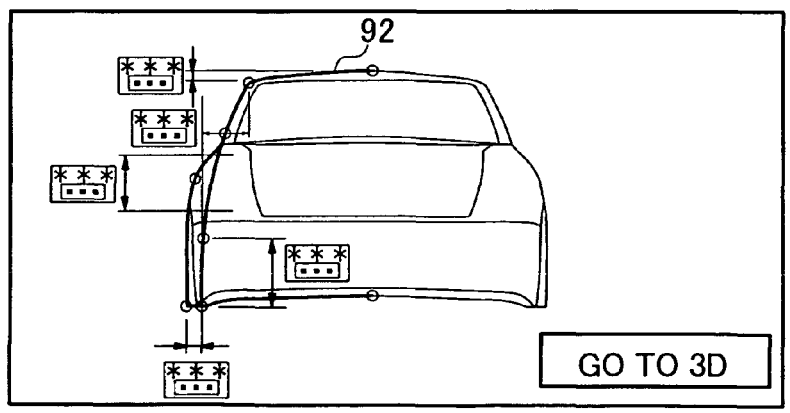
FIG. 13C is a diagram depicting an example of a three view layout validation model 2D morphing screen.

As shown in FIG. 12 or FIG. 13, each layout validation model is displayed in 2D or 3D on, for example, an evaluation screen 5, based on reference vehicle specifications or system data depicted on this specification value input screen. This layout validation model is capable of morphing, which is to say deforming, the shape and changing the layout of each part.

In the 3D morphing screen depicted in FIG. 12, for example, the entirety of the layout validation model is displayed in a state viewed from any desired viewpoint. In this 3D morphing screen, the shape and layout of each part can be changed by using the mouse to drag the specification point which forms the origin point for each dimension or angle displayed by a circle (only a portion are shown), as depicted by A in the figure.

Next, a three view display seen from the side, plan, and front (or back) of the vehicle model, and a sectional view display showing sections of constituent parts such as pillars or doors as in FIG. 10, are displayed on 2D morphing screens. In these 2D morphing screens, a predetermined section and major shapes of the vehicle model are displayed by straight lines and curves. Moreover, specification items, specification values, and the dimensional lines which define those are also displayed for specification values relating to morphed shape displays.

The displayed specification values ("• • •") can be numerically input by selections on the screen. Changes in the shape and layout of various parts of the vehicle model are effected by the input of these specification value changes. The vehicle planner can also change specification values and system parameters on the above-described specification value input screen.

Next, vehicle shapes are deformed on each of the morphing screens based on predetermined rules. That is, specifications are mutually correlated based on rules so as to maintain compatibility of shape and layout of the various parts of the vehicle. For example, in the exterior model 92 which expresses outer shape, changing the roof length causes the angle of a portion of the pillar to change in tandem thereto so as to maintain the connection with that roof; the length of the upper interior model 112 which expresses the interior also consequently changes. The shape of the framework which forms the structural model changes automatically in accordance with the deformation of the exterior appearance model, so that when the structural model and the exterior appearance model are superimposed, an accurate validation of interference issues between those and the occupant space model can be performed without any offset.

We will next explain the performance validation model. It is possible using the above-described layout validation model to validate the performance of the entire planned vehicle. However, there are many cases when the operator may begin the planning process with an image, within which priorities of engine performance, vehicle in-cab space, and handling and stability are not necessarily always compatible. In such cases it is normally difficult to achieve a finished display of the overall vehicle from the beginning. For example, there are quite a few types of performance which can be validated without visually displaying a planned vehicle model, such as the planned vehicle's dynamic performance, its ride comfort, and the like. Moreover, there are cases in which it may be desirable to validate whether an improvement has occurred before and after replacement of a unit such as an engine.

The present embodiment, therefore, permits vehicle planning work to be advanced using performance validation models whose performance can be validated without visual display of the vehicle. In other words, the planned vehicle's performance can be validated even if the shape of the body is not adjusted in detail (for example, there are cases in which the shape of a portion of another pillar must be changed in conjunction with an increase in vehicle height). With this performance validation model, it is possible to change specifications and to validate performance by computing the performance effects associated with the change of a unit/part.

By thus building a performance validation model separate from the layout validation model, which does not require visual display of the vehicle form, the performance validation work in vehicle planning can be made extremely efficient. That is, even in cases where it is difficult to perfect the display a form using a layout validation model, the performance validation model enables evaluation of performance which can be evaluated without perfecting the form.

FIG. 14 depicts a configuration example of the performance validation model of the present embodiment. The performance validation model of the present embodiment comprises partial models for a plurality of areas, and comprises a plurality of hierarchical layers for each area. In the hierarchical structure shown in FIG. 14, the front seat upper area, for example, first comprises an overall structure for the front seat upper portion (layer level 1). That overall structure comprises doors and other parts (layer level 2), and the doors are divided into door degree of opening and modules, etc. (layer level 3), which are ultimately divided into units of individual parts (layer level 4).

Therefore in the performance validation model the constitution of each of these hierarchical layers can be freely selected and changed when there are changes to specifications or systems. For example, when changing a door, data relating to the layer level 2 "door" is changed. In actuality, a list of specifications and systems is displayed for each hierarchical layer, and adjustments are made either by changing those displayed specifications (for example by changing the roof height), or by changing systems (for example by changing the engine and causing a 2% increase in engine output).

In particular, the low order hierarchical layers 3 or 4 include weight and cost, making it possible to calculate cost changes or increases/decreases in weight when doors are exchanged. In other words, if a layer level 2 door is exchanged, changes are also automatically applied to data in the hierarchical layers 3 and 4 beneath that, so for example the weight of all of the layer level 5 parts would be added and a calculation performed. This allows the planned vehicle weight distribution to be computed.

At the final stages of the project, or when moving into detailed design, it is sufficient to change only the layer level 3 structure in order to review details. For example, when changing the structure of Pillar A, data relating to the layer level 3 "Pillar A" can be changed. If changing only the coil in a suspension, for example, it is sufficient to change the layer level 3 coil data (layer level 2 is the shock absorber).

Next, referring to the flowchart in FIG. 15, we explain an outline of vehicle planning in the present embodiment.

First, in S1 (Step 1), planned vehicle basic target values are set within vehicle planning using the vehicle planning support system. In the present embodiment, target values are calculated from a benchmark vehicle using vehicle data relating to an existing vehicle for which there is uniform treatment of various types of data stored in the above-described database.

Vehicles are normally developed based on benchmark vehicles so as to build a vehicle better than competitors' or one's own older models, which will satisfy customers and sell in the marketplace—in other words with a view to marketability and competitiveness. In such cases, setting the degree of superiority to be achieved with respect to the benchmark vehicle for each evaluation item such as handling/stability and fuel economy allows the manufacturer to impart its uniqueness and character to the vehicle.

Next, in S2 (Step 2), the planned vehicle reference vehicle is set (layout validation model/performance validation model). The vehicle model (reference vehicle model) which will serve as a reference for the vehicle being planned is selected from among existing vehicles.

In the layout validation model, the vehicle shape and configuration can be built as described above. It is also possible to do basic performance validation with the performance validation model. As the reference vehicles for these models are selected from existing vehicles, performance evaluation can be performed based on objective numerical values.

Also, in the performance validation model, as described below, the respective good portions of a plurality of benchmark vehicles can be incorporated into the planned vehicle.

Next, in S3 (Step 3), a final target value is set based on corrections to the basic target values.

The final target value is set so as to reliably satisfy the selling time period and customer requirements.

Next, in S4 (Step 4), a value is calculated for the gap between the reference vehicle actual performance value and the target value.

This gap value serves as an indicator of roughly how much development (evolution of the reference vehicle) will be needed.

Next, in S5 (Step 5), vehicle planning using the model is executed, and actual performance values for the planned vehicle are calculated.

Actual performance values (estimated performance) at a point midway in the planning are calculated with respect to reference vehicle actual performance values (performance) according to a predetermined function. The planned vehicle actual performance values are obtained using existing vehicle data is a reference and adding or subtracting the reference vehicle actual performance values according to a predetermined function obtained from an existing vehicle, thereby permitting basic performance validation to be conducted.

Next, in S6 (Step 6), a value is calculated for the gap between the reference vehicle actual performance value and the target value.

This gap can be used to judge the degree to which the target has been achieved as well as the amount of development required. Note that depending on the gap, there may be cases in which it is necessary to retract (turn back) development in order to preserve vehicle balance.

Next, in S7 (Step 7), consideration is given to eliminating the gap.

The operator is assisted by satisfying requirements for performance, packaging, cost, and the like on the vehicle planning support system, and by causing a predetermined display of graphs of system or specifications for which the gap can be eliminated with respect to major issues selected by the operator.

Next, in S8 (Step 8), the planned vehicle is reviewed in detail.

Details of styling compatibility, collision performance, aerodynamic performance, body rigidity, and the like are reviewed.

Next, in S9 (Step 9), a presentation is performed.

Management approval of the planned vehicle is obtained.

Next, in S10 (Step 10) there is a transition to the design stage.

Planning data is converted into CAD data or simulation data and handed off to a design department or test department.

The planned vehicle build is thus completed.

Below we will further explain each of the summary steps for vehicle planning as described above.

We begin with an explanation of the step to set the planned vehicle basic target value (S1 (Step 1) in FIG. 15).

Figure 16:
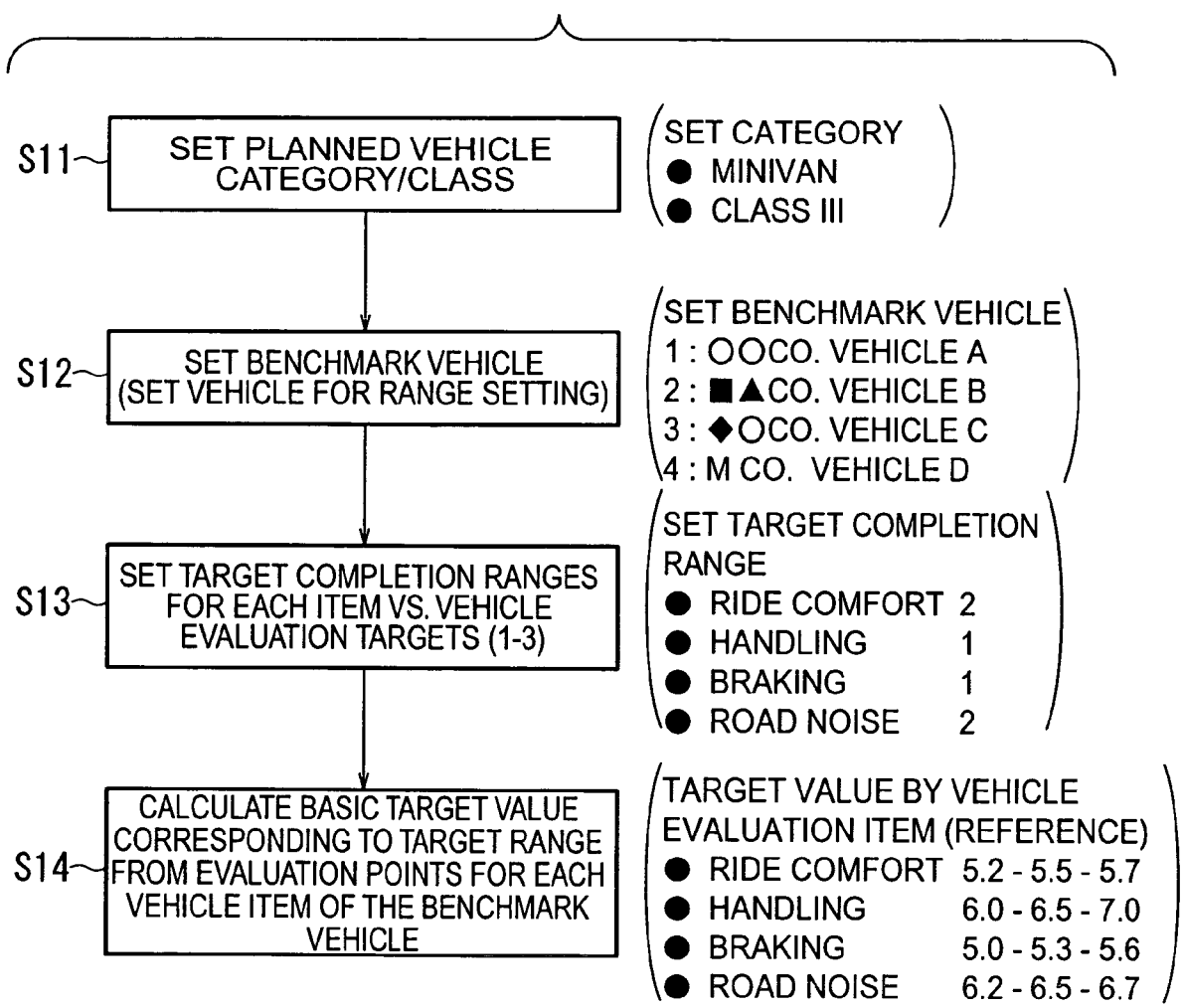
FIG. 16 is a diagram depicting a flowchart showing detailed processing in the FIG. 15 flowchart, S1 (Step 1), and an example of a display setting in each step.

In the present embodiment, the steps for setting the planned vehicle basic target value include S11-S14 (Steps 11-14) shown in FIG. 16.

When setting basic target values for the planned vehicle, first, in S11 (Step 11), a planned vehicle category is set. When planning minivan, for example, an operator would select "minivan," "Class III (large)," and set the category.

Next, in S12 (Step 12), the operator sets a benchmark vehicle relative to the set category. The benchmark vehicle here can be selected from the sports car category, for example, when planning a minivan with high motion performance.

Next, in S13 (Step 13), the operator sets a target completion range. Specifically, he or she would input range values (ranks) between "1" and "3" for each of the target completion ranges shown in FIG. 17A. Note that data holding a preset target completion range can also be stored in a database, and that data can be read out in this S13 (Step 13).

Next, in S14 (Step 14), "evaluation point data for each vehicle evaluation item" is read in to each of the benchmark vehicles set in the S12 (Step 12), and a basic target value is calculated based on that read-in evaluation point value, as well as on the range value set in S3 (Step 3).

Here, "basic target value" refers to a target value based on a benchmark vehicle for a planned vehicle at the time planning commences. A target value is first set having a correlation such as that it falls within a predetermined range value with respect to a benchmark vehicle when vehicle planning is commenced. This is not a particular absolute value, but a target of falling within a range, so it is sufficient to approximately obtain the performance in order to advance planning effectively.

By so doing, it can be understood at the time when planning is commenced that this computed target value must be achieved with respect to the benchmark vehicle (competitor vehicle). Moreover, a basic target value obtained in this way is not an absolute value which changes over time, but a relative value with respect to evaluation points, based on a predetermined reference for a benchmark vehicle existing at the time of vehicle development, so that planned vehicle performance can be appropriately set (to have a competitive advantage). Relative positions with respect to other manufacturers' competing vehicles and old models of one's own company are clear, and product value and competitiveness are achieved (i.e., the manufacturer's unique features can be concretely expressed and differentiated from other companies). Because vehicle evaluation items are defined, planned vehicle performance can be effectively set.

The vehicle evaluation item target completion range predetermines relative positioning (superiority) with respect to a benchmark vehicle for each vehicle evaluation item. These ranges (ranks) are explained below.

FIG. 17B depicts the distribution handling performance evaluation points for a plurality of vehicles selected from among existing vehicles. The horizontal axis shows the evaluation point count, and the vertical axis shows the number of vehicles having each of those evaluation point counts. When a plurality of vehicle are selected in this way, a majority generally concentrate around a certain point count.

In the present embodiment, as shown in FIG. 17B, three stages are defined, with the region which includes the upper 30% of vehicles being classified as Range 1, the region (point count breadth) including vehicles with evaluation point counts below Range 1 and having 45% of the selected vehicles being Range 2, and the region below Range 2 and having 25% of the vehicles being Range 3. It is preferable to define the range percentages in such a way that Range 2 includes the evaluation point count held by the greatest number of vehicles (the maximum point on the curve).

Here, the center of Range 2 may be determined as the peak value thereof (maximum point on the curve) when the distribution is a normal distribution, or it may be determined as the position at which a value integrating a certain evaluation point count and the number of vehicles having that evaluation point count is at a maximum, or it may be determined around an average of evaluation points for selected vehicles, so as to include several 10s of percent above and below that point. In other words, the first Range 2 is set, whereupon the remaining portions may then be set as Range 1 and Range 3.

In the present embodiment, as shown in FIG. 17A, the operator sets a target completion range with respect to each vehicle evaluation item of the planned vehicle. For example, ride comfort performance is set to Range 2, and handling performance to Range 1. In other words the operator sets planned vehicle characteristics such that ride comfort performance is average with respect to the selected vehicle, and handling performance is superior with respect to the selected vehicle. Data in which target completion ranges are preset, as shown in FIG. 17A, may also be stored in a database and read out.

Basic target values are calculated with respect to ranges set in this manner. That is, when Range 1 (the case in which one wishes to obtain performance superior to the selected vehicle) is set for handling performance, as shown in FIG. 17A, an evaluation point count of 6.0 or greater corresponding to Range 1 will be the basic target value. This means that if the planned vehicle handling performance exceeds the 6.0 points needed to clear the target value, handling performance will be superior to current existing vehicles.

In cases in which vehicles having extremely high evaluation point counts in Range 1 are included, the calculated target value itself will be extremely high. In such cases it is conceivable that an over-performing vehicle may be planned, resulting in a loss of vehicle performance balance and extra cost. In the present embodiment, therefore, the calculation is made using a basic target value of 7.0 points as the basic target value corresponding to Range 1, being the Range 1 minimum value of 6.0 plus a preset, specific point count spread of 1.0 points. In other words, the basic target value is calculated to have a spread of 6.0-6.5-7.0.

We will now explain vehicles selected as benchmark vehicles for range setting purposes. The operator can obtain a target value which includes superiority over a specific competing benchmark vehicle by selecting a benchmark vehicle which is specifically expected to compete with the planned vehicle, and selecting a range (superior) with respect to that selected benchmark vehicle.

Note that such things as the proportion of vehicles contained in each range and the number of ranges can be changed in accordance with the planned vehicle category or class. In other words, an appropriate range can be set according to the type of planned vehicle.

There are cases, however, in which there are multiple specifically competing benchmark vehicles. It may occur in such cases that there is not much data, and as a result the evaluation point count corresponding to the target completion level is not reasonable. That is, it can occur that the basic target value set for all cars in the world of a similar category (including many vehicles outside of the benchmark vehicle) is not reasonable. This will lead to target values for Range 1 or Range 2 which are too high or too low.

For example, it could occur that even though there are four benchmark vehicles, and these were actual competitor vehicles, the results of development when target values were set looking only at competitor vehicles would be at a low level as perceived by the world in general.

It is necessary when selecting benchmark vehicles for range setting purposes that there be at least a convincing superiority with respect to competitor vehicles in order to build a vehicle of a sufficiently good level in the eyes of the world.

Also, when the number of benchmark vehicles is small, it may not be possible to obtain a distribution. In other words, the greater the number of vehicle selected for range setting purposes, the more likely that a portion close to the curve shown in FIG. 17B will be obtained, making it easy to calculate a basic target value corresponding to a given range.

In the present embodiment, therefore, the following operation can also be effected by operator selection. First the operator independently selects a specific competing benchmark vehicle and a vehicle for range setting as vehicles selected from among existing vehicles. The benchmark vehicle may or may not include a vehicle for range setting.

Figure 18:
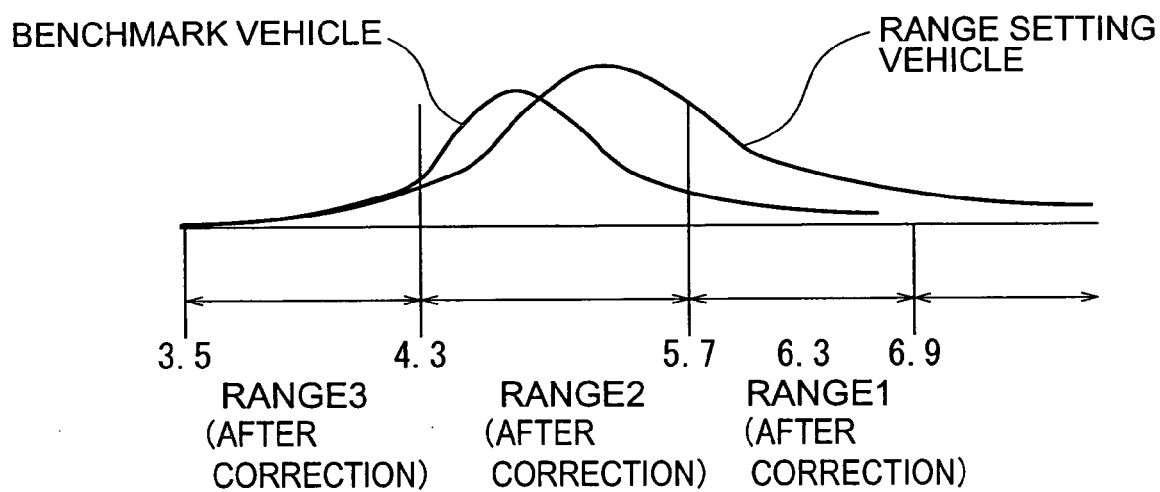
FIG. 18 is a graph depicting an evaluation point distribution and completion range for a benchmark vehicle and for range setting, respectively.

The respective distributions of the benchmark vehicle and range setting vehicle are then calculated, and two curves such as those depicted in FIG. 18 are then displayed on a screen. Displaying them in this way allows the operator to judge what level of performance a benchmark vehicle has with respect to vehicles in the entire market (for example, those in the same category). The operator can look at such a distribution and make corrections to basic target values calculated for the benchmark vehicle. For example, the target value calculated from the benchmark vehicle distribution, as described above, can be brought into proximity with the distribution for vehicles in the market, taking into account the difference between the two distributions (for example, 0.6 points), as shown in FIG. 18. In cases in which the evaluation point count peak is offset by 0.6 points, it is acceptable to automatically add 0.3 points, for example.

The distributions for calculating target values may also be different for each range. For example, a target value corresponding to Range 1 is calculated from the benchmark vehicle distribution in Range 1, and a target value corresponding to Ranges 2 and 3 is calculated from market distributions for Ranges 2 and 3. By so doing, the vehicle evaluation items which one absolutely wishes to place in a superior position relative to a competitor vehicle can be separated from vehicle evaluation items for which an average level vs. the market is acceptable, so as to obtain the desired planned vehicle characteristics.

As explained above, by selecting a range setting vehicle together with a benchmark vehicle, it is possible to attain basic target values which take the market and competitor vehicles into account.

Figure 19:
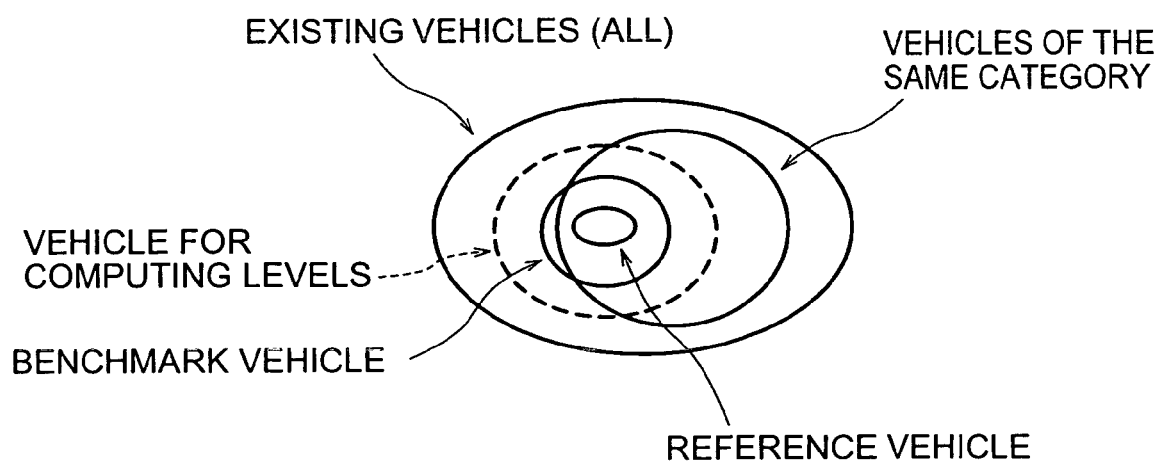
FIG. 19 is a diagram depicting the relationship between items such as a benchmark vehicle and a vehicle selected as a range setting vehicle in the present embodiment.

Here we indicate in summary form in the FIG. 19 Venn diagram the relationships of selected benchmark vehicles and range setting vehicles in the present embodiment. "Existing vehicle" here refers, ideally, to virtually all cars which have existed in the market up until now. "Benchmark vehicle (competitor vehicles)" refers to vehicles used to calculate target values corresponding to a range. "Range setting vehicle" here refers to a vehicle used to calculate a target value corresponding to a range by adding to a benchmark vehicle or by replacing the benchmark vehicle; it is used in order to calculate a reasonable target value when the number of benchmark vehicles is small.

"Reference vehicle" refers to a vehicle used as a reference when planning a vehicle. As will be described below, a single vehicle is selected in the present embodiment as the reference vehicle within the layout validation model (single model), and multiple are selected for each location in the performance validation model (multiple location model). These respective reference vehicles are not limited to vehicles manufactured by one's own company, and in particular may be selected from existing vehicles including the benchmark vehicle.

By thus setting a target completion range, investment can be directed to then specific required performance, and a personality and character can be imparted to the vehicle. In other words, by setting the degree of superiority with respect to a benchmark vehicle for each vehicle evaluation item such as handling and stability or fuel consumption, the manufacturer's personality and character can be imparted to the vehicle. This results in imparting of product value and competitive strength to the planned vehicle.

Furthermore, with regard to such manufacturer personality, if target completion range distribution and balance with respect to each vehicle evaluation item are made the same across differing categories (minivan, compact car, etc.), the same kind of personality can be perceived by the rider no matter what category of that manufacturer's vehicle he/she may ride in, and by setting the handling performance target completion range to be superior to that of the benchmark vehicle, any planned vehicle can be given superior handling compared that of other company or previous model vehicles.

We will next explain the step (S2 (Step 2) in FIG. 15) for setting the planned vehicle reference vehicle (layout validation model/performance validation model). The step for setting the planned vehicle reference vehicle includes S21 and S22 Steps 21 and 22) shown in FIG. 20.

When setting the planned vehicle reference vehicle, the operator first sets respective reference vehicles for layout validation models and performance validation models. That is, the operator selects a vehicle from among existing vehicles which will serve as the base vehicle for building the planned vehicle from vehicle models (layout validation models, performance validation models), then sets these up in the system. Although not shown, a list of existing vehicles is displayed when selecting a reference vehicle, and the operator selects from within this list.

In the embodiment, a single vehicle is selected as the layout validation model reference vehicle. In the display example shown in FIG. 20, Vehicle D is selected. As shown in FIG. 21, a plurality of vehicles are selected by area as the performance validation model reference vehicles. The planned vehicle is thus not built up from zero, but rather is built based on a vehicle already provided with specifications, evaluation points, and the like.

Next, in S22 (Step 22), all data held by the reference vehicles, such as evaluation points, specification values, system performance evaluation values, and the like for each vehicle evaluation item related to the set reference vehicle is read from the database 1 to the computer 2. A reference vehicle model is then built based on the vehicle data for these reference vehicles.

We will here explain a reference vehicle for performance validation models.

The performance validation model reference vehicle model 60, as shown in FIG. 21, hypothetically expresses a single vehicle comprised of a plurality of areas 61-69, such as a front area 61, a front seat lower area 62, and the like. Different reference vehicles are separately set for each of those areas. In the example shown in FIG. 21, vehicle A is set for front area 61, front seat upper area 65, and rear seat upper area 66, and vehicle B, vehicle C, and Vehicle D are respectively set for other areas. For example, setting Vehicle D, which has high engine performance, for engine area 67 allows for validation of vehicle performance in cases where a superior engine is mounted.

Setting reference vehicles for each of these areas permits judgment of the vehicle performance image (for example, front vicinity, interior comfort, rear vicinity, engine, etc.). Separately defining a suspension performance area 68 with respect to the front area 61, for example, would then permit validation of a vehicle in which a suspension by one's own company or another manufacturer is separately installed, in the case in which the front area 61 is associated with vehicle A. The same is true for the engine area 67. The suspension performance area 68 can be set as separate areas on the front wheel and rear wheel sides. Also, weight distribution and interior space performance can be validated using the fuel tank area 69.

It is thus possible to incorporate the good parts of existing vehicles by constituting performance validation model reference vehicle models from a plurality of reference vehicle parts. That is, existing vehicles can be defined for each area, setting the specifications and performances closest to those desired for the planned vehicle, thereby reducing the predicted performance margin of error.

This makes it easier for the operator to apply an image in mind such as an original shape to the vehicle. In turn, he/she can easily understand what effect such an original shape will have on performance. By applying vehicles which fit the desired image to each location on the vehicle, rather than modifying a single vehicle, the amount of changes made to the reference vehicle can be reduced, and in any case performance computations can be performed based on reference vehicle data to obtain appropriate performance evaluation values.

By building performance validation models in this way, performance can be validated by making changes to primarily only numerical specification values and systems, without the need to visually display the vehicle, thereby improving work efficiency.

Vehicle planning can then be advanced by combining systems and areas (front vicinity, etc.) included in the vehicle from a plurality of benchmark vehicles, such as using vehicle A for the front vicinity, vehicle B for the cabin vicinity, etc. By so doing, when there are items one wishes to apply to the planned vehicle (front vicinity, cabin space, transmission, etc.) or which use one's own company's systems or parts (engine, suspension, etc.), it is possible to effectively validate the performance (evaluation points for each vehicle evaluation item) of a planned vehicle which combines those elements. Such work is inefficient for making changes using a single vehicle (Vehicle D), as in the layout validation model.

Therefore by using a layout validation model, the rough performance of the planned vehicle can be efficiently grasped before undertaking a detailed validation which accounts for such things as shape compatibility. This makes it possible to determine units/parts as well as a rough vehicle configuration. After such decisions are made, further detailed validation can be conducted using the layout validation model.

Note that because each of the systems and areas (front vicinity) of the performance validation model has all data for specifications and the like (reference vehicle data stored in a database), that information can be visually displayed. However, vehicle shape contradictions arise due to the combination of units such as the engine and various other areas. But it is also possible to validate performance in this state by visually changing the engine position on a screen.

The performance validation model of the present embodiment validates the performance of a hypothetical vehicle combining a plurality of reference vehicles (vehicles A-D in the figure). This requires calculating actual performance values (reference evaluation points) for the reference vehicle models from evaluation points for each vehicle evaluation item of each of the combined reference vehicles. In other words, it is not the case that a particular single vehicle is used as the reference vehicle, as in a layout validation model, so it is difficult to use as is the evaluation points stored in the database.

In the present embodiment, performance validation model evaluation points are calculated from the percentage contribution of the vehicle evaluation items in each area. In other words, an evaluation point count is read out for the reference vehicle set for each area, and a reference evaluation point count is determined with consideration for the percentage contribution of each location (area) shown in FIG. 21 with respect to each vehicle evaluation item. For example, the front area and the suspension area make extremely high percentage contributions to handling performance. When vehicle A is used for the front area, and vehicle B is used for the suspension, the handling performance evaluation point count for a performance validation model combining a plurality of reference vehicles can be calculated by multiplying percentage contribution times the handling performance of vehicle A and percentage contribution times the handling performance of vehicle B, then adding those together.

Here, FIG. 22 shows a computational table which defines percentage contribution with respect to each vehicle evaluation item in each area. In the example shown in FIG. 22, the definitions are such that for ride comfort performance, the suspension area contributes 50%, the engine area 30%, and the remaining 20% is contributed in units of 5% each by such items as front seat lower area. For example, if the suspension area is vehicle A, the engine area vehicle B, and the front lower area vehicle C, values defined as 50% multiplied times the vehicle A ride comfort performance point count stored in the database, 30% similarly multiplied times the vehicle B evaluation point count, and 20% similarly multiplied times the vehicle C evaluation point count are respectively added and combined to calculate a performance validation model ride comfort performance.

Moreover, in the present embodiment, to calculate the actual performance of each vehicle evaluation item in the performance validation model the influence index is fixed at a particular value. What is meant here by influence index is an index required to calculate the value of the upward or downward adjustment of the performance evaluation value; specifically, this refers to specifications, system performance, and the like. As performance validation models combine a plurality of locations (front area, etc.), rules are created in order to determine specific values for the influence index.

The following are defined as the primary such rules in the present embodiment.

(1) For specifications relating to dimensions such as roof height, when there is non-conformity at the borders of each of the areas an average value for each dimension is calculated in order to achieve that conformity between each of the areas. For example, if roof heights differ between the front seat upper area and the rear seat upper area, their average value will be used for the roof height. It is also acceptable to match to the larger of the values, giving consideration to interior space and the like.

(2) Regarding the overall vehicle center of gravity, the weight and center of gravity of each area is first calculated, then the overall vehicle center of gravity is calculated using those values as well as the relative distances between each area.

(3) Regarding the engine area and the suspension area, the respective performances thereof are used as is.

(4) Regarding body rigidity (rigidity of attaching parts, torsional rigidity, bending rigidity), aerodynamics, and the like, a calculation is made of the percentage contribution of each area as shown in FIG. 23, for example. The rigidity percentage contributions (portions of responsibility for rigidity) of the front seat lower area and the rear seat lower area are defined as being extremely high (35% each), and percentage contributions are defined for the front area and rear areas (10% each) and for the front seat upper area and rear seat upper area (5% each). For example, Vehicle A is set for the front area, so the value for Vehicle A's rigidity (stored in the existing vehicle data within the database) is multiplied by its percentage contribution (10%). Similarly, the rigidity of the Vehicle B set for the front seat lower area and rear seat lower area (stored in the database) is multiplied by the percentage contribution thereof (35%). The body rigidity of the performance validation model is calculated by adding together all of the values calculated for each area.

In this manner it is possible, for example, to obtain an index for calculating how much body rigidity decreases when a vehicle with high interior comfort (large in-cabin space and low rigidity) is selected.

Note that with respect to body rigidity, layout validation model data may be used as provisional values. That is, if planning is advanced on the premise that Vehicle D is set for the layout validation model, for example, and the primary change to Vehicle D is of systems such as the suspension, but body rigidity is not greatly changed, then the Vehicle D body rigidity may be used as the body rigidity for that performance validation model.

Body rigidity may be surmised, for example, from the "cabin longitudinal length" and bending rigidity value for a plurality of vehicles (for example, Vehicle A or Vehicle X), as shown in FIG. 24.

Next we explain the step for setting the final target value using the corrected basic target value (S3 (Step 3) in FIG. 15). The step for setting the final target value based on the corrected basic target value includes S31 (Step 31) shown in FIG. 31. In S31 (Step 31), the "basic target value" for each vehicle evaluation item is corrected and set in the system as the "target value (real target value)." In this S31 (Step 31), the operator can freely select from the following plurality of correction means.

First we explain Correction Example (1).

The operator considers the following viewpoint, manually inputs corrected values, and sets the final target value in the system. What is considered as a viewpoint is time period-related corrections. That is, the planned vehicle will be actualized in one or two years' time, therefore the vehicles which will compete with this vehicle in the market are not the currently existing benchmark vehicles, but those benchmark vehicles with further improved product qualities. The actualized planned vehicle therefore achieves advantages corresponding to the target completion range set with respect to those evolved benchmark vehicles. In this case, the "time period-related correction data" in the database is displayed for reference by the operator.

Another correction viewpoint is the correction used to more reliably attain vehicle features. That is, basic target values may be set to be even higher when one wishes to have just one particular vehicle evaluation item absolutely stand out, or when one wishes to obtain a particular prominent performance.

Next we explain Correction Example (2).

Correction from a time period-related viewpoint is automatically performed by the system based on data indicating predetermined time period-related trends. "Time period-related correction data" in the database is used. Data indicating the correlative relationship between vehicle evaluation item evaluation point count and time period (year) is stored for each category in the time period-related correction data. As an example, FIG. 26 shows a graph of the correlation between the ride comfort performance vehicle evaluation item and the time period. Such correlative relationship data for all vehicle evaluation items is stored in the database.

As shown in FIG. 26, time period-related trends for existing vehicle evaluation item evaluation points are stored as data. For ride comfort performance, it is assumed that, for example, there will be a 0.2 point rise one year forward. Operator input of the selling time period causes the target value to be automatically corrected using the type of data shown in this figure.

Data indicating the correlative relationship between specifications or system performance and time period (year) is also stored. As an example thereof, FIG. 27 shows a graph indicating the correlation between wheelbase specification and time period (year). This type of correlative relationship data is stored in the database for all specifications and system performance.

As shown in FIG. 27, time period-related trends for a specification (wheelbase) are stored as data, so that market and benchmark vehicle trends for wheelbase length at the time of sale can be forecast. For example, it is estimated by the system through an input by the operator of the selling period that the wheelbase will lengthen by 100 mm. Specifications such as wheelbase are included in the above-described influence index, so that the level of increase or decrease in vehicle evaluation item evaluation points can be computed by the system using the above-described performance influence function.

Addition or subtraction of evaluation points is carried out for all vehicle evaluation items affected by the wheelbase, and the amount of increase or decrease thereof serves unchanged as the amount of correction to the basic target value. For example, as a result of the amount of lengthening of the wheelbase and the performance influence function, correction amounts are calculated such that the ride comfort target value increases by +0.2 points and handling, because of degraded maneuverability, is decreased by −0.1 points.

As the result of making time period-related corrections in this manner for vehicle evaluation items and specifications, the ride comfort performance shown in the FIG. 25 example, which had a basic target value of 5.2-5.5-5.7 (see FIG. 16), is corrected to a final target value of 6.2-6.5-6.7, for example.

It is possible when performing such corrections in the present embodiment to set the system to be capable of correction only within a range which does not exceed a basic target value. For a vehicle with extremely high performance, on which a high cost is expended for a vehicle corresponding to Range 1, such settings permit a realistic vehicle to be planned without setting excessive target values such as would exceed such a high performance vehicle, completely without consideration for time period-related evolution.

In the embodiment, when a first target value in a certain range is 6.0-6.5-7.0, the computer performs a correction so as to keep the maximum values down to 6.4-6.7-7.0. Settings can also be performed under conditions whereby the midpoint value does not exceed a range.

In the embodiment, this automatically corrected final target value can be further modified manually by an operator. By such manual modification, the target value can be further greatly corrected to account for cases in which new technologies which will greatly affect performance improvements are anticipated in the market or in one's own company.

Next we explain Correction Example (3).

Corrections are performed based on predetermined customer requirement data in order to reliably satisfy customer requirements. In some cases these are performed automatically by the system, in other cases by optional operator input.

First we explain the case in which correction is performed automatically by the system.

As an example of customer requirement data, data indicating a correlation between a customer evaluation index for fuel consumption and actual fuel consumption (corresponding to the fuel consumption performance vehicle evaluation item) is stored in the correction data for evaluation within the database.

Data relating to customer evaluation index points for existing vehicles is stored in the existing vehicle data in the database. Note that data relating to such items as handling and engine performance such as that shown in FIG. 28A are in this type of customer evaluation index. Therefore as shown in FIG. 28B, for the benchmark vehicle selected in S12 (Step 12) of FIG. 16, a customer evaluation index point distribution (the horizontal axis is the customer evaluation index point count) is obtained for each customer evaluation index (handling, engine performance, etc.).

It is then possible to calculate customer evaluation index points with respect to such distributions which will take into account the target completion range set in S13 (Step 13) in FIG. 16, with which superiority with respect to the benchmark vehicle can be attained, as in S14 (Step 14). For example, when there is a distribution of benchmark vehicle customer evaluation index points from 80 points to 140 points, 120-140 points are calculated as the point counts corresponding to Range 1.

Here, when a basic target value for fuel consumption is calculated in S14 (Step 14) in FIG. 16 to be 4.6-4.8-5.0, for example, the customer evaluation index points corresponding to that basic target value will be less than 120 points. In such cases there is the possibility that even though fuel consumption performance itself is superior to the benchmark vehicle, customer requirements will not be satisfied. Therefore the basic target value relating to fuel consumption will be corrected upward to satisfy the customer evaluation index point count of 120-140 points, based on the data shown in FIG. 28B, and the final target value for fuel consumption will be set at 5.0-5.3-5.6.

Additionally, based on data showing the importance of each of the customer evaluation indices, stored by category or class in the evaluation supplementary data in the database as shown in FIG. 28A, such corrections of target values can be used to correct only vehicle evaluation items corresponding to customer evaluation indices with high importance (performance viewed as important by customers), or can be used to increase the amount of correction.

The final target value thus satisfies customer requirements while fitting the market and, since corrections are made based on the type of existing vehicle data shown in FIG. 28B, target values which excessively satisfy customer requirements are not set, so that ultimately a vehicle which is balanced, or which does not require excessive cost, can be planned.

Note that further modifications can be manually made by an operator to the automatically corrected target value for each vehicle evaluation item. Through such modifications it is possible, for example, to give priority to setting a manufacturer's technology levels (such as by purposely returning to the pre-corrected target value), or to setting target values which greatly exceed customer demands as the result of the manufacturer's design philosophy or product strategy.

Next we explain the case in which an operator optionally inputs data.

First, when a basic target value is calculated in S14 (Step 14) in FIG. 16, a customer evaluation index corresponding to that target value is displayed based on data such as that shown in FIG. 28A. For example, "Customer Evaluation Index (Basic Target Value): 100-120 Points" is displayed. At the same time, the FIG. 28B distribution of customer evaluation index points is displayed for the benchmark vehicle selected in FIG. 15 S12 (Step 12) (the horizontal axis is the customer evaluation index point count).

The operator can see from these two displays to what degree the customer evaluation index point counts with respect to the basic target value are superior vs. the benchmark vehicle. When the customer evaluation index point count for fuel consumption corresponds to Range 2, the operator inputs the amount of correction increase to the basic target value target value so as to obtain Range 1 superiority with respect to the benchmark vehicle. In this case, the operator refers, for example, to the data in FIG. 17B. By so doing, superiority with respect to the benchmark vehicle can be obtained as relates to technology and customer requirements.

At the same time, if it can be judged that Range 2, which is the average market level for customer requirements, is sufficient, it is then possible to select a reduced correction increase amount, or to correct downward, or to not correct. For example, if it is judged when the basic target value is calculated that the customer is seeking a certain fuel consumption performance, or that when technical trends in the automotive industry are reviewed, there is no possibility of installing a superior engine capable of increasing fuel consumption performance to that point, the target value may be lowered to a level at which customer requirements can be satisfied at an average level.

The operator can also make separate corrections to a plurality of customer evaluation indices (handling, engine performance, and the like) corresponding to each of the vehicle evaluation items. In this case, data such as that in FIG. 28A showing the degree of importance of each customer evaluation index is displayed. There are multiple such data of the type shown in FIG. 28A by category and class, stored in the supplemental data for evaluation in the database. In other words, the items seen as important by customers differ depending on category and class.

The operator, referring to data such as that in FIG. 28A corresponding to the vehicle category or class being planned, decides on the degree of correction or whether or not there will be correction by doing things such as increasing the amount of upward correction for items having a high importance, then inputs the correction amount as described above.

Note that a correction amount corresponding to the degree of importance may also be decided beforehand (stored in the database) and the correction automatically performed by the system in accord with that data.

Thus in Correction Means (3), final target values can be determined with consideration for both technical and market evaluation aspects of the benchmark vehicle.

Next we explain the step (S4 (Step 14) in FIG. 15) for calculating the gap between the reference vehicle actual capability value and the target value. The step for calculating the gap between the reference vehicle actual capability value and the target value includes S41 (Step 41) shown in FIG. 29. In this S41 (Step 41), the difference (gap) between the reference vehicle evaluation point count read in within S22 (Step 22) in FIG. 20 and the final target value set in S31 (Step 31) in FIG. 25 is calculated for each vehicle evaluation item. The calculated gap value is then displayed in the manner shown in FIG. 29 for each vehicle evaluation item, along with the final target value and the reference vehicle actual capability value (reference value). The operator can grasp the specific differences for each vehicle evaluation item and use these as an indicator of how much the performance of each evaluation item should be increased for the planned vehicle.

Additionally, in S41 (Step 41) it is preferable to display a bar graph of the type shown in FIG. 30. In the graph, the graph for Vehicle D shows the evaluation point count for Vehicle D, which is the reference vehicle for the layout validation model; the current competitive car reference value is an average value of evaluation points for each benchmark vehicle read in during S4 (Step 4), and the competitor vehicle anticipated reference value at time of sale is an evaluation point count obtained by adding time-related correction data calculated from data such as that shown in FIGS. 26 and 27 to that average value. Such average values and correction average values are automatically calculated.

Note that the evaluation point count for a rival vehicle given the highest importance from among the benchmark vehicles can be displayed. Such values can also be freely input by an operator and displayed.

The planned vehicle presumed actual capability values at the time of this S41 Step 41) are actual capability values for the reference vehicle; the planned vehicle target value is a final target value calculated in S31 (Step 31). This target value is a value with a spread corresponding to the target completion range, so in this graph both that average value and the value over that spread are displayed. An advantage is therefore afforded in that the position of the actual capability value within the spread of the target value can thus be discerned, and modification priorities can be determined in relation to other vehicle evaluation items.

Note that the planned vehicle actual capability value in the performance validation model is calculated, as described above, from evaluation point counts for a plurality of reference vehicles.

In the FIG. 30 graph, the actual capability value of the performance validation model is displayed as the planned vehicle actual capability value, but the planned vehicle actual capability value in the layout validation model can also be displayed. It is also preferable that the ratio with respect to Vehicle D, the ratio with respect to competitive reference values, and the gap value proportion be displayed as percentages (%).

Here, when a manufacturer (one's own company) begins actual development, it often does so based on one of its own vehicles (Vehicle D). Therefore an indication as to how much development is needed can be obtained by the operator by displaying the Vehicle D graph or the Vehicle D ratio. Additionally, competitor vehicle anticipated reference values at the time of sale are based on evaluation point counts for a benchmark vehicle, which can roughly be said to be the current technology level in the industry. It is thought to be relatively easy to raise performance up to that evaluation point count, therefore it can be used as an indication for the actual reference point when starting development on the planned vehicle.

Next we explain the step (FIG. 15, S5 (Step 5)) for executing vehicle planning with a vehicle model and calculating the actual capability value thereof. The step for executing vehicle planning with a vehicle model and calculating the actual capability value thereof includes S51-S56 (Steps 51-56) shown in FIG. 31, and advances vehicle planning using vehicle models (layout validation model, performance validation model).

In vehicle planning with a vehicle model and in calculating the actual capability value thereof, parts/units to be changed and performance changes are first set using the performance validation model in S51 (Step 51). Specifically, what is depicted on a setting/change screen such as that shown in FIG. 15 is the selection of Vehicle D as a reference vehicle. Information such as the fact that there is a 2.3L engine and a 4AT transmission 4 wheel automatic transmission is displayed in a tree format as Vehicle D specifications. The change button, setting button, and carryover button thereof are displayed.

Changing parts or the like permits input by the operator upon pressing, for example, the high hierarchical level power plant change button, or low hierarchical level engine specification changes or performance improvement rate settings, as shown in FIG. 32A and transmission changes; settings are made for post-change items by virtue of that input. In the example shown in the figure, a carryover of Vehicle D settings is made with respect to front suspension.

here, when an engine specification is changed, parts such as those defined at a hierarchical level below the engine (such as the air cleaner, etc.) are automatically changed to be parts which the post-change would have. When, for example, the front suspension is set to carryover at a high hierarchical level, setting of suspension parts at a lower hierarchical level thereto (such as bushings, etc.) is automatically applied.

Here, arrangements are made such that systems and parts set to carryover cannot be changed in layout validation models or performance validation models, so that operators do not make changes in error in subsequent planning. A warning is issued upon attempting to make a change, or the display on the morphing screen on which the layout validation model is displayed is changed to a color different from other portions. This type of carryover setting is also displayed on the specification input screen in the layout validation model or can be set on the specification input screen thereof.

Next, in S52 (Step 52), specifications are changed in the performance validation model.

In the performance validation model, the changed specification value is set by the operator inputting a post-change numerical value using the type of display shown in FIG. 32B.

In the present embodiment, planned vehicle personality and the intent of the operator can be built into the planned vehicle first in the performance validation model through these steps S51 and S52 (Steps 51 and 52).

Next, in S53 (Step 53), performance validation model-based planned vehicle actual capability values are calculated. Through the operations of S51 (Step 51) and S52 (Step 52), the influence index defined based on the above-described predetermined rules are changed and, as described above, evaluation points for each vehicle evaluation item (actual capability values) are calculated using the amount of change thereof and the performance influence function. By displaying these actual capability values, the operator can validate how, for example, power performance has changed as a result of changes in the engine, transmission, etc.

Next, in S54 (Step 54), a layout validation model is built. In the present embodiment, investigation using the layout validation model is performed after investigation using the performance validation model. Therefore in S54 (Step 54), as described above, conversion from the performance validation model to the layout validation model is performed so as to attain shape compatibility and to prevent major changes in the evaluation point count for each vehicle evaluation item (note that in vehicles emphasizing styling, the layout validation model may also be given priority).

Next, in S55 (Step 55), the vehicle shape or layout is modified or changed on the above-described morphing screen using the layout validation model built in S54 (Step 54). For example, it is possible to change specifications defining the engine position, or to change the vehicle height.

Next, in S56 (Step 56), the actual capability value of the planned vehicle is calculated using the layout validation model. As described above, the evaluation point count for each vehicle evaluation item is calculated using the amount of specification change, which is an influence index and the performance influence function.

By displaying the actual capability value in this manner, it is possible to validate what degree of change occurs in the handling performance evaluation point count as a result of changes to the center of gravity or yaw moment of inertia when the engine position or vehicle height are changed.

It happens that the actual capability value of the planned vehicle performance is calculated as an evaluation point count for each vehicle evaluation item.

The evaluation point count of each vehicle evaluation item is affected by specifications and system performance. Such specifications and system performance which impart such a large influence on vehicle evaluation items are defined in the present embodiment as "influence indices." FIG. 33 is a summary of such influence indices. FIG. 34, FIG. 35A, and FIG. 35B depict an example of a table which defines the relationship between each vehicle evaluation item and the influence index.

For example, in FIG. 34 the center of gravity, wheelbase, and the like are shown on the vertical axis as an influence index for the overall vehicle. In the present embodiment, the center of gravity is defined as something which affects handling performance, braking performance, and safety performance. Tables of this type are predefined for all vehicle specifications and system performances. As shown in FIGS. 35A and 35B, for example, a correlative relationship between the influence index and vehicle evaluation items is also defined with respect to system items such as the suspension or the engine. For example, suspension longitudinal rigidity is defined as imparting influence on a plurality of performances, such as ride comfort performance, which is a vehicle evaluation item.

As described above, the planned vehicle is built based on a certain reference vehicle selected from existing vehicles. Therefore the existing vehicle has evaluation points for each vehicle evaluation item as objective, accurate values, and in the present embodiment, such objective reference vehicle evaluation points are added or subtracted using the performance influence function stored in the database computing data in order to calculate planned vehicle actual capability values.

Here, the handling performance evaluation point count, for example, increases when the vehicle center of gravity is lowered. The performance influence function, one example of which is shown in FIG. 36, is what defines this type of relationship as an objective numerical value. In the FIG. 36 example, definition is made of the amount of fluctuation (performance influence amount) of the handling performance evaluation point count, which is a vehicle evaluation item with respect to the amount of change in the "center of gravity" which serves as an influence index. This type of relationship is obtained from past research and development as well as from testing using actual vehicles.

In the present embodiment, when planned vehicle specifications or system performance are changed, the actual capability values thereof are calculated as an objective numerical value; therefore data is created ahead of time for all combinations of influence indices (all specifications and system performance) and vehicle evaluation items. Consequently when the wheelbase is raised, for example, objective relationships are obtained, such as that ride comfort evaluation points increase by ___ points, or handling performance evaluation points decrease by ___ points.

Note that the performance influence function is expressed as a linear function, but it could also be expressed by other functions such as a quadratic function.

Moreover, in the present embodiment a margin of error with respect to the size of that performance influence amount is defined as a performance influence margin of error function, as exemplified in FIG. 36B. In the example shown in FIG. 26B, the relationship is such that the margin of error is ±3% when the center of gravity is changed by 50 mm. This margin of error amount differs by vehicle category. In a sports car, for example, extreme emphasis is given to handling performance, so the margin of error amount is purposely set to be high, and the operator is made aware that addition or subtraction of evaluation points may have an extremely large influence on handling performance.

When calculating planned vehicle actual capability values, in the instance where planning has begun and changes are made such that the reference vehicle center of gravity is lowered by 50 mm, 0.2 points are added to the reference vehicle handling performance evaluation point count in order to calculate the planned vehicle actual capability values. At the same time, in cases in which the suspension type is changed, other influence indices such as suspension longitudinal rigidity are also changed, as shown in FIG. 35A, together with that change in suspension type; therefore what happens to the handling performance evaluation point count is determined by the sum total of additions and subtractions of all the performance influence functions of those influence indices.

In this manner the actual capabilities of the planned vehicle are calculated as objective numerical values in cases where changes are made to specifications or system performance.

Next we explain the conversion of a performance validation model to a layout validation model. For a planned vehicle, it is necessary that ultimately a shape-compatible model be obtained. In other words, when planning is advanced using a performance validation model, the conversion to a layout validation model produces the requirement to correct contradictions in positioning and shape continuity between various systems or areas to establish an overall vehicle shape or structure. In such cases, conversion is performed by rules such as those described below.

First, a description of which items should be given limitations in the layout validation model is extracted from the performance validation model. For example, items such as bumper position, overhang distance, cowl position, hood height, and the like which are bound by crash requirement performance, etc. are maintained as is in each of the performance validation model specifications. In the layout validation model, the engine is placed in a position which does not interfere with such a cowl position or hood height.

Additionally, items such as the wheelbase, which influence a variety of vehicle evaluation items, are basically not changed. In other words, for specifications which are adjusted in order to obtain shape compatibility, a fixed order of priority is determined for each area, and adjustment is performed starting from the low priority order thereof. In this way shape compatibility can be obtained while as much as possible maintaining performance. Specifically, specifications and systems having a high percentage contribution of influence on vehicle evaluation items are predefined, and the order of priority for adjustment is determined as a rule by fixing high percentage contribution specifications or the like based on those definitions.

Percentage contributions for reproducing external appearance shape are also determined per area. For example, in a case where it is preferable for the cowl position to be low with respect to visibility and high with respect to crash performance, the front area percentage contribution is made large (for example, 80%) in the front area and the front seat upper area or front seat lower area in order to maintain the performance evaluation values of the performance validation model, while the cowl position is not permitted to vary much within that front area.

Building of the layout validation model and the performance validation model may be advanced in parallel. In such cases, changing specifications (wheelbase) in one of the models, for example, should cause the specification to change in the other model, and shape or performance should also be changed in tandem. That is, when the wheelbase is changed, the shape (layout validation model) also changes, as does performance (performance validation model) such as ride comfort or the like.

Also, the engine center influences performance such as handling and stability, so the engine center is determined first in the performance validation model. The engine in the layout validation model is then positioned based on that engine center. At that point, a warning indication is given when layout requirements are not met, such as when the gap between the engine and the dashboard is too small, or heat removal requirements are not met. In such cases, the operator adjusts other portions in such a way that the gap with respect to the dashboard, etc. is secured, using the engine center as a limiting condition.

In such cases, the operator proceeds with development imagining a single vehicle for each model—a vehicle having this shape (layout validation model Vehicle D) and this performance (the combined performances of A-D). To advance planning work in that way ultimately requires creating a single vehicle, so adjustments are made at the operator's discretion so that the models mutually approach one another. In order to facilitate the operator's work, a model combining vehicles A-D may also be displayed by superimposition in the layout validation model, and the shape of the Vehicle D which is the reference vehicle for the layout validation model can be changed by referring to that display.

In cases such as those in which the development of a shape is given priority, planning using a layout validation model may be advanced first, with planning using a performance validation model advanced subsequently or in the midst thereof.

Note that conversion from a performance validation model to a layout validation model is not necessarily always possible. For example, in cases where it is preferable for cowl position to be low from a visibility standpoint and high from a crash performance standpoint, it may not be possible to satisfy that type of trade off relationship. In such cases it is necessary, for example, to permit interference between locations, to display shapes (layout validation model), or to otherwise compromise, so it is desirable for an operator to make modifications using the layout validation model, bearing in mind any published errors.

There may also be cases in which even though the operator makes adjustments between vehicle models, the design criteria (collision space (distance between parts), heat requirements, etc.) or regulations cannot be met, and the vehicle cannot be realized.

Models which exclude structural models may also be used as layout validation models. This particularly allows for validation of exteriors, interior space, visibility, and the like. For performance which includes such items as rigidity or strength, validation is done using the performance validation model. Ultimately that performance validation model and the layout validation model are combined. Incompatible portions (border portions of each area, portions interfering with other exterior models, etc.) can be modified as described above. The layout validation model reference model or exterior appearance model and the like may also be built from a plurality of reference vehicles combined in a performance validation model. In such cases, incompatible portions are modified Next we explain the step for computing the gap between the planned vehicle actual capability value and the target value (FIG. 15 S6 (Step 6)). The step for computing the gap between the planned vehicle actual capability value and the target value includes S61 (Step 61) shown in FIG. 37.

As in the above-described FIG. 29 S41 (Step 41), in S61 (Step 61) for computing the gap between the planned vehicle actual capability value and the target value, the difference (gap value) is calculated between the planned vehicle actual capability value (vehicle evaluation item evaluation point count) at the current time as obtained from the results of the investigation in FIG. 31 S51-S56 (Steps 51-56) for each vehicle evaluation item, and the final target value is set in FIG. 25 S31 (Step 31). The gap value display (see FIG. 37) and the graph display (see FIG. 30) are at this time displayed. FIG. 37 shows the gap value display. It can be seen that the handling performance actual capability value is barely within the target value, and that the fuel consumption performance is not within the target value.

Here, when vehicle planning is continued, an effect on handling performance can also be anticipated if changes are made to specifications or systems in order to improve the fuel consumption performance which completely fails to reach the target value. Therefore with respect to handling performance, the plot is displayed with white triangles to show that while it is within the target value, it is not sufficient. The present embodiment is arranged from a system standpoint such that the target is determined to have been fully reached when the target average value (6.5 points for handling performance) is met, and the planned vehicle will have actual competitiveness in the market.

Comparing the difference between the planned vehicle and the final target value with the difference between the planned vehicle and the reference vehicle performance evaluation value in S15 (Step 15) thus makes it possible to grasp the degree to which the difference has shrunk. The operator can effectively and efficiently advance the planning work by using this type of display midway through the planning process.

For example, when power performance failed to reach the target value, the engine output was set to increase by 2% in S9 (Step 9), but it can be judged that an additional 5% increase is needed. If it is then determined as the result of a specific investigation that a 5% increase is difficult, a specific investigation can be made into specification changes, such as adding a turbo to achieve the target.

Data such as system and part costs and weights are stored in the database, thus enabling overall vehicle cost and weight to be calculated. Investigation now becomes possible in which such numerical values are displayed and consideration is given to the percentage of cost increase, weight increase, and the like.

Next we explain the step for examining gap elimination (FIG. 15, S7 (Step 7)).

Vehicle planning including a philosophy and concept for the planned vehicle is carried out in S51-S56 (Steps 51-56) in FIG. 31, but when the gap value calculated in FIG. 37, S61 (Step 61) is large, the operator will need to take some measure, such as changing specifications or systems, for example. It will not be realistic to manufacture and sell the vehicle if the cost of the planned vehicle becomes excessively high. Therefore in the present embodiment the planning support system supports the operator by displaying, for an objective understanding based on data, what problems exist and how to solve them.

First we explain the case in which the planning support system displays an opposing relational map, which is to say a relational map of opposing (in a trade off relationship) vehicle evaluation items.

First, FIG. 38 shows an example of an opposing relational map. In FIG. 38, as one example of an opposing relational map, a correlative relationship is displayed between the handling performance of a planned vehicle and a predetermined existing vehicle, and road noise performance. Note that opposing relationships refers to trade off relationships such as one in which when suspension rigidity is increased in order to raise handling performance, road noise performance normally decreases.

In this figure the planned vehicle is plotted with black triangles for display; other plots depict existing vehicles. Target completion ranges corresponding to each performance category are displayed on the horizontal and vertical axes. In the present embodiment, the existing vehicle displayed in the plot is the benchmark vehicle.

In a graph such as that shown in FIG. 38, all of the opposing vehicle evaluation items (for example, fuel consumption performance and power performance, etc.) can be respectively displayed by category and by class.

In order for the operator to obtain from an opposing relationship map a Range 1 target completion for both handling performance and road noise performance, which are mutually opposing, it may be judged that, considering the extremely large influence of the suspension system on handling performance and road noise performance, a system equal (of equal technology) to the vehicle suspension system depicted by the double circle plot is desirable. And the operator can judge from such double circle plotted evaluation points whether or not the gap value calculated in S61 (Step 61) can be eliminated.

An operator can thus view the relational map in one glance, grasp the trade off relationships, and improve work efficiency thereby.

Note that it is also possible to display a particular only an individual vehicle evaluation item (for example, handling performance only) by plotting. Opposing relational maps as well as one more vehicle evaluation item such as ride comfort or the like may also be added to create a display having a total of 3 axes in a mutually opposing relationship.

The planning support system can also make calculations for a vehicle having evaluation points higher than the gap calculated in S61 (Step 61) (a vehicle in which the gap can be eliminated) with respect to planned vehicle actual capability values (in the figure, the plot indicated by black triangles), based on evaluation points for each vehicle evaluation item stored in the existing vehicle data in the database. What is displayed in this example is a suspension system installed on a vehicle from which the gap can be eliminated. In other words, in this example there are three suspension system selections displayed with which the gap can be eliminated, from (1) to (3).

Here, in the present embodiment, the selection of information relating to vehicles which excessively eliminate the gap, which is to say greatly exceed the target value, is intentionally not displayed. For example, information relating to the vehicle shown by the star plot in the figure is not displayed. By so doing, a vehicle which reliably reflects the manufacturer's personality can be planned without upsetting the balance among each of the vehicle evaluation items.

The type of oppositional relationship map shown in FIG. 38 is displayed in response to a segment and class selected in S11 (Step 11) in FIG. 16 so that, for example, a sports car suspension system is not displayed for a minivan selected in S11 (Step 11). In other words, the gap value can be reliably eliminated and a realistic selection made based on technology installed on the planned vehicle (for example, a suspension system suited to a minivan, etc.).

Here, when there is no choice capable of eliminating the gap (for example, the alternative technologies depicted by the respective double circle, black circle, and white square plots in the FIG. 38 graph), that fact is displayed (not shown here). In that case, the operator can see that new suspension system development or adjustment of other specifications and the like is required.

At the same time, a vehicle which is realistically capable of being manufactured and sold can be planned in the vehicle planning stage, taking into consideration cost and vehicle weight. In the present embodiment, therefore, what is displayed from among the choices capable of eliminating the gap are those which require the least cost, or have the minimum additional vehicle weight (or the largest reduction in vehicle weight).

Specifically, when the operator pushes the "cost" or "vehicle weight" buttons displayed on the lower right in FIG. 38, the vehicle planning support system picks the most appropriate item from the selections and displays it. In other words, the vehicle planning support system refers to the cost and vehicle weight data stored in the existing vehicle data in the database, picking the smallest of each. In the example in FIG. 38, the suspension system (3) (the white square plot) is most appropriate for cost, whereas the suspension system (2) (black circle plot) is most appropriate for weight.

It is clear, that is, that the suspension system indicated by a double circle plot is extremely advantageous from the standpoint of handling performance and road noise performance, but is inferior regarding cost and weight. Note that a plurality of selections can be displayed in order of cost and weight, or can be displayed as the values of the cost and weight themselves.

Based on this type of display, the operator can, in view of cost and weight, make judgments such as which of the three suspension system technologies to refer to (use as the basis for development), or to use another suspension system (the black triangle plot) notwithstanding its inferior performance, or whether new technology development is required. This gap elimination investigation can thus also be used as an aid to management decision making, including cost aspects.

Next we explain the case in which the planning support system displays a radar chart to support investigation of gap elimination.

As described above, opposing vehicle evaluation items can be displayed and technology for adoption can be examined using the opposing relational map depicted in FIG. 38, but it is desirable to obtain a planned vehicle in which all vehicle evaluation items are balanced (a vehicle which attains each of the target completion ranges). In the present embodiment, therefore, the operator is supported by displaying, based on predetermined criteria (rules), solution radar charts for examining gap elimination while achieving a balance of vehicle evaluation items.

For example, in the case in which, as shown in FIG. 39, the actual capability values of each vehicle evaluation item with respect to the final target values (S4, S7) set in accordance with the target completion ranges are such that road noise performance is superior to other performances, and fuel consumption and emission performance are inferior, there would not be a balance of the target completion status. Left in this state, balance between vehicle performances would be lost.

FIG. 40 shows a display which allows the operator to compare and adjust such balances. In the planning support system, the balance of the actual capability values of each vehicle evaluation item is converted to a point count based on a predetermined criterion, then made into a radar chart, and displayed as shown in FIG. 40.

In the present embodiment, the radar charts are displayed at three hierarchical levels. The first hierarchical layer, as shown in the figure, displays the balance of each of the vehicle evaluation items (first hierarchical layer items); the current balance is displayed. The second hierarchical layer, as shown in FIG. 40, displays technology items relating to each of the respective vehicle evaluation items (second hierarchical layer items). In the FIG. 40 example, technology items related to fuel consumption performance are displayed. The third hierarchical layer displays yet lower level technology items (third hierarchical layer items) relating to respective technology items for that second hierarchical layer, and in the FIG. 40 example, technology items relating to engine fuel consumption rates are displayed.

In each of these hierarchical layers, items in the same row, which is to say vehicle evaluation items (first hierarchical layer), or performances or specifications which influence each vehicle evaluation item (second hierarchical layer), or parts or specifications which influence that performance (third hierarchical layer) are respectively displayed. For example, in the third hierarchical layer this would be such things as tread pattern or tire width with respect to second hierarchical layer tire rolling resistance, or vehicle height or Cd value with respect to second hierarchical layer air resistance, or FGR (final gear ratio) or transmission weight with respect to second hierarchical layer transmission performance. Note that each of the second and third hierarchical layer items is an influence index as described above.

It happens that in FIG. 40 it is acceptable to reduce rolling resistance (tire), or to decrease weight, or change the transmission, or to improve the engine in order to improve fuel consumption performance, but there are cases in which it is difficult for the operator to judge what should be changed and by how much.

In the present embodiment, therefore, the operator is first of all able to adjust the balance of each of the displayed hierarchical layers by dragging or the like. Then when vehicle evaluation items—which are high level hierarchical layers— are adjusted, the balance of the second and third hierarchical layers—which are low level hierarchical layers—are automatically changed according to predetermined conditions, and the operator is able to see which technology item should be adjusted in order to solve the adjusted balance.

At the same time, when the low level third hierarchical layer balance is adjusted, the balance of the higher level second and first hierarchical layers is automatically adjusted by the above-described performance influence function, and it is evident how much influence is imparted by the adjustment of the low level hierarchical layer thereof on the balance of vehicle evaluation items, for example.

When the second hierarchical layer balance is adjusted, the low level third hierarchical layer and the high level first hierarchical layer are respectively changed in a manner similar to these cases.

We will now explain the method for making these adjustments and the conditions for system-based balance changes.

First we will explain the conditions for low level hierarchical layer changes when an operator adjusts the high level hierarchical layer balance.

In the planning support system of the present embodiment, items (influence indices) to be changed in the low level hierarchical layer are determined as a condition thereof (the first condition), taking into consideration the degree of influence by the influence index on the vehicle evaluation item.

Here, the size of the influence imparted on the vehicle evaluation item differs for each influence index. For example, suspension performance and center of gravity are influence indices for the handling performance shown in FIG. 33, but the amounts of change in handling performance (the slope of the performance influence function, etc.) with respect to those change amounts respectively differ, from those with a large influence to those with a small influence.

At the same time, there are among the influence indices some which impart an influence on a plurality of vehicle evaluation items (weight and suspension performance, etc.) and those which impart an influence on only a few or a single vehicle evaluation item (fuel tank dimensions, etc.).

In the present embodiment, the size of the influence imparted on a give vehicle evaluation item with respect to each influence index and the number of vehicle evaluation items which impart an influence are predetermined. For example, in a table such as that in FIG. 33, "wheelbase (45)" and a numerical value (degree of influence numerical value) are added to the wheelbase. The 10s place expresses the size order of the degree of influence within a certain vehicle evaluation item (in this example, the size of the influence imparted by the wheelbase on handling performance is the fourth item). The 1s place expresses the number of vehicle evaluation items which impart an influence (in this example, the wheelbase imparts an influence on five vehicle evaluation items). Although not shown, similar degree of influence numerical values are defined for other influence indices.

As shown in FIG. 40, in the first hierarchical layer display screen a degree of influence button is pushed, and a degree of influence of that type is considered. In the figure, the operator increases fuel consumption performance and slightly decreases road noise performance, as shown by the dotted line, in order to adjust the balance with respect to the actual capability values indicated by the solid line.

In such cases, in order to obtain the changed balance, the system first changes the item with the largest influence on fuel consumption performance (the item in the above-described degree of influence for which the numerical value in the 10s place is "1") in the low level hierarchical layer and the items with the smallest influence on other vehicle evaluation items (the item in the above-described degree of influence for which the numerical value in the 1s place is "1"). Changes are then successively made to those items for which the degree of influence is next greatest in size, and for which the influence on other vehicle evaluation items is next smallest. The number and amount of change of influence indices changed in the second hierarchical layer and the third hierarchical layer are determined in such a way as to attain the balance adjusted by the operator in the first hierarchical layer. In other words, the amount of change in the influence indices can be determined by the performance influence function described above, which defines all influence indices and the amount of increase or decrease of vehicle evaluation item evaluation points.

FIG. 41 shows the case in which, in the first hierarchical layer, suspension performance and ride comfort performance have been increased relative to other performances. Since the suspension and body performance contribute greatly to these performances, a balance is shown in the second hierarchical layer in which the suspension parameter and the body performance are increased.

These types of amounts of change or specific solution technologies are displayed in the second and third hierarchical layers. As shown in the figure, for example, a balance in which the suspension or the body performance are raised is displayed as a second hierarchical layer, while such items as the damper spring attenuation value are shown in the third hierarchical layer as equal solution technologies relating to suspension performance, and cross member section and under panel sheet steel material and the like are shown as equal solution technologies relating to body performance.

As shown in FIG. 41, it is also possible in the first hierarchical layer to display in combination the target completion status of the handling performance when these technologies are adopted (the 95% and 110% graphs) so as to aid operator judgment.

It is possible to determine and display second and third candidates for the changes used for this type of balance elimination. Therefore even if it is decided, for example, that it is sufficient in the first candidate for handling performance to simply be changed from a strut to a multi-link suspension, candidates in which other specifications or systems are changed can also be obtained while maintaining the strut suspension desired by the operator.

If the system selects, for example, to change the suspension itself to that of an existing vehicle, that result will be reflected in the above-described opposing relational map. In other words, the opposing relational map shown in FIG. 38 displays in a way that the operator can understand that the suspension selected by the system is the one plotted with black circles, and the operator can then more easily judge in subsequent vehicle planning it will be sufficient to modify the engine.

In this manner, gap eliminating technology is selected.

Cost and weight can next be given consideration as second and third conditions, and second and third hierarchical layer items (influence indices) to be changed, as well as the amounts of change thereof, can be determined. In these cases, the order of priority of the items being changed is such that, in the case where cost is emphasized, for example, because fuel consumption performance is changed, changes are made in order of smallest cost of each part or system stored in the database among those influence indices which influence that fuel consumption performance. When the cost is of the same order, change is made in order of priority starting with those items with the largest degree of influence imparted on vehicle evaluation items, as well as the smallest influence on other vehicle evaluation items (items with a small degree of influence numerical value as described above). By so doing, the amount of change in second and third hierarchical layer items is determined in such a way as to result in lower cost and fewer items for adjustment. The same is true with respect to weight. In these cases as well, a plurality of balance-able candidates can be displayed.

Here, there are naturally also cases in which it is difficult for the balance adjusted by the operator in the first hierarchical layer to be attained completely. In such cases, the item closest to the balance (dotted line in the figure) adjusted by the operator in the first hierarchical layer is determined. In such cases a warning (not shown) is displayed, while at the same time that determined balance is displayed in superimposition (for example, the fuel consumption performance value becomes 3, while the road noise performance balance value drops down to 3, the handling performance balance value drops to 2.5, etc.). A corresponding target completion status is also displayed (in the FIG. 41 graph, for example, it is displayed as 95%).

In such cases, the operator can judge that there is need to reexamine the type of opposing relational map shown in FIG. 38, or to do new development or the like.

This permits selection of technology to eliminate gaps while taking into consideration cost, weight, etc.

Next we explain an example in which past examples are considered as a fourth condition to determine which second hierarchical layer and third hierarchical layer items are changed and the amounts of change thereof.

"Past examples" refers to examples of vehicles planned in the past using this system. For this fourth condition, elimination of the current planned vehicle gap is investigated based on the FIG. 42 type of planning requirements stored in the supplementary data for evaluation in the database (category or class, development time period, cost, equipment conditions, etc.), or on the evaluation point count for each vehicle evaluation item (time of planning start, actual capability value at midway and end of planning).

Using this type of past example data, the system selects from past vehicles a past example having a first hierarchical layer balance such as that shown in FIG. 43, for example (fuel consumption performance is 2, road noise is 4, and other is 3). Specifically, an item with that type of balance is selected from among data for the evaluation point count of vehicle evaluation items for a plurality of past vehicles. When that selected past vehicle is the past vehicle 1 as shown in FIG. 42, for example, it will be highlighted in the display to make that clear. The example shown in FIG. 42 selects an instance in which the handling performance is raised from 5.6 to 6.0.

As a variation, the planning support system may also select past examples in which the calculated gap amount is eliminated. In such cases, past examples capable of eliminating the gaps in each of the planned vehicle evaluation items may be selected by first searching for past examples in which the gaps in vehicle evaluation items with large gaps are eliminated, narrowing down from within these to the next biggest gap vehicle evaluation items. Results selected by the system are displayed in a list. In cases where it is not possible to eliminate the gap for all vehicle evaluation items, the gap elimination status may also be arrayed in order and displayed.

It is also possible to display a radar chart of the type shown in FIG. 43 (first through third hierarchical layers) together with this type of display in a past example vehicle. This type of radar chart can also be displayed next to one for the planned vehicle.

The operator can refer to such lists or radar charts of the planned vehicle and selected past example vehicles to adopt technologies for eliminating gaps in the current planned vehicle or to obtain development benchmarks, as shown in FIG. 46.

Note that settings can be made ahead of time so as to satisfy desired requirements from among a plurality of requirements (for example, vehicle evaluation items for handling), or when there is a desire to increase handling performance in particular, such requirements can be selected from a range which also includes sports cars, not limited as to category. When there is a plurality of selected past vehicles, they may be freely rearranged in any desired order (such as by selecting from among vehicles which satisfy handling performance, followed by those with good ride comfort, etc.).

Past data under relatively close planning requirements, or requirements the operator notices, in particular with reference to balance, can be effectively used for current vehicle planning.

Next, taking customer requirements as a fifth condition, items and amounts of change can be determined for the second and third hierarchical layers that are to be changed.

For this fifth condition, the system preferentially selects items (influence indices) for which, at the time changes are made to second and third hierarchical layers, customer evaluations of performance deemed important by customers will increase, and items (influence indices) with a large degree of influence (items with a small degree of influence number).

Here, as explained above, data relating to the degree of importance of customer evaluations (see FIG. 44) or data showing a relationship between customer evaluation index and vehicle evaluation item (see FIG. 45) are stored in the database. Additionally, data for the relationship between each of the items shown in the figure (in FIG. 45, the wheelbase (influence index)) and customer evaluation index points is stored in the database for all influence indices (second and third hierarchical layer items).

Therefore performance viewed as important by customers is determined from data of the type show in FIG. 28A; items (influence indices) for which those customer evaluations increase are determined from FIG. 33, and the relationship between the actual capability values of each vehicle evaluation item and customer evaluation index points is determined from FIG. 28B.

In this manner, solution technologies are selected by the system to obtain the balance adjusted by the operator in the first hierarchical layer, taking into consideration customer requirements.

When the system has made a technology selection according to the first-third conditions described above, the conformity with customer requirements is displayed as shown in FIGS. 44, based on the data in FIGS. 28A and 28B. For example, increases or decreases in customer evaluations due to changes in each influence index are calculated based on changes in second and third hierarchical layer items and on the figures; increases or decreases in customer evaluations due to changes in first hierarchical layer vehicle evaluation item evaluation points are also calculated, and those calculation results are applied to a predetermined criterion, producing a display of conformity to customer requirement in the form of a "Rank A," "Rank B," and so forth. For the predetermined criterion, in the example shown in FIG. 44, 6.0 points or greater with respect to ride comfort, for example, is given an A rank, 5.5-5.9 points a B rank, and the like in accordance with the vehicle evaluation item point count distribution, so that a database conversion is performed for each vehicle evaluation item.

In the display shown in FIG. 40 it can be seen that customer requirement conformity goes from the B rank to the A rank for fuel consumption performance, satisfying the customer requirement, and even if the evaluation points themselves decline from 4 to 3.5, customer requirements are still satisfied.

In this manner, technology to eliminate the gap is selected with customer requirements in mind.

We will next explain the case in which low level hierarchical layers (the second or the third hierarchical layer) are changed.

When a third hierarchical layer item is changed, evaluation points for each vehicle evaluation item are added or subtracted by the performance influence function described above, and the display of the first hierarchical layer vehicle evaluation item balance is changed. Since the operator is able to know the fluctuations in vehicle evaluation item evaluation points when each of the third hierarchical layer items is changed, operating efficiency is improved and goals can be achieved sooner. The same is true when second hierarchical layers are changed. For third hierarchical layers, the items changed and the amount of change thereof are determined by the first through fifth conditions described above.

Next, as another example, we explain the case in which, when there is a large gap in power performance, an operator freely selects which engine to pick while looking at a predetermined list.

For example, a system selection list (list of selection options) is displayed as shown in FIG. 42 as a list, in accord with category or other planning conditions (category, class, displacement, drive system, etc.). The content of this list can be freely rearranged according to the order of highest vehicle evaluation item evaluation points, order of cost, etc.

It is also possible for this list to be displayed with respect to a certain vehicle evaluation item, for example, in terms of systems or parts capable of achieving that target value. In other words, when a change is hypothetically made to a particular combination from among existing combinations of engines, transmissions, and the like, a planned vehicle evaluation point count is calculated using influence index data for those engines and the like, and the performance influence function (see FIG. 36), so as to calculate whether or not the target value can be achieved. In this case, it is also possible to compare in order of largest elimination, or smallest cost or weight. The results can also be arranged in order of satisfying customer requirements, using data such as that shown in FIG. 44. An operator can also eliminate a gap by selecting a unit or the like from within those results.

Various information (weight, cost, etc.) can also be displayed (not shown) together with such a list. In FIG. 47, the display is by combination (selection No.), but the engine or transmission can also be displayed separately and freely selected. The vehicle evaluation item evaluation points when planned vehicle systems or parts are changed can be displayed as shown in FIG. 46, or in a balance display, etc.

Vehicle planning can be significantly advanced using the gap elimination investigation above. In the past, that is, design engineers would also participate in technical and cost considerations at the planning stage. In such cases, adjustments were made between the various departments based on know how and the like held by each department, without the type of data shown in FIG. 38 or FIG. 40, requiring time and tending toward average cars as a result. By contrast, the present planning support system enables this type of evaluation to be performed based on objective data, increasing vehicle planning efficiency and making more realistic planned vehicles.

Following these steps, planned vehicle building is completed by moving to the FIG. 15 S8 (Step 8) detailed investigation, the S9 (Step 9) presentation, and the S10 (Step 10) design stages.

By making use of the vehicle planning support system described above, manufacturers can develop vehicle concepts which include even vehicle shapes, engines, and other basic structures (including layout, packaging, and the like) at the vehicle planning stage which is so important and necessary for automobile manufacturers, and can thereby plan tangible vehicles. In other words, the main features of vehicle performance (for example, factory manufacturability, legal compliance, strength, aerodynamic performance, crash performance, etc.) can be examined at the planning stage.

Furthermore, if a prototype vehicle of that planned vehicle is built, it will conceptually satisfy the basic performance requirements. This will reduce the need for testing and shorten design time. It is also then sufficient to take noise reduction measures and make built-in adjustments for small interferences between parts and the like. In other words, the CAE validation and the like which was conventionally done in the design stage can now be efficiently performed together with vehicle planning, so as to shorten the planning stage.

When planning accuracy is increased, the design stage is shortened. Investigation, including of the vehicle structure (frame shape, etc.) is performed at the planning stage, so the design stage can be shortened.

Note that detailed design items such as welding, purchase sourcing, attachment locations, and the like can be handled at the design stage.

While the present invention has been illustrated by means of the preferred embodiment, one of ordinary skilled in the art will recognize that modifications and improvements can be made while remaining within the spirit and scope of the invention. The scope of the invention is determined solely by the appended claims.

The invention claimed is:

1. A vehicle planning support system for supporting the planning of new vehicles by building vehicle models, comprising:
  a database for storing vehicle data for building vehicle models, and
  a computing device utilizing the vehicle data stored in the database to build planned vehicle models for the vehicle being planned, wherein
  performance evaluation values for quantifying performance evaluations of the vehicle with respect to each of a predetermined evaluation items are included in vehicle data stored in the database for a plurality of existing vehicles,
  timing-related correction data indicating trends in time period-related changes in performance evaluation values based on performance evaluation values for past and present existing vehicles for each evaluation item is stored in the database, and
  the computing device has
  a performance evaluation values distribution defining section for defining a distribution of performance evaluation values of at least a section of comparison subject existing vehicles among the plurality of existing vehicles with respect to each evaluation item based on the data of the performance evaluation values for quantifying performance evaluations for a plurality of existing vehicles stored in the database,
  an initial target value setting section for setting initial performance target values of the planned vehicle with respect to each evaluation item based on the performance evaluation values distribution which is defined by the performance evaluation values distribution defining section, for at least a section of comparison subject existing vehicles among the existing vehicles,
  a final target value setting section for setting final performance target values of the planned vehicle with respect to each evaluation item by correcting the initial performance target values to match the planned vehicle selling period, based on the timing-related correction data,
  a performance calculation section for computing performance evaluation values of the planned vehicle with respect to each evaluation item, and
  a target degree-of-completion calculation section for obtaining a target degree-of-completion by comparing the final performance target values and performance evaluation values of the planned vehicle with respect to each evaluation item.

2. The vehicle planning support system set forth in claim 1, wherein ranking information indicating a ranking determining the relative position in the performance to be achieved by the planned vehicle relative to performances of a competitive group of vehicles is stored in the database for each evaluation item, and,
  the initial target value setting section of the computing device segments performance evaluation values into a plurality of ranges based on the distribution of the performance evaluation values for the subject existing vehicles of the comparison with respect to each evaluation item, adopting performance evaluation values within ranges corresponding to the set ranking as respective initial performance target values for each evaluation item.

3. The vehicle planning support system set forth in claim 1, wherein the initial target value setting section sets initial performance target values for each evaluation item based on a distribution of performance evaluation values for the subject existing vehicles of the comparison, set separately from those of the competitive vehicles.

4. The vehicle planning support system set forth in claim 1, wherein ranking information indicating rankings determining the relative position in performance to be achieved by the planned vehicle relative to performances of a competitive group of vehicles is stored in the database with respect to each evaluation item, and
  the initial target setting section of the computing device segments performance evaluation values for each evaluation item into a plurality of ranges based on a distribution of performance evaluation values for the subject existing vehicles of the comparison, adopting performance evaluation values within ranges corresponding to the set ranking as the respective initial performance target values for each evaluation item, and
  the final target value setting section of the computing device uses final performance target values as values within the same range as initial performance target values.

5. The vehicle planning support system set forth in claim 1, wherein
customer evaluation index values quantifying customer requirement levels with respect to each evaluation item, and
correspondence data indicating a correspondence between the customer evaluation index values and performance evaluation points are stored in the database; and,
the final target value setting section corrects the initial performance target values by obtaining performance evaluation values corresponding to customer evaluation index values, based on the correspondence data, so as to satisfy these corresponding performance evaluation values.

6. The vehicle planning support system set forth in claim 1, wherein
vehicle data stored in the database further includes change effect data which correlates changes in vehicle constituent elements with fluctuations in performance evaluation values caused by those changes in constituent elements;
said computing device furthermore having a vehicle model building section for building reference vehicle models based on vehicle data for vehicles selected from among existing vehicles, and for building planned vehicle models in which constituent elements of the reference vehicle model are changed, and
the performance computing section of the computing device computes performance evaluation values with respect to each evaluation item for the reference vehicle model and corrects performance evaluation values for planned vehicle models in which constituent elements of the reference vehicle model have been changed, based on the change effect data.

7. The vehicle planning support system set forth in claim 6, wherein constituent element data for vehicle data stored in the database is hierarchically structured, and
when high level constituent elements of the hierarchical structure are changed, low level constituent elements of that hierarchical structure are also changed in tandem.

8. The vehicle planning support system set forth in claim 6, wherein
when a change-restricted constituent element in the reference vehicle model is specified, the vehicle model computing section does not accept changes in the change-restricted constituent element.

9. The vehicle planning support system set forth in claim 8, wherein the vehicle model computing device distinguishes constituent elements for which changes have been restricted from constituent elements for which changes are unrestricted in the reference model, and displays.

10. The vehicle planning support system set forth in claim 1, wherein the computing device furthermore has
a layout validation model building section which, based on vehicle data for a first reference vehicle selected from among the existing vehicles, displays the vehicle model shape on a screen and builds a layout validation model for evaluation of the planned vehicle, and
a performance validation model building section which, based on vehicle data for a second reference vehicle selected from among existing vehicles, builds a performance validation model for evaluating the evaluation items with respect to the performance of the planned vehicle, separate from the layout validation model, without displaying the vehicle model shape, and
the performance computing section in the computing device computes performance evaluation values with respect to each evaluation item for the performance validation model, and
the degree-of-completion computing section in the computing device compares the final performance target values and the performance evaluation values for the performance evaluation vehicle with respect to each evaluation item in order to obtain a target degree-of-completion value.

11. The vehicle planning support system set forth in claim 10, wherein the performance evaluation vehicle model building section builds a performance validation model based on vehicle data for a second reference vehicle, different from the first reference vehicle.

12. The vehicle planning support system set forth in claim 10, wherein the performance evaluation vehicle model building section builds constituent parts for each of multiple vehicles selected from the existing vehicles as the second reference vehicle, and further combines these vehicle constituent part models to build performance evaluation vehicle models.

13. The vehicle planning support system set forth in claim 12, wherein the percentage contribution of vehicle constituent parts with respect to the overall vehicle for each performance evaluation item is included in the vehicle data stored in the database, and
the performance computing section, using vehicle data showing a percentage contribution by each vehicle constituent part, computes an evaluation point count with respect to each evaluation item for the performance evaluation vehicle model.

14. The vehicle planning support system set forth in claim 12, wherein the performance evaluation vehicle model computing section obtains a weight and center of gravity for each vehicle constituent part model and, furthermore, obtains a weight and center of gravity for the performance evaluation vehicle model from the weight and center of gravity of each vehicle constituent part model.

15. The vehicle planning support system set forth in claim 1, wherein the computing device furthermore has
a layout validation model building section for building a layout validation model based on vehicle data for a first reference vehicle selected from among existing vehicles for the purpose of displaying the shape of the vehicle on a screen, changing the layout validation model specifications and evaluating the planned vehicle and,
a performance evaluation vehicle model building section for building a performance validation model based on vehicle data for a second reference vehicle selected from among the existing vehicles for the purpose of evaluating the planned vehicle performance with respect to the evaluation items, without displaying the vehicle model shape, separate from the layout validation model, wherein
the performance computing section of the computing device computes a performance evaluation value for each evaluation item with respect to the performance validation model, and
the degree-of-completion computing section of the computing device compares the final performance target value and the performance evaluation vehicle model performance evaluation value with respect to each evaluation item to obtain a target degree-of-completion value,
and the performance validation model building section of the computing device changes relevant parts, which relate to the specifications of the layout validation model, of the performance validation model in accordance with changes in layout validation model specifications in the layout validation model building section.

16. The vehicle planning support system set forth in claim 1, wherein the computing device further has
a performance evaluation model building section for building each of the respective constituent part models from vehicle data for each of the vehicle constituent parts of the plurality of vehicles selected from the existing vehicles and, further, for combining these vehicle constituent part models to build performance evaluation validation models for evaluating the performance of each of the planned vehicle evaluation items without displaying the vehicle model shape; and
a layout validation model building section for building layout validation models for evaluating planned vehicles based on the performance validation models built by the performance validation model building section, displaying the vehicle model shape on a screen;
whereby the performance computing section of the computing device computes a performance evaluation value for each evaluation item, and
the performance computing section of the computing device obtains a target degree-of-completion by comparing the final performance target value with the performance evaluation value for the performance evaluation vehicle model.

17. The vehicle planning support system set forth in claim 16, wherein priority order data indicating the order of priority among vehicle constituent part models is stored in the database, and
the layout validation model building section, when matching the bordering sections between vehicle constituent part models, does so according to the order of priority indicated by the priority order data.

18. The vehicle planning support system set forth in claim 16, wherein percentage contribution data indicating the percentage contribution of vehicle constituent part models is stored in the database for each performance evaluation item, and
the layout validation model building section deforms each of the vehicle constituent parts in the border sections based on percentage contribution data when the bordering sections of each of the vehicle constituent part models are being matched.

19. The vehicle planning support system set forth in claim 16, wherein the layout validation model building section displays the vehicle model shape on a screen to enable interferences within a predetermined permitted range of positions between the vehicle constituent part models in the bordering sections of the vehicle constituent part models.

20. The vehicle planning support system set forth in claim 1, wherein
the vehicle data stored in the database further includes change effect data correlating changes in vehicle constituent elements with fluctuations in performance evaluation values caused by those changes in constituent elements, and
the computing device furthermore has a vehicle model building section for building reference vehicle models based on vehicle data for a vehicle selected from among the existing vehicles, and for building planned vehicle models in which constituent elements of the reference vehicle model are changed, and
the performance computing section of the computing device computes performance evaluation values with respect to each evaluation item for the reference vehicle model, and corrects performance evaluation values for planned vehicle models in which constituent elements of the reference vehicle model have been changed, based on the change effect data, and
furthermore, in cases when the final performance target values are not achieved for any of the evaluation items in the planned vehicle model, the computing device has a technology presenting section for selecting and presenting, from the vehicle data stored in the database, constituent element candidates to serve as alternatives in order to achieve the final performance target value.

21. The vehicle planning support system set forth in claim 20, wherein the technology presentation section selects and presents, as constituent element candidates, existing vehicle constituent elements having performance evaluation values which achieve target values for the evaluation items.

22. The vehicle planning support system set forth in claim 20, wherein when target values are not achieved for a plurality of evaluation items, the technology presenting section presents a relational map of performance evaluation values for those evaluation items, and plots and presents performance evaluation values on that relational map for the case in which constituent element candidates are selected.

23. The vehicle planning support system set forth in claim 20 wherein the technology presenting section excludes as constituent element candidates those constituent elements for which performance evaluation values exceed the target value by a predetermined value.

24. The vehicle planning support system set forth in claim 20, wherein ranking information indicating rankings determining the relative position in performance to be achieved by the planned vehicle relative to performances of a competitive group of vehicles is stored in the database for each evaluation item, and
the performance evaluation values distribution defining section of the computing device segments performance evaluation values into a plurality of ranges based on the distribution of performance evaluation values for the subject existing vehicles of the comparison for each evaluation item, and
the initial target value setting section of the computing device adopts performance evaluation values within ranges corresponding to the set ranking as respective initial performance target values for each evaluation item, and
the technology presenting section selects and presents constituent element candidates to serve as performance evaluation values within a range corresponding to the set ranking.

25. The vehicle planning support system set forth in claim 20, wherein when there is no existing vehicle constituent element having performance evaluation values achieving the target value included in the vehicle data, the technology presenting section outputs a message to that effect.

26. The vehicle planning support system set forth in claim 1, wherein the computing device furthermore has a vehicle model building section for building reference vehicle models based on vehicle data for the vehicle selected from among existing vehicles, and builds planned vehicle models in which constituent elements of the reference vehicle model are changed, and
the performance computing section of the computing device computes performance evaluation values with respect to each evaluation item for the reference vehicle model and corrects performance evaluation values for planned vehicle models in which constituent elements of the reference vehicle model have been changed, based on the change effect data, and the computing device further has a performance display section which causes performance evaluation values for each evaluation item to be displayed in a high level radar chart and, further, converts a plurality of technology items correlated to each evaluation item into respective point counts, causing these to be displayed on a low level radar chart, whereby the performance evaluation values in the high level radar chart and the point count in the low level radar chart mutually vary in tandem, and past data correlating changes in point count for low order radar chart technology items with high level radar chart evaluation item performance evaluation values during past vehicle planning projects is stored in the database, and the performance display section selects and presents from the past data those items for which the amount of fluctuation in performance evaluation values for each evaluation item fits the differential between the performance evaluation value for that evaluation item and the target value.

27. The vehicle planning support system set forth in claim 26, wherein the performance display section further selects selected past data using other selection conditions.

28. The vehicle planning support system set forth in claim 27 wherein the performance display section makes a selection based on cost and/or weight as the other selection condition.

29. The vehicle planning support system set forth in claim 1, wherein the computing device furthermore has a vehicle model building section for building reference vehicle models based on vehicle data for the vehicle selected from among existing vehicles, and builds planned vehicle models in which constituent elements of the reference vehicle model are changed, and the performance computing section of the computing device computes performance evaluation values with respect to each evaluation item for the reference vehicle model and corrects performance evaluation values for planned vehicle models in which constituent elements of the reference vehicle model have been changed, based on the change effect data, and the computing device further has a performance display section which causes performance evaluation values for each evaluation item to be displayed in a high level radar chart and, further, converts a plurality of technology items correlated to each evaluation item into respective point counts, causing these to be displayed on a low level radar chart, whereby the performance evaluation values in the high level radar chart and the point count in the low level radar chart mutually vary in tandem.

30. The vehicle planning support system set forth in claim 29, wherein change influence data correlating changes in performance evaluation values for high level radar chart evaluation items with fluctuations in low level radar chart technology item point counts caused by those changes is stored in the database, and when the low level radar chart point count balance is changed, the performance display section changes the balance of performance evaluation values in the high level radar chart in tandem with that change.

31. The vehicle planning support system set forth in claim 29, wherein when the balance of performance evaluation values in the high level radar chart is changed, the performance display section changes the low level radar chart technology item point count balance in tandem with that change.

32. The vehicle planning support system set forth in claim 29, wherein data correlating degree of customer satisfaction with performance evaluation values is stored in the database for each evaluation item, and the performance display section displays the degree of customer satisfaction for each evaluation item along with the high level radar chart.

* * * * *